United States Patent
Nishikado et al.

(10) Patent No.: US 6,816,495 B2
(45) Date of Patent: Nov. 9, 2004

(54) CONNECTION SWITCHING APPARATUS, CONNECTION SWITCHING NETWORK CONTOL SYSTEM AND CONNECTION SWITCHING NETWORK CONTROL METHOD

(75) Inventors: Takashi Nishikado, Ebina (JP); Kenji Kawakita, Urawa (JP); Takanori Miyamoto, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 452 days.

(21) Appl. No.: 10/066,714

(22) Filed: Feb. 6, 2002

(65) Prior Publication Data

US 2002/0071437 A1 Jun. 13, 2002

Related U.S. Application Data

(63) Continuation of application No. 09/157,152, filed on Sep. 18, 1998, now Pat. No. 6,366,582.

(30) Foreign Application Priority Data

Sep. 19, 1997 (JP) ............................................ P9-254878

(51) Int. Cl.[7] ............................................. H04Q 11/04
(52) U.S. Cl. ....................................... 370/401; 370/352
(58) Field of Search ................................ 370/401, 352, 370/386, 389, 395

(56) References Cited

U.S. PATENT DOCUMENTS

| | | |
|---|---|---|
| 5,365,524 A | 11/1994 | Hiller et al. |
| 5,430,715 A | 7/1995 | Corbalis et al. |
| 5,517,497 A | 5/1996 | Le Boudec et al. |
| 5,519,707 A | 5/1996 | Subramanian |
| 6,226,260 B1 | 5/2001 | McDysan ................... 370/401 |
| 6,289,019 B1 * | 9/2001 | Dieudonne ............... 370/395.3 |

OTHER PUBLICATIONS

ATM Network Bible with Illustrative Diagrams Published by Ohm Corporation, 1995, pp. 17–23.
ATM Network Bible with Illustrative Diagrams, Published by Ohm Corporation, 1995, pp. 11–145.
B-ISDN Networking using Group Virtual Paths by T. Takahashi, et al., pp. 3–35.
G. Balboni, et al "From Early ATM Systems to Advanced Switching: Issues in Control Architecture" ISS Symposim, vol. 1, No. SUMP 15, 23–28, 1995, pp. 474–478.

* cited by examiner

*Primary Examiner*—Salvatore Cangialosi
(74) *Attorney, Agent, or Firm*—Antonelli, Terry, Stout & Kraus, LLP

(57) ABSTRACT

A communication network including connection switching exchanges, such as an ATM, a connection management apparatus is provided in a network management unit of a communication network. A group of logical connections with a fixed group size and consecutive identifiers assigned to the connections is treated as a unit. The number of logical connections in the group is an integer with a power of 2. The logical connections and connection identifiers assigned to the logical connections are set up and released in connection setting units each equal to a multiple of the group size in a unitary manner across the network. A priority level is assigned to each connection setting unit. When logical connections have been set for connection setting units sharing the same connection identifiers, logical connections with the shared connection identifiers pertaining to a connection setting unit with a smaller size is considered to be valid.

11 Claims, 32 Drawing Sheets

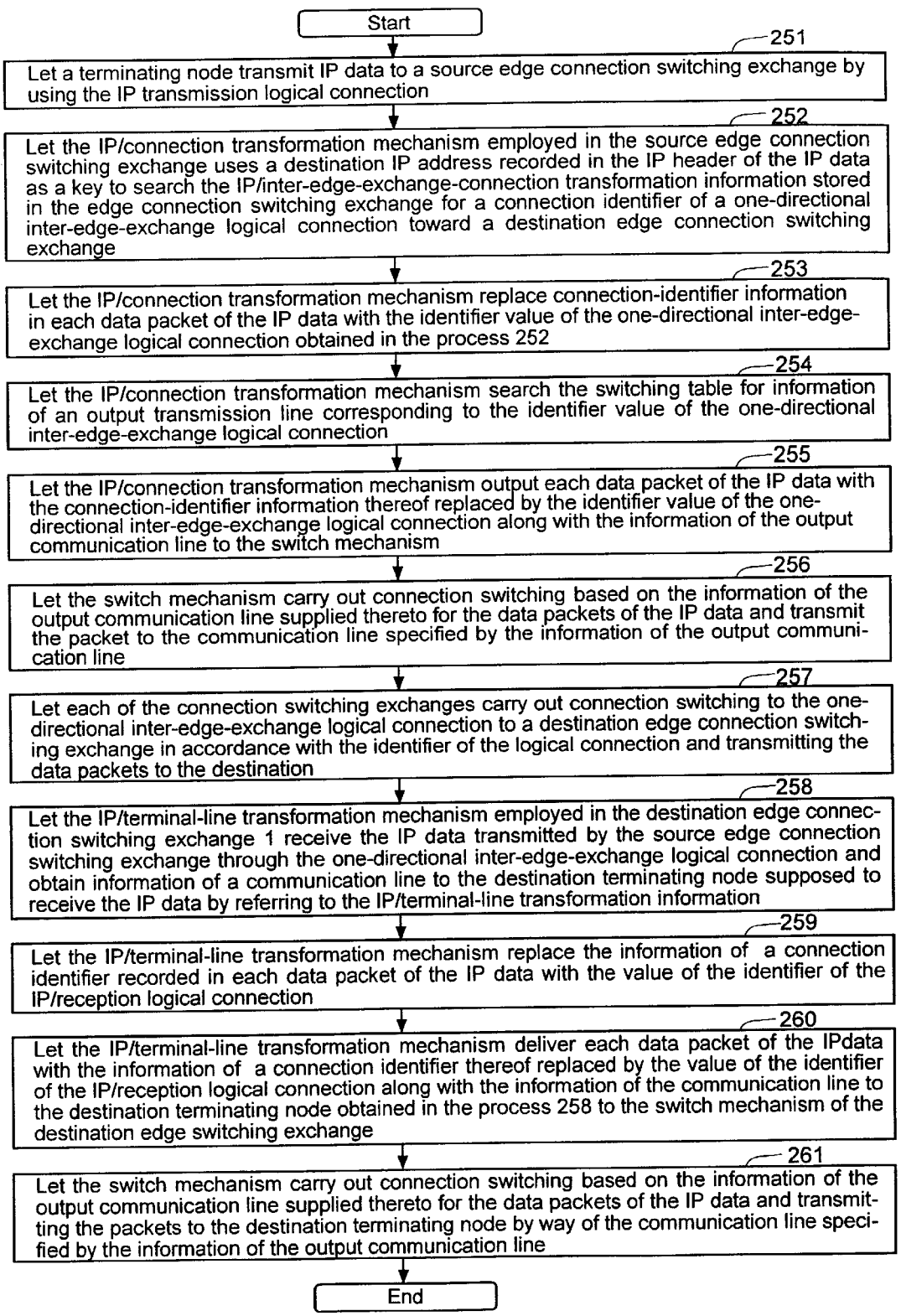

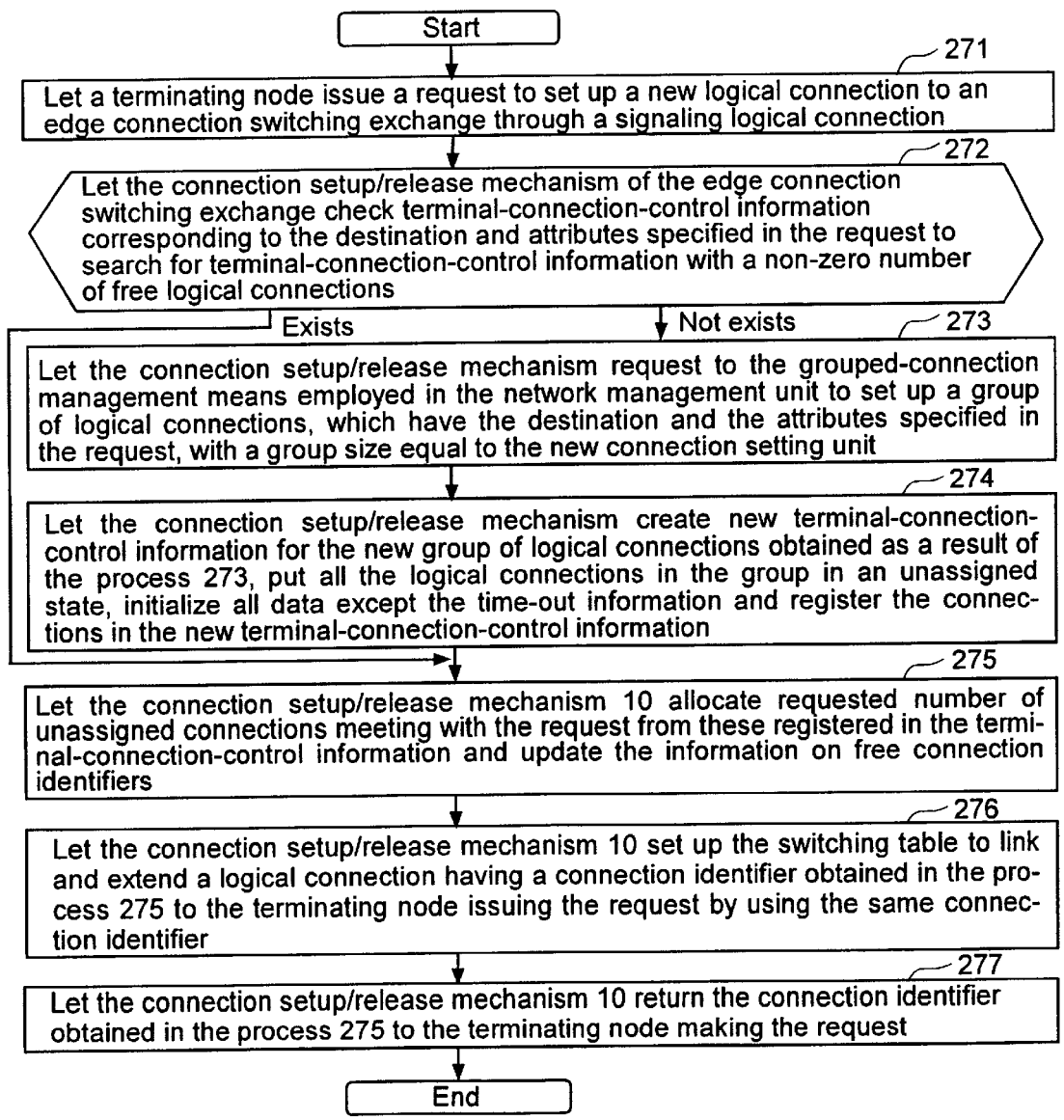

CONNECTION SWITCHING APPARATUS, CONNECTION SWITCHING NETWORK CONTOL SYSTEM AND CONNECTION SWITCHING NETWORK CONTROL METHOD

CROSS-REFERENCED TO RELATED APPLICATION

The present application is a continuation of application Ser. No. 09/157,152, filed Sep. 18, 1998 now U.S. Pat. No. 6,366,582 the contents of which are incorporated herein by reference.

BACKGROUND OF THE INVENTION

In general, the present invention relates to a communication network which is built by using connection switching exchanges, such as an ATM (Asynchronous Transfer Mode) device, and a frame relay, each for implementing a plurality of logical connections on a single logical connection line and which is used for switching a plurality of logical connections of a plurality of communication lines, while rewriting connection identifiers in the connection switching exchanges. More particularly, the present invention relates to a connection switching network control method, a connection switching apparatus and a connection switching network management unit which are appropriate for implementing a high-speed and/or reliable large scale IP/(Internet Protocol) network which can easily recover even in the case of errors.

With regard to a connection switching exchange represented by the conventional ATM device and a frame relay, an example of the ATM device is described on pages 17 to 23 of a book entitled 'ATM Network Bible with Illustrative Diagram' published by Ohm Corporation in 1995. FIG. 2 is a diagram showing the functions and structure of the conventional connection switching exchange in a simple and plain manner. The connection switching exchange 1 is connected to terminating nodes, such as communication terminals and gateways to another network or to other connection switching exchanges, each serving as an adjacent apparatus directly connected thereto by communication lines 2. In the figure, there are communication lines 2-1 to 2-9. The connection switching exchange 1 has a function of setting a plurality of logical connections 3 through each of the communication lines 2, each for connecting the connection switching exchange to a directly connected adjacent apparatus. In the figure, there are shown logical connections 3-1-1, 3-1-2 and 3-1-3 set up through the communication line 2-1, a logical connection 3-8-1 set up through the communication line 2-8 and logical connections 3-9-1 and 3-9-2 set up through the communication line 2-9.

The connection switching exchange further has a function of linking two logical connections 3 set in a single communication line 2 or in two communication lines 2 to each other. Any two logical connections 3 are linked to each other by a communication-line control mechanism 8, a switching-table search mechanism 7, a connection-identifier transformation mechanism 5 and a switch mechanism 6, which are provided for each of the communication lines 2, by using a switching table 4 provided for each communication line 2 or provided in common to the entire connection switching exchange 1. In the example shown in FIG. 2, the switching table 4, the switching-table search mechanism 7 and the connection-identifier transformation mechanism 5 form a communication-line interface 19 for each of the communication lines 2. In the figure, there are shown line interfaces 19-1, 19-2, 19-8 and 19-9.

The switching table 4 is a table showing information on each pair of logical connections to be linked to each other. More particularly, the switching table 4 shows mapping relations from information on communication lines and connection identifiers assigned to the logical connections on the input side to information on communication lines used by logical connections on the output side and connection identifiers assigned to the logical connections on the output side, as well as information on attributes of the logical connections, such as band attributes. In the example shown in FIG. 2, the connection identifiers 3-1-1, 3-1-2 and 3-1-3 using the communication line 2-1 on the input side are associated respectively with the connection identifier 3-8-1 using the communication line 2-8 and the connection identifiers 3-9-1 and 3-9-2 using the communication line 2-9 on the output side. In this example, the switching table 4 is provided individually for each of the communication lines 2.

Since a switching table 4 is associated with each communication line 2, information for input-side communication line 2 is not present in the switching table 4. More particularly, the switching table 4 comprises a column 41 showing connection identifiers assigned to input-side logical connections, a column 42 showing information on output-side communication lines, a column 43 showing connection identifiers assigned to logical connections using the output-side communication lines shown in the entry of column 42, a column 44 showing logical connection attributes and a column 45 showing validity bits each indicating whether the line entry is valid or invalid.

The configuration of the switching table 4 varies to a certain degree in dependence on the technique of implementation of a switching-table search mechanism described below. In some cases, a column entry showing connection identifiers assigned to logical connections using communications lines on the input side is also omitted as is the case with information on communication lines on the input side. In the switching table shown in FIG. 2, the column 45 is used for showing validity bits each indicating whether the line entry is valid or invalid. As an alternative, without using the column 45, a special value can be used in one of columns 41–43 to indicate that the information on a communication line or a connection identifier assigned to a communication line in the column entry for the input or output side is invalid. It should be noted that, in the case of the ATM, the connection identifier used in the switching table 4 is a pair of values representing a VPI (Virtual Path Identifier) and a VCI (Virtual Channel Identifier) respectively.

The communication-line control mechanism 8 is connected to its respective communication line 2, and operates to execute input/output control in accordance with a technique for exchanging physical signals with the communication line 2. More specifically, the communication-line control mechanism 8 converts data received serially from the communication line 2 into certain data packet units. A data packet 60 obtained as a result of such conversion is delivered to the connection-identifier transformation mechanism 5 by way of a signal line 51. When the communication-line mechanism 8 receives a data packet 60 from the switch mechanism 6 by way of a signal line 57, to be more specific, a signal line 57-1, 57-2, 57-8 or 57-9, on the other hand, the communication-line mechanism 8 serially outputs the data packet 60 to the communication line 2 in accordance with the established technique for exchanging physical signals with the communication line 2.

The connection-identifier transformation mechanism 5 is a mechanism for rewriting connection-identifier information 62 recorded in the header 61 of a data packet 60 received by the connection switching exchange 1. As described above, a data packet 60 received from one of the communication lines 2 is processed by the communication line control mechanism 8 associated with the communication line 2 before being delivered to the connection-identifier transformation mechanism 5 by way of the signal line 51. Before rewriting connection-identifier information 62 recorded in the header 61 of the data packet 60, the connection-identifier transformation mechanism 5 first of all stores the data packet 60 temporarily and then delivers the connection-identifier information 62 recorded in the header 61 of the data packet 60 to the switching-table search mechanism 7 through a signal line 52.

The switching-table search mechanism 7 searches the switching table 4 for a specific table entry 40 of the switching table 4 through a signal line 53 by using the connection-identifier information 62 recorded in the header 61 of the data packet 60 received through the signal line 52 and information on a communication line 2 associated with the switching-table search means 7 as keys. The specific table entry 40 obtained as a result of the search is delivered to the connection-identifier transformation mechanism 5 by way of a signal line 54. It should be noted that the specific data may not be found in the table entry 40 or the specific data may be found invalid. In order to distinguish the status of the search, search-result valid/invalid information for indicating whether the specific data delivered through the signal line 54 is valid or invalid is also supplied to the connection-identifier transformation mechanism 5 by way of a signal line 55. The search-result valid/invalid information indicates that the specific data is invalid if the specific data delivered through the signal line 54 is invalid in case no valid specific data can be delivered through the signal line 54.

There are a variety of techniques for implementing the switching-table search mechanism 7. One of the techniques is referred to as a direct-map method whereby input information comprising information on the communication line 2 and the connection identifier information 62 recorded in the header 61 of the data packet 60 are used as indexes as they are. In another technique known as a hashing method, the input information is used as an input to a hashing function which generates a hashing value to provide for fast lookup for the target table entry. In still another technique called a contents addressable memory method, the target table entry is searched with a special memory, called a content addressable memory, which can directly lookup the contents of the memory using the input information and can return the information associated with the matched contents. As an alternative, a combination of such techniques may also be adopted.

When the connection-identifier transformation mechanism 5 receives a result of a search operation from the switching-table search mechanism 7, the connection identifier transformation mechanism 5 checks the search result valid/invalid information received by way of the signal line 55. If a result of the checking indicates that the result of the search is valid, the connection-identifier transformation mechanism 5 replaces the connection-identifier information 62 recorded in the header 61 of the data packet 60 with an output-side connection identifier in the column entry 43 of the matched table entry 40 received as a search result through the signal line 54.

The input data packet 60 processed by the connection-identifier transformation mechanism 5 is supplied to the switch mechanism 6 along with information on the output-side communication line 2 in the column entry 42 of the table entry 40 received as a search result by way of the signal line 56, to be more specific, a signal line 56-1, 56-2, 56-8 or 56-9. The switch mechanism 6 has the function of switching a data packet 60 from an input-side communication line 2 to a communication line 2 on the output side. The data packet 60 received from the input-side communication line 2 is then output by the switch mechanism 6 to a signal line 57, to be more specific, a signal line 57-1, 57-2, 57-8 or 57-9, for the output-side communication line 2 determined by the information on the output-side communication line 2 received from the connection-identifier transformation mechanism 5 along with the packet data. The data packet 60 output to the signal line 57 is then supplied to the output-side communication line 2 by way of the aforementioned communication-line control mechanism 8 associated with the communication line 2.

In addition, the connection switching exchange 1 also has a control mechanism 9 connected to the switch mechanism 6 via the signal lines 56-0 and 57-0 inside the exchange 1. Each switching table 4 is set in advance so that a logical connection 82 having a reserved connection identifier is connected to the control mechanism 9 through the signal line 56-0. In general, the control mechanism 9 includes a processor for processing information. That is to say, the processor executes software programs to accomplish the functions of the control mechanism 9. The control mechanism 9 includes, among other elements, a connection setup/release mechanism 10. The connection setup/release mechanism 10 receives a request to set up a new logical connection link or release an existing logical connection link. Such a request is received by the connection setup/release mechanism 10 through a logical connection 82 with the reserved connection identifier described above. The logical connection 82 is used for signaling purposes. Upon receiving such a request, the connection setup/release mechanism 10 sets or modifies the switching table 4 through the signal line 58 and, if necessary, further transmits the request to set up or release a logical connection to a directly connected connection switching exchange or to a communication apparatus by way of a communication line 2.

If the result of the search of the switching table 4 carried out for an input data packet 60 is invalid, the result is discarded in the connection-identifier transformation mechanism 5, or the connection-identifier transformation mechanism 5 specifies the control mechanism 9 as a logical connection destination line for the input data packet 60, instead of rewriting the input data packet 60. In this case, the input data packet 60 is transmitted to the switch mechanism 6, which then passes on the packet 60 to the control mechanism 9. In the control mechanism 9, the input data packet 60 is subjected to error processing.

In addition, a network control method adopted in a communication network including the connection switching exchange 1 described above is also explained on pages 111 to 145 of 'ATM Network Bible with Illustrative Diagram' published by Ohm Corporation in 1995. As techniques to implement IP/(Internet Protocol) packet communication with the ATM, for example, there are known methods referred to as LAN emulation and IP over ATM. According to either method, in transmission of an IP data packet, the existence of a logical connection for a terminating node in the ATM communication network specified as a destination IP address in the header of the IP data packet, or the existence of a logical connection for a destination terminating node in an ATM communication network, which will pass on the IP data packet to the destination terminating node, is checked. If such a logical connection has not been set up yet, an ATM logical connection to the destination terminating node is set, and the IP data packet is transmitted to the logical connection. The logical connection is set with communication between the connection setup/release mechanism and that of a directly connected connection switching exchange using the signaling logical connection described above. Since connection identifiers assigned to the logical connections being set are determined by the connection switching exchanges on the route of the logical connections themselves, in general, a connection identifier at the output-side of a connection switching exchange varies from that at the input-side of the connection switching exchange as a data packet is transmitted from one exchange to another.

In the conventional method described above, each time the destination of IP data packet data changes, processing to set up a logical connection needs to be carried out. In addition, in the worst case, the number of logical connections becomes equal to a value in the order of the second power of the number of terminating nodes in the communication network, giving rise to a problem that there are neither enough connection identifiers nor enough switching table entries in a large-scale network. In addition, since relations between connection identifiers assigned to input-side communication lines and connection identifiers assigned to output-side communication lines are controlled and stored independently in each connection switching exchange, if a failure occurs somewhere in the communication network, the relations between such connection identifiers are lost, raising a problem that it is necessary to ask a user program at a terminating node to set up end-to-end logical connections from the beginning.

SUMMARY OF THE INVENTION

As a basic means to solve the problems described above, there is provided a network management unit in a communication network connected to connection switching exchanges of the communication network by operation-control communication lines. The network management unit has connection-control information and a connection management means for controlling logical connections in the entire communication network in a uniform manner. While referring to and updating the connection-control information, the connection management means treats a fixed number of logical connections having consecutive connection identifiers as a group of connections. Logical connections in the communication network are thus controlled in a uniform manner as a connection group or a plurality of connection groups. Even a logical connection passing through a plurality of connection switching exchanges has only one connection identifier. A connection switching exchange is requested to set up or release logical connections in group units, each of which comprise logical connections having consecutive identifiers as described above. In more detail, each connection switching exchange has a connection setup/release mechanism for executing a function to carry out processing to set up and release logical connections in group units in accordance with a command received from the connection management means employed in the network management unit by way of the operation-control communication line. In addition, different priority levels are assigned to a plurality of connection groups. If different logical connections pertaining to a plurality of connection groups with group sizes different from each other in a connection switching exchange share the same connection identifiers, the group of connections having a small group size is judged to be to a group having a high priority, and only connections having the highest priority are considered valid for the connection identifiers.

A connection switching exchange which fits the control of logical connections set in group units as described above is provided with a switching mask register, a mask mechanism and a switching-information transformation mechanism for the switching table of the connection switching exchange to implement switching of a plurality of logical connections pertaining to a specified connection group by using one switching-table entry. More specifically, contents of the switching mask register can be set at a value received from the connection setup/release mechanism by way of a signal line. The mask mechanism is used to compute an AND value (a logical product) of connection-identifier information recorded in the header of an input data packet and the contents of the mask register. The logical product output by the mask mechanism is supplied to the switching-table search mechanism and used thereby as a key for searching the switching table. Switching-table entry information obtained as a result of the search carried out by the switching-table search mechanism is supplied to the switching-information transformation mechanism.

The switching-information transformation mechanism transforms an output-side connection identifier of the switching-table entry information into an output which is computed as follows. First of all, a logical product of data obtained as a result of bit-by-bit inversion of the contents of the switching mask register and the connection-identifier information recorded in the header of the input data packet is computed. Then, an OR value (a logical sum) of the logical product and the output-side connection identifier of the switching-table entry information obtained as a result of the search operation carried out by the switching-table search mechanism is computed. The logical Sum is a result of the processing output produced by the switching-information transformation mechanism. The result of the processing output produced by the switching-information transformation mechanism is supplied as a new search result to the connection-identifier transformation mechanism which implements the connection switching in conjunction with the switch mechanism.

In addition, in order to implement priority control of a plurality of group units, a set of means comprising the switching table, the switching mask register, the switching-table search mechanism, the mask means and the switching-information transformation mechanism is used as a grouped-search mechanism. A connection switching exchange thus has a plurality of grouped-search mechanisms for carrying out search operations for a plurality of groups at the same time. Different fixed priority levels are further assigned to the plurality of grouped-search mechanisms or a priority judgment/selection mechanism is provided for determining which grouped-search mechanism has the highest priority by comparing the contents of the switching registers thereof. To be more specific, in case a plurality of switching-table entries are obtained as a result of simultaneous search operations, a switching-table entry that is valid and has the highest priority, as indicated by the smallest group size, is selected and supplied as a new search result to the connection-identifier transformation mechanism, which implements the connection switching in conjunction with the switch mechanism.

In addition to the basic means for solving the problems described above, in order to implement connection switching exchanges of high-speed IP data packets in a large-scale communication network and to realize a reliable network, the following means are used.

First of all, a one-directional interterminal logical connection is set up between every two terminating nodes at an initial setting. A one-directional interterminal logical connection has a connection identifier for each destination terminating node, which is unique to the node to which the identifier is assigned. Thus, one-directional interterminal logical connections from terminating nodes to the same destination terminating node all have the same connection identifier, forming so-called multipoint-to-point logical connections. Terminating nodes in a communication network are put in a category of level-0 apparatuses and an edge connection switching exchange directly connected to a terminating node is put in a category of level-1 apparatuses. A connection switching exchange directly connected to an apparatus at level-1 but not pertaining to the categories of level-1 apparatuses and level-0 apparatuses is placed in a category of level-2 apparatuses. In the same way, a connection switching exchange directly connected to an apparatus at level (n−1) but not pertaining to the categories of level-(n−1) apparatuses and numerically-lower-than-(n−1)-level apparatuses is placed in a category of level-n apparatuses.

As described above, all terminating nodes of the communication network are placed in a category of level-0 apparatuses, the lowest level layer in a hierarchy. In such a hierarchy, for apparatuses at all hierarchical levels i where i>=1, one-directional interterminal logical connections from an apparatus at level i to apparatuses at level (i−1) have consecutive connection identifiers. In addition, for anticipated future expansion of apparatus connections, a proper number of extra connection identifiers are reserved for apparatuses at level i. Thus, the total number of one-directional interterminal logical connections from an apparatus at level i to apparatuses at level (i−1), including the reserved ones, is made equal to a multiple of a group unit, and the connection identifiers for the logical connections are assigned in the group unit.

A group of logical connections having connection identifiers assigned thereto are set in the group unit from all apparatuses at level (i+1) directly connected to the apparatus at level i to the apparatus at level i. At a connection switching exchange at level i, a group of logical connections from apparatuses at level (i+1) to an apparatus at level i are distributed so as to be connected to logical connections or a group of logical connections from the apparatus at level i to apparatuses at level i−1. In addition, in order to setup meshed interterminal connections, one-directional logical connections are connected from each terminating node to the logical connections, which are set in group units from high to low hierarchical layers, as described above, in a connection-group unit equal to or greater than that for the connections from high to low layers.

Next, as means for implementing connection switching exchanges of high-speed IP data packets, a one-directional interterminal logical connection set up at the initial setting described above is used, and, furthermore, each edge connection switching exchange, that is, a connection switching exchange directly connected to a terminating node, is provided with an IP/connection transformation mechanism as a control mechanism. The IP/connection transformation mechanism transforms an IP address into a connection identifier of a one-directional interterminal logical connection toward a destination terminating node to which IP data having the IP address is to be transferred. By resorting to IP/connection transformation information distributed by the network management unit to show a relation between the IP address and the connection identifier assigned to a one-directional interterminal logical connection toward the destination terminating node, the IP/connection transformation mechanism transmits the IP data packet, received from the origin terminating node, to the destination terminating node using the connection identifier assigned to the one-directional interterminal logical connection toward the destination terminating node. As an alternative, the IP/connection transformation mechanism at an edge connection switching exchange gets the destination IP address from the origin terminating node, transforms the IP address into a connection identifier assigned to a one-directional interterminal logical connection toward the destination terminating node, and returns the connection identifier assigned to the one-directional interterminal logical connection to the origin terminating node. Then, the origin terminating node stores a pair of the returned connection identifier and the IP address in a cache, and transmits the IP data packet to the destination terminating node by using the returned connection identifier.

Next, as a processing means to process a request to set up or release a new logical connection made dynamically by a terminating node, each edge connection switching exchange directly connected to the terminating node has terminal-connection-control information to maintain the information on the logical connections dynamically set or released and the assignment status of the connections indicating whether each connection is assigned to a terminating node or not. The dynamic connections are set and released in a new-connection-setting unit, which is a multiple of a group unit. Referring to and updating the terminal-connection-control information, the connection setup/release mechanism buffers requests to setup and release logical connections received from terminating nodes, and carries out processing to set up and release logical connections in the aforementioned new-connection-setting unit. More particularly, for each request to set a logical connection described above, a group of logical connections from the edge connection switching exchange to a destination apparatus specified in the request is set in the aforementioned new-connection-setting unit if an appropriate unassigned connection matching the request is not left at the edge connection switching exchange. In this case, terminal-connection-control information is created for the newly set logical connections, and the logical connections are marked as free unassigned connections. That is, the collection of terminal-connection-control information provides the information for an unassigned connection buffer pool. Then, a free unassigned logical connection, which connects the edge connection switching exchange and the destination apparatus, is selected from the unassigned connection buffer pool.

The selected logical connection is extended to connect to the terminating node, which issued the request, by setting a switching table of the edge connection switching exchange with the connection identifier assigned to the selected logical connection. When a request to release a logical connection is received from a terminating node, the corresponding terminal-connection-control information is updated so that the released logical connection is marked as a free unassigned connection. That is, the released logical connection is considered to be put back into the free unassigned buffer pool. In more detail, the switching table setting for a part of the logical connection between the connection switching exchange and the terminating node issuing the request is invalidated, and the remaining part of the logical connection from the connection switching exchange to the destination apparatus is marked as a free unassigned connection. In addition, the terminal-connection-control information includes time-out information for timing the release of a group of logical connections controlled by the control information. If all logical connections in a group controlled by terminal-connection-control information has been continuously in an unassigned state for a predetermined period of time, the group of logical connections will be released by the connection setup/release mechanism, which checks the states of the logical connections periodically.

The following is a description of processing to handle a failure occurring in the communication network by using a plurality of group sizes. For a group of logical connections corresponding to a unit for a normal communication route, a group of logical connections for a detour communication route having the same connection identifiers as the group of normal logical connections is provided. The group of logical connections for a detour communication route has a group size larger than that of the group of normal logical connections.

In the event of a failure occurring in the communication network, the grouped-connection management means employed in the network management unit issues a request to the connection switching exchange on the failing communication route to carry out processing to invalidate the setting of the switching of the failing group of logical connections with a smaller group size, provided that a group of logical connections for a detour communication route has been set.

If a failure is detected in a portion for which such a group of logical connections for a detour communication route is not set, on the other hand, the grouped-connection management means refers to connection-control information and information on a configuration of logical connections among apparatuses in the communication network stored in the network management unit in order to determine a detour communication route. In this case, taking conditions such as a communication bandwidth into consideration, the grouped-connection management means forms a judgment as to whether connection identifiers of the failing group of logical connections are to be used as connection identifiers of the detour communication route as they are or other connection identifiers for the detour communication route are to be used. If necessary, connection identifiers for the detour route are thus assigned.

The grouped-connection management means then carries out processing to make connection requests to connection switching exchanges or terminating nodes along the detour communication route in the following order, in order to setup logical connections between the group of logical connections for a detour communication route and the group of logical connections originally connected to the failing logical connection or in order to setup the group of logical connections for a detour communication route having connection identifiers for the detour route in a group unit of the failing group of logical connections. The processing begins with connection switching exchanges in the middle of the detour communication route to be followed by a terminating node on the source side of the detour communication route or at either end of the detour communication route if the failing logical connection is a bi-directional logical connection. The processing ends with a terminating node at the other end of the detour communication route.

According to the means described above, since a logical connection already set between terminating nodes is used, processing to set a logical connection at each IP-packet switching time is not required, allowing switching of a high-speed IP data packet to be carried out. In addition, since logical connections controlled in the aforementioned group units across the network are used, and grouped logical connections are hierarchically connected or distributed relative to each other, connection identifiers are required only in the order of a number of terminating nodes even if meshed logical connections are set between terminating nodes.

Moreover, in the connection switching exchange provided by the present invention, since switching of a plurality of logical connections can be carried out by using only one entry of a switching table, functions of the connection switching exchange can be utilized effectively with control of the aforementioned group units, allowing meshed logical connections between terminating nodes to be implemented by using only very few entries of the switching table. On top of that, even in the configuration of a large-scale network, the number of chances that connection identifiers and switching-table entries become insufficient becomes smaller, making an application to a large-scale network possible.

In addition, by using a plurality of different group sizes, a group of logical connections for a detour communication route can be set. With a group of logical connections for a detour communication route set in advance, processing to handle a failure can be carried out by merely invalidating the failing group of logical connections. Furthermore, even if a group of logical connections for a detour communication route does not exist, a detour route can be easily set with a group unit because all logical connections in the communication network are controlled in group units by using unique connection identifiers. As a result, a reliable network can be constructed.

BRIEF DESCRIPTION OF THE DRAWINGS

Embodiments of the present invention will be described by referring to the following diagrams wherein:

FIG. 27 is a flow diagram showing a typical transmission procedure for the technique adopted by the embodiment shown in FIG. 25 to transmit IP data packets through one-directional logical connections between terminating nodes using logical connections controlled in group units in accordance with the present invention;

FIG. 28 is a diagram showing a typical configuration of terminal connection information used for setting up and releasing logical connections controlled in group units in accordance with the present invention;

FIG. 29 is a flow diagram showing a typical procedure for processing a request to set up a logical connection made by a terminating node using logical connections set in group units in accordance with the present invention;

DETAILED DESCRIPTION OF THE PREFERRED EMBODIMENTS

The present invention will become more apparent from a careful study of the following detailed description of some preferred embodiments with reference to the accompanying drawings.

Figure 1:
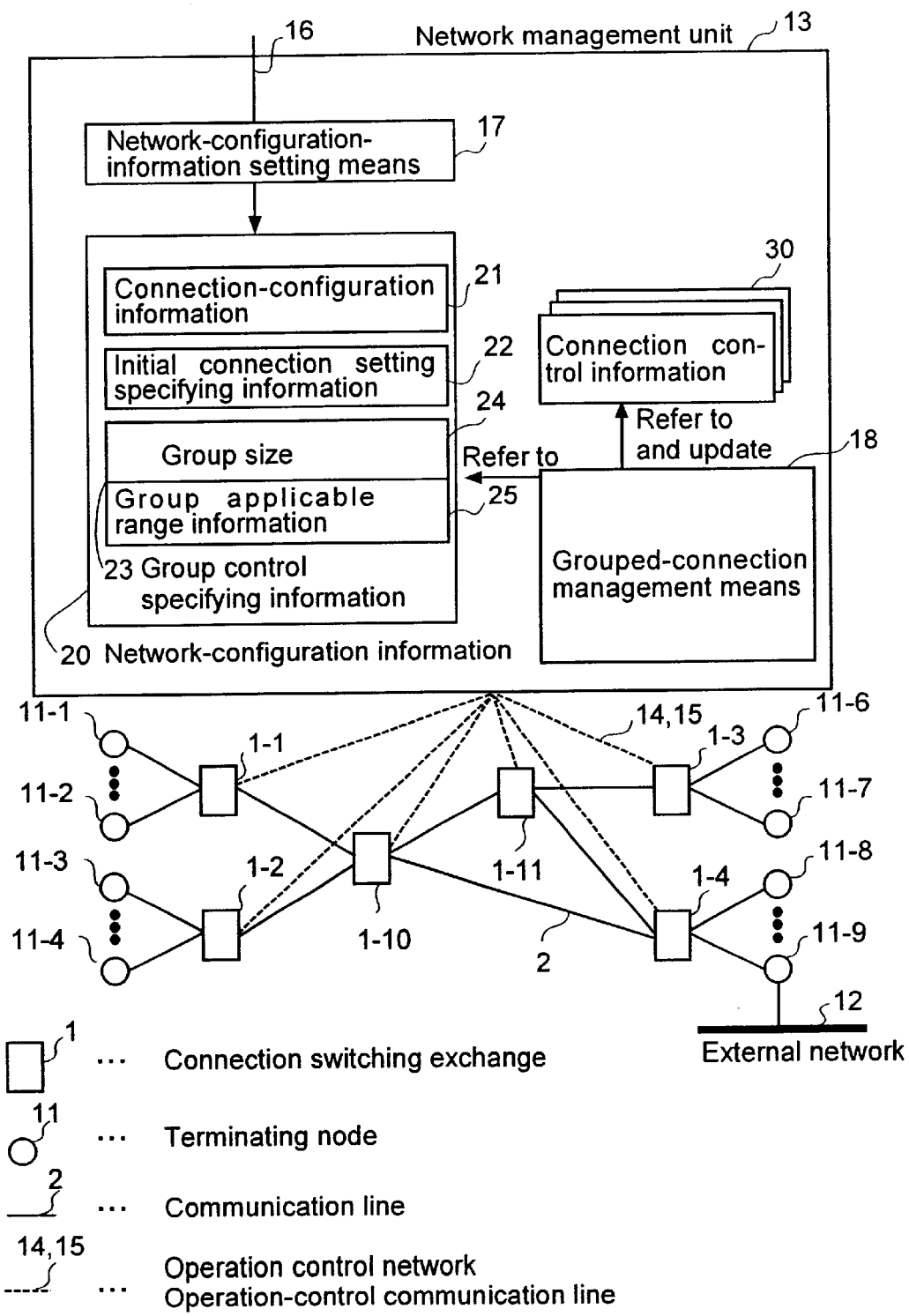
FIG. 1 is a block diagram showing an overall configuration of an embodiment implementing control of logical connections in group units provided by the present invention.

FIG. 1 is a diagram showing the overall configuration of an embodiment implementing control of logical connections in group units provided by the present invention. As shown in the figure, the communication network provided by the present invention has a configuration comprising a plurality of terminating nodes and a plurality of relay apparatuses connected to each other by communication lines. The terminating nodes are communication terminal apparatuses and gateways connected to external networks, whereas the relay apparatuses are connection switching exchanges. The typical configuration shown in the figure includes communication terminal apparatuses 11-1, 11-2, 11-3, 11-4, 11-6, 11-7 and 11-8, a gateway 11-9 connected to an external network 12 and connection switching exchanges 1-1, 1-2, 1-3, 1-4, 1-10 and 1-11. The communication network is also provided with a network management unit 13 for controlling the entire communication network. The network management unit 13 is connected to all the connection switching exchanges 1 by an operation-control network 14 provided separately from the communication lines 2. The operation-control network 14 is provided in the form of operation-control communication lines 15 for exchanging information including requests to set up and release a logical connection between the network management unit 13 and the connection switching exchanges 1.

In the network management unit 13, network-configuration information 20 concerning the communication network is stored. The network management unit 13 has a network-configuration-information setting means 17 for setting and updating the network-configuration information 20. As shown in the figure, the network-configuration-information setting means 17 is capable of communicating with an external apparatus through a communication line 16, which is connected to the network control management unit 13, in addition to the operation-control communication lines 15. The network-configuration information 20 includes information 21 on the configuration of logical connections between the terminating nodes 11 and the connection switching exchanges 1 of the communication network, initial connection setting specifying information 22, that is, initial connection setting information, and group control specifying information 23. The group control specifying information 23 is composed of a group size 24 indicating a fixed unit used for controlling and setting up logical connections and group applicable range information 25 specifying a range of connection identifiers to which control in group units is applied.

Figure 3:
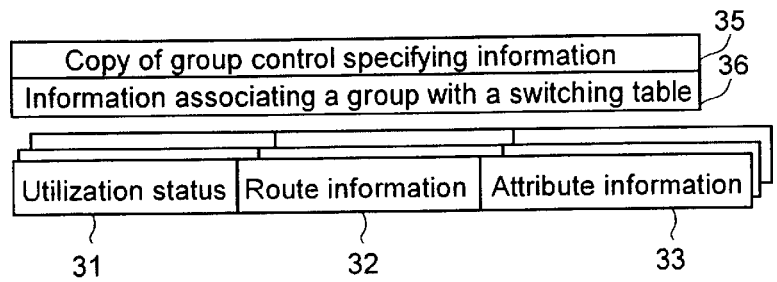
FIG. 3 is a diagram showing a typical configuration of connection-control information used in the control of logical connections in group units provided by the present invention.

The network management unit 13 further has a grouped-connection management means 18. In accordance with the group control specifying information 23 stored as part of the network-configuration information 20, the grouped-connection management means 18 controls logical connections having connection identifiers specified by the group applicable range information 25 of the group control specifying information 23 in units specified by the group size 24 of the group control specifying information 23, and stores results of the control as connection-control information 30. FIG. 3 is a diagram showing an embodiment of the connection-control information 30. As shown in the figure, as control information of all logical connections in a group, the connection-control information 30 comprises a copy 35 of the group control specifying information 23 and information 36 associating the group with a switching table, as will be described later. The logical connection control 30 also includes a state of utilization 31 of a group of logical connections, information on routes 32 and information on attributes 33 for each group of logical connections with a size specified by the group size 24.

Figure 4:
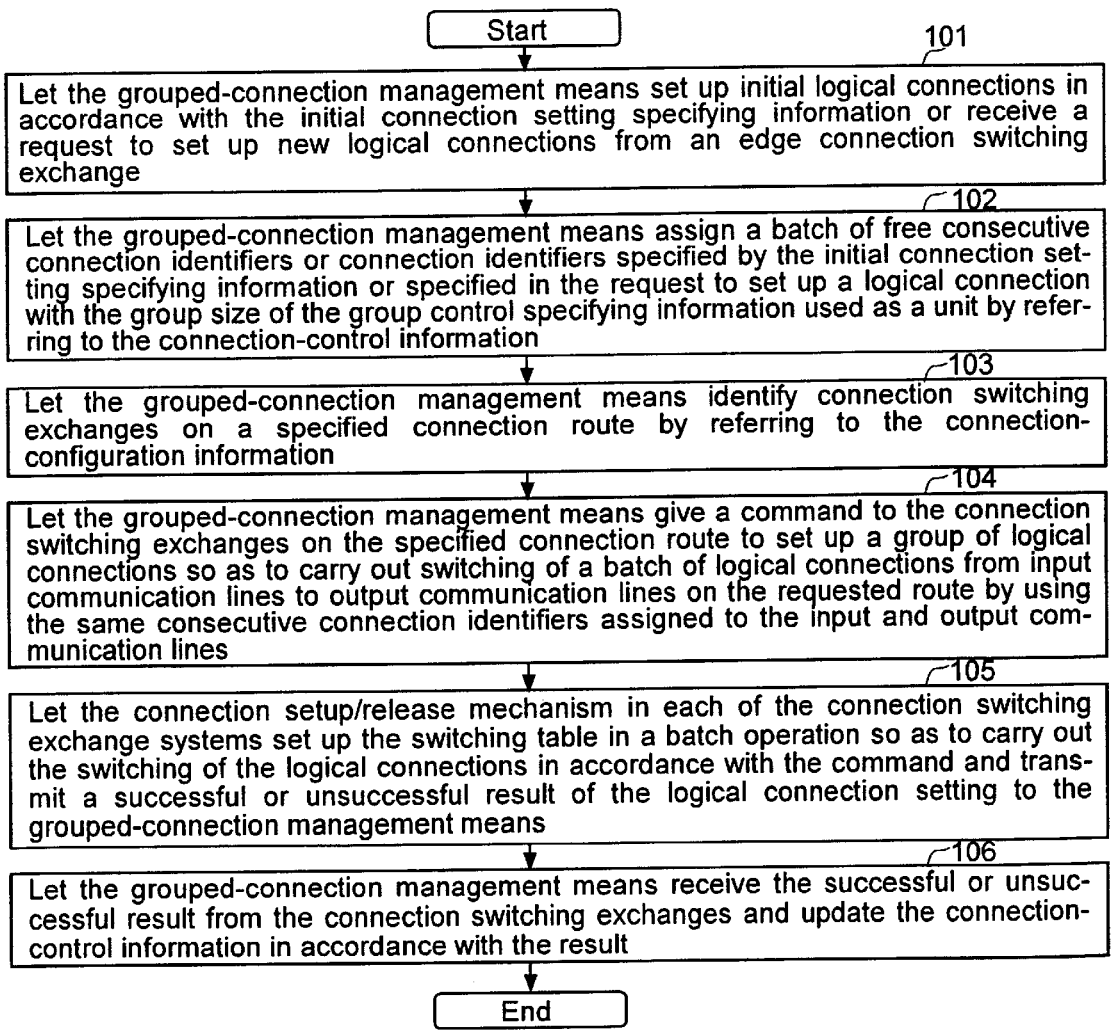
FIG. 4 is a flow diagram showing a typical processing procedure to set up logical connections in group units provided by the present invention.

FIG. 4 is a diagram showing a typical processing procedure carried out by the grouped-connection management means 18 provided by the present invention to set up logical connections in group units specified by the group size 24. As shown in the figure, the procedure begins with a process 101 in which the grouped-connection management means 18 starts the work to set up logical connections when setting up initial logical connections in accordance with the initial connection setting specifying information 22 stored in the network management unit 13, or when receiving a request to set up new logical connections from the edge connection switching exchange 1-1, 1-2, 1-3 or 1-4, directly connected to one of the terminating nodes 11, by way of the operation-control communication line 15.

The flow of the procedure then goes on to a process 102 in which the grouped-connection management means 18 assigns a batch of free consecutive connection identifiers or connection identifiers specified by the initial connection setting specifying information 22 or specified in a request to set up a logical connection by referring to the connection-control information 30 with the group size 24 of the group control specifying information 23 used as a unit.

Then, the flow of the procedure proceeds to a process 103 in which the grouped-connection management means 18 identifies connection switching exchanges 1 on a specified connection route by referring to the connection-configuration information 21 stored in the network management unit 13. Subsequently, the flow of the procedure continues to a process 104 in which the grouped-connection management means 18 gives a command to the connection switching exchanges 1 on the specified connection route identified in the process 103 through the operation-control communication lines 15 to set up a group of logical connections so as to carry out switching of a batch of logical connections from input communication lines to output communication lines on the requested route by using the same consecutive connection identifiers assigned to the input and output communication lines in the process 102.

The flow of the procedure then goes on to a process 105 in which, in each of the connection switching exchange systems 1 receiving the command in the process 104, the connection setup/release mechanism 10 employed in the connection switching exchanges 1 receives the command and sets up the switching table 4 in a batch operation so as to carry out the switching of the logical connections in the specified group of logical connections from the specified input communication lines to the specified output communication lines by using the specified connection identifiers as they are without modifying the values of the connection identifiers.

In the process 105, an indication of a successful or unsuccessful result of the logical connection setting is returned to the grouped-connection management means 18 by way of one of the operation-control communication lines 15. Finally, the flow of the procedure continues to a process 106 in which the grouped-connection management means 18 receives the indication of the successful or unsuccessful result of the logical connection setting-up operation carried out in the process 105 from each of the connection switching exchanges 1 and updates the connection-control information 30 in accordance with the obtained result, completing the processing to set up the logical connections.

Figure 5:
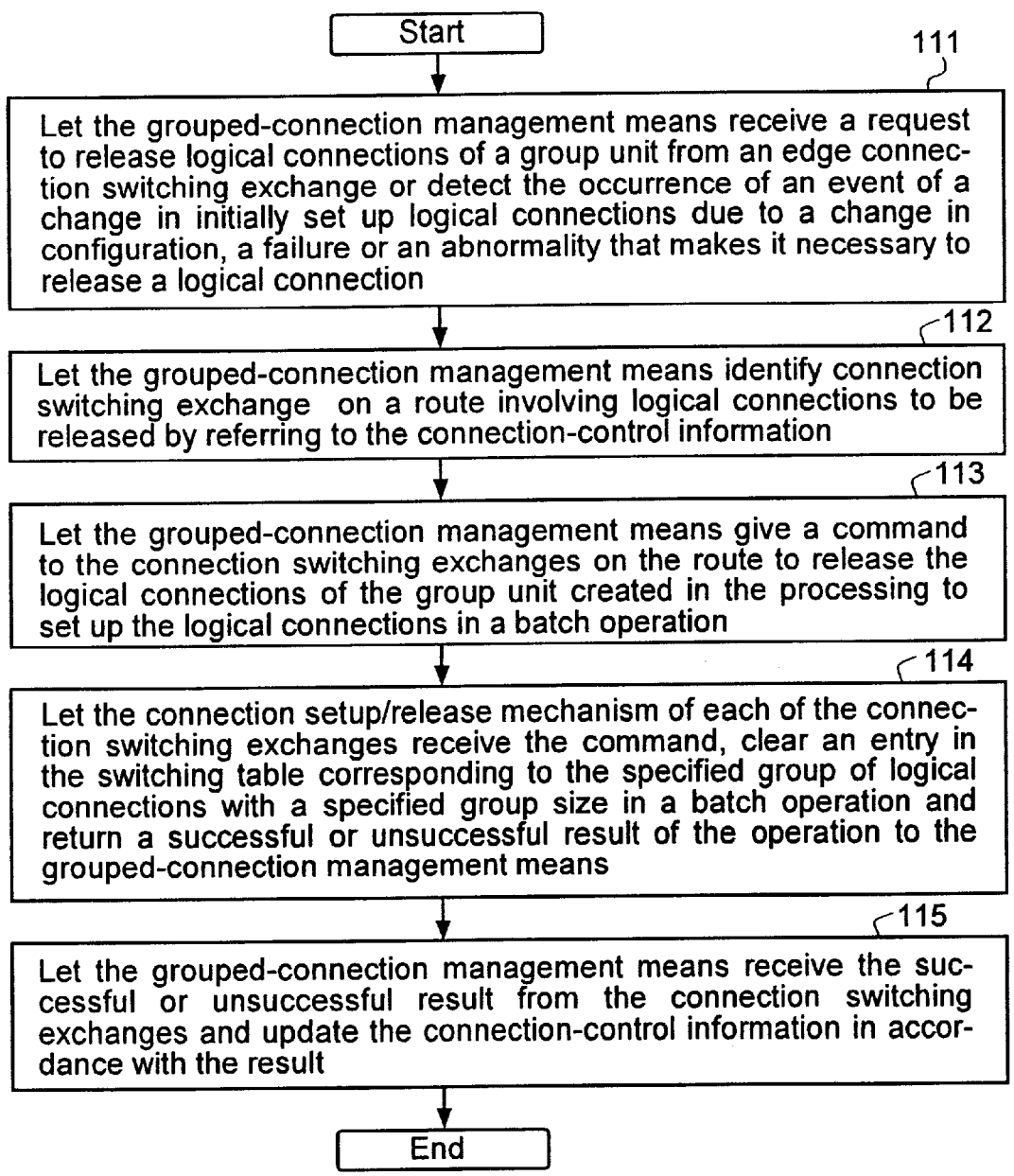
FIG. 5 is a flow diagram showing a typical processing procedure to release logical connections in group units provided by the present invention.

FIG. 5 is a diagram showing a typical processing procedure carried out by the grouped-connection management means 18 provided by the present invention to release logical connections in group units specified by the group size 24. As shown in the figure, the procedure begins with a process 111 in which the grouped-connection management means 18 starts processing to release logical connections of a group unit when the grouped-connection management means 18 receives a request to release logical connections of the group unit from any of the edge connection switching exchanges 1-1, 1-2, 1-3 and 1-4 directly connected to the terminating nodes 11 by way of the operation-control communication lines 15, or when it becomes necessary to release a logical connection in the event of a change in initially set up logical connections due to a change in configuration, a failure or an abnormality.

The flow of the procedure then goes on to a process 112 in which the grouped-connection management means 18 identifies connection switching exchanges 1 on a route of a portion to be released, that is, a route involving logical connections to be released, by referring to the connection-control information 30 stored in the network management unit 13.

Then, the flow of the procedure proceeds to a process 113 in which the grouped-connection management means 18 gives a command to the connection switching exchanges 1 on the route identified in the process 112 to release the logical connections of the group unit created in the processing to set up the logical connections in a batch operation.

Subsequently, the flow of the procedure continues to a process 114 in which, in each of the connection switching exchanges 1 receiving the command in the process 113, the command is received by the connection setup/release mechanism 10 employed by the connection switching exchange and the connection setup/release mechanism 10 clears an entry in the switching table 4 of the connection switching exchange corresponding to the specified group of logical connections in a batch operation, returning an indication of a successful or unsuccessful result of the operation to the grouped-connection management means 18 by way of one of the operation-control communication lines 15.

Finally, the flow of the procedure continues to a process 115 in which the grouped-connection management means 18 receives the indication of the successful or unsuccessful result of the logical connection releasing operation carried out in the process 114 from each of the connection switching exchanges 1 and updates the connection-control information 30 in accordance with the obtained result, completing the processing to release the logical connections.

For the sake of simplicity, network-wide control methods to set up and release logical connections in only a group unit have been explained above. In the following description, on the other hand, network-wide control methods to set up and release logical connections in a plurality of group units will be explained.

In the first place, in the network management unit 13 shown in FIG. 1, a plurality of pieces of group control specifying information 23 are stored as part of the network-configuration information 20. The group size 24 in one of the same plurality of pieces of group control specifying information 23 is a multiple or a fraction of the group size 24 in another piece of the group control specifying information 23. In addition, for each of the same plurality of pieces of group control specifying information 23, the grouped-connection management means 18 employed by the network management unit 13 stores individual connection-control information 30 in the network management unit 13.

Figure 6:
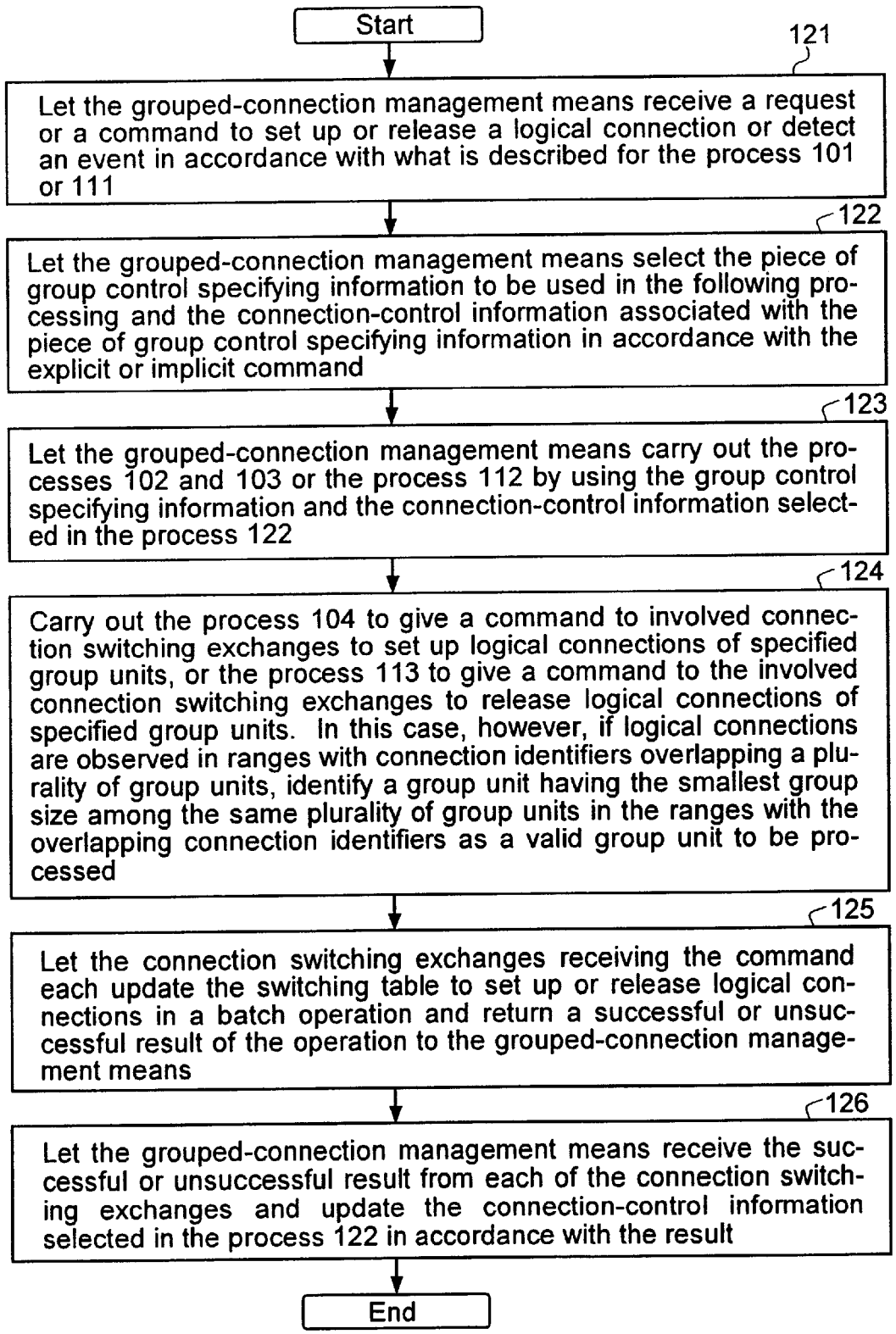
FIG. 6 is a flow diagram showing a typical processing procedure to set up or release logical connections for a plurality of group units provided by the present invention.

FIG. 6 is a diagram showing a typical processing procedure carried out by the grouped-connection management means 18 provided by the present invention to set up or release logical connections for a plurality of group units. As shown in the figure, the procedure begins with a process 121 in which processing to set up or release logical connections is started in accordance with what is described for the process 101 or 111. The grouped-connection management means 18 receives a command or a request to set up or release logical connections. The command or request is a command or request that explicitly indicates which piece of group control specifying information 23 is to be used. As an alternative, the grouped-connection management means 18 receives an implicit command or request that indicates which piece of group control specifying information is to be used as implicitly suggested by a relation between a specified connection identifier and a piece of group control specifying information to be used.

The flow of the procedure then goes on-to a process 122 in which the piece of group control specifying information 23 to be used in the following processing and the connection-control information 30 associated with the piece of group control specifying information 23 are then selected. Then, the flow of the procedure proceeds to a process 123 in which the processes 102 and 103 are carried out to prepare for setting-up of logical connections or the process 112 is performed to prepare for a release of logical connections by using the group control specifying information 23 and the connection-control information 30 selected in the process 122.

Subsequently, the flow of the procedure continues to a process 124 in which the process 104 is carried out to give a command to involved connection switching exchanges 1 identified in the process 103 to set up logical connections of specified group units, or the process 113 is performed to give a command to the involved connection switching exchanges 1 identified in the process 112 to release logical connections of specified group units. In this case, however, all the pieces of connection-control information 30 are checked. If logical connections in a plurality of group units have to be set up for the same connection identifiers or if logical connections of a plurality of group units already set up for the same connection identifiers have to be released, that is, if logical connections are observed in ranges with connection identifiers overlapping a plurality of group units, the grouped-connection management means 18 identifies a group unit having the smallest group size among the plurality of group units in the ranges with the overlapping connection identifiers as a valid group unit to be processed.

The flow of the procedure then goes on to a process 125 in which each of the connection switching exchanges 1 receiving a command in the process 124 updates the switching table 4 in the connection switching exchange and sets up or releases logical connections in a batch operation, returning an indication of a successful or unsuccessful result of the operation to the grouped-connection management means 18 employed in the network management unit 13 by way of one of the operation-control communication lines 15 in accordance with the command in the same way as the process 105 or 114 respectively.

Finally, the flow of the procedure continues to a process 126 in which the grouped-connection management means 18 receives the indication of the successful or unsuccessful result of the logical connection setting-up or releasing operation carried out in the process 125 from each of the connection switching exchanges 1 and updates the connection-control information 30 selected in the process 122 in accordance with the obtained result in the same way as the process 106 or 115, completing the processing to set-up or release the logical connections, respectively.

It should be noted that an embodiment implementing a method to carry out processing in the process 124 in case a specified connection identifier overlaps a plurality of group units will be described later.

Figure 7:
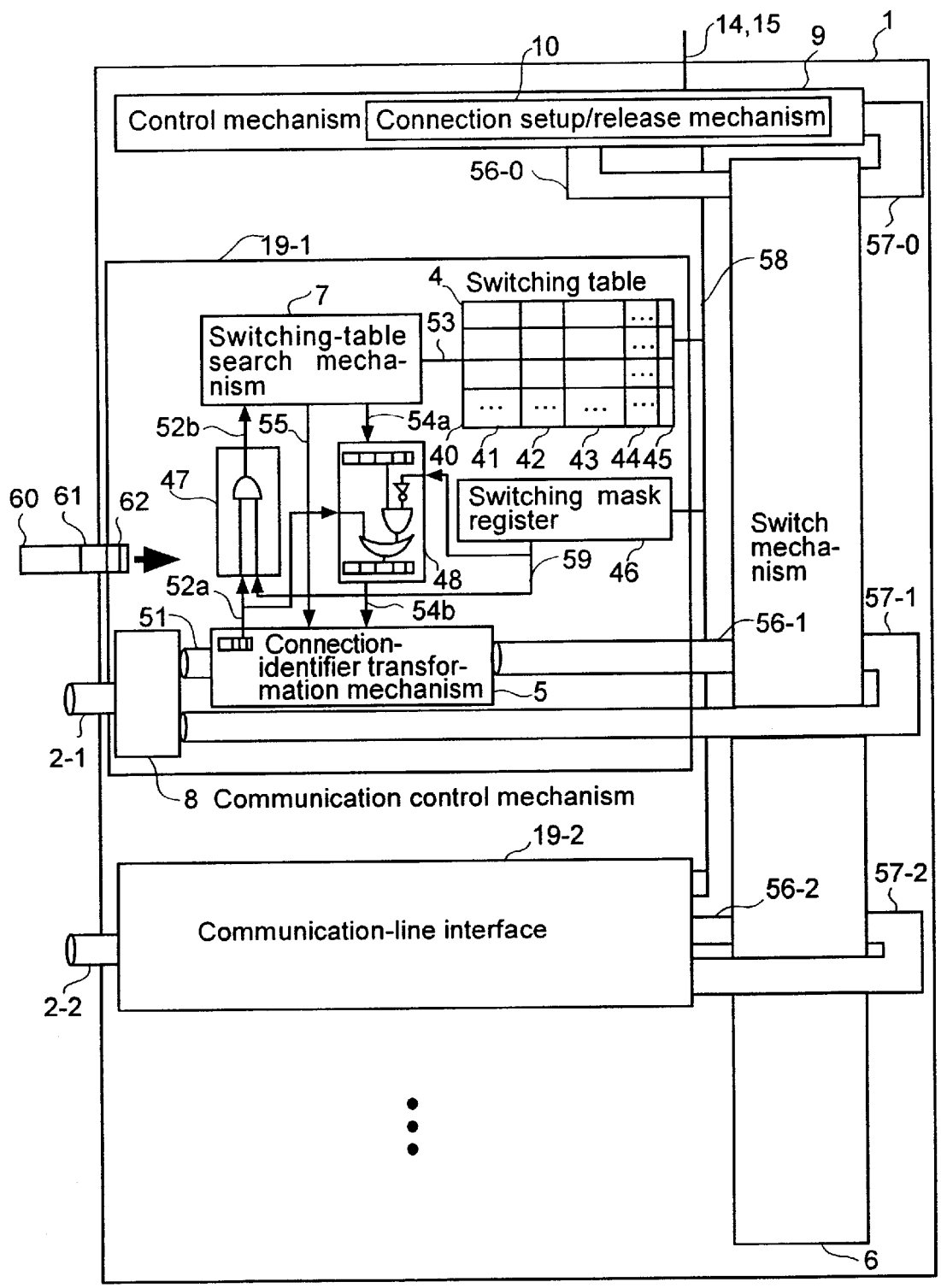
FIG. 7 is a schematic block diagram showing a typical configuration of a connection switching exchange suited for the control of logical connections in group units provided by the present invention.

Other embodiments of the present invention will be explained with reference to FIGS. 7 and 8. FIG. 7 is a diagram showing a typical configuration of a connection switching exchange suited for the control of logical connections in group units provided by the present invention, and FIG. 8 is a diagram showing a procedure provided by the present invention for processing an input data packet received by the connection switching exchange shown in FIG. 7.

Figure 2:
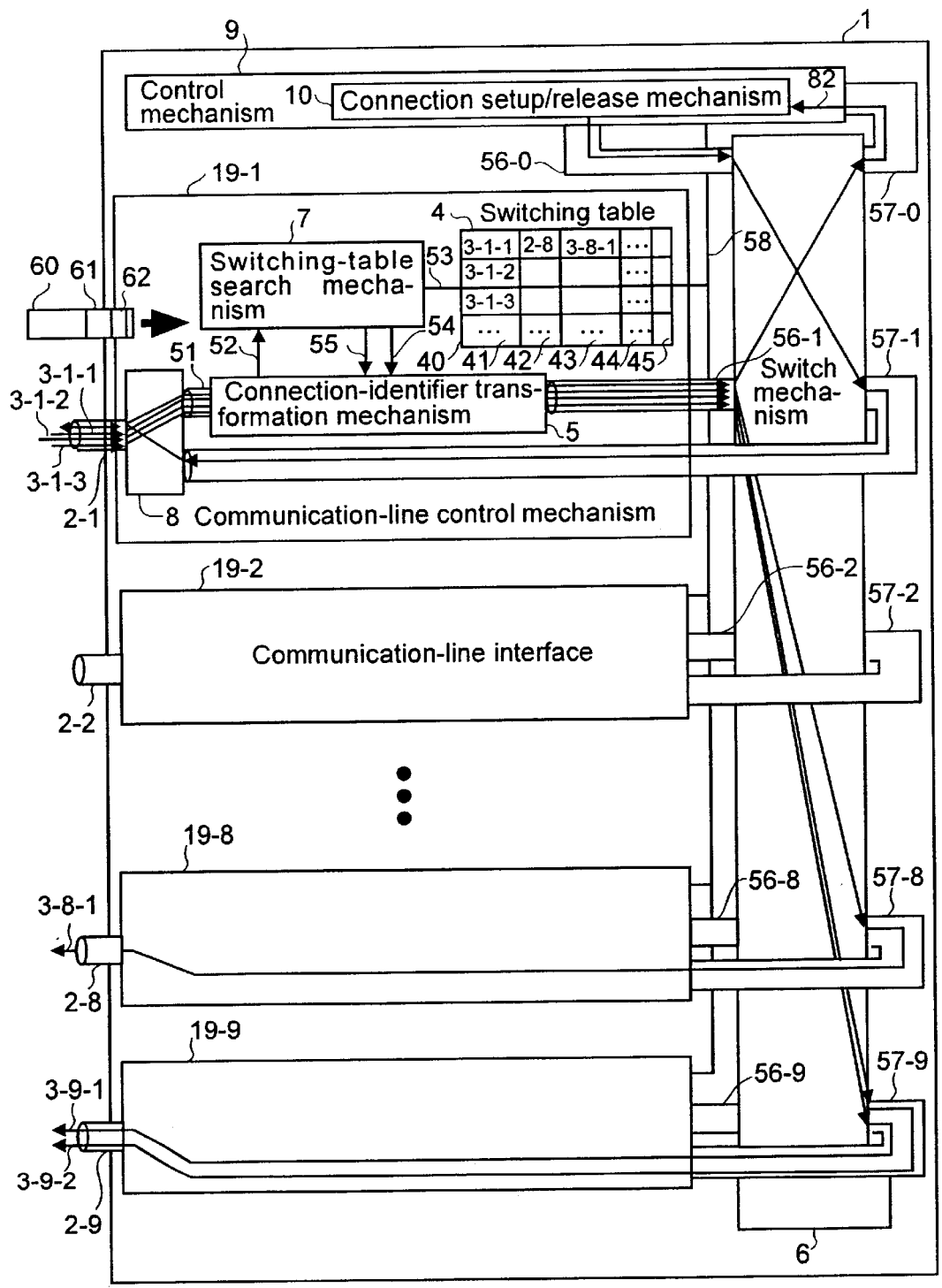
FIG. 2 is a block diagram showing a typical configuration of the conventional connection switching exchange.

As shown in FIG. 7, the embodiment implementing the connection switching exchange 1 also includes a switching mask register 46, a mask mechanism 47 and a switching-information transformation mechanism 48 provided for the switching table 4, in addition to the components of the conventional connection switching exchange shown in FIG. 2. The switching mask register 46 is used for setting a value received from the connection setup/release mechanism 10 through a signal line 58. In the embodiment shown in FIG. 7, the switching mask register 46, the mask mechanism 47, the switching-information transformation mechanism 48 and the switching table 4 constitute a communication line interface 19 provided for each communication line 2. In the figure, communication line interfaces 19-1 and 19-2 for communication lines 2-1 and 2-2, respectively, are shown. The control mechanism 9 is connected to an operation-control communication line 15 which is a part of an operation-control network 14. The connection setup/release mechanism 10 employed in the control mechanism 9 receives a command to set up or release logical connections from the network management unit 13 shown in FIG. 1 by way of the operation-control communication line 15. A flow of data experiencing connection switching carried out by the connection switching exchange 1 is described with reference to FIG. 8 as follows.

Figure 8:
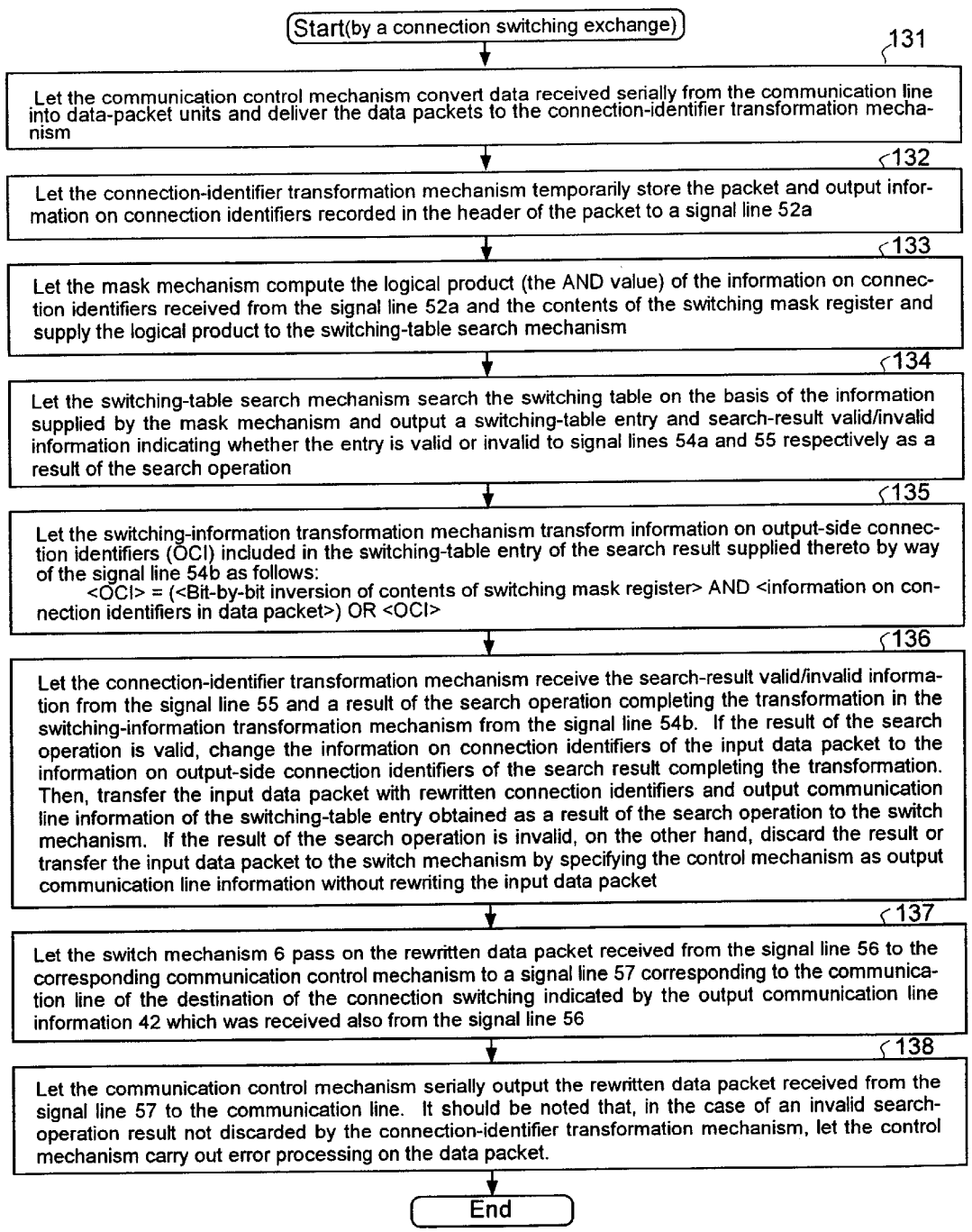
FIG. 8 is a flow diagram showing a procedure provided by the present invention for processing an input data packet received by the connection switching exchange shown in FIG. 7.

As shown in FIG. 8, the flowchart begins with a process 131 in which data received serially from the communication line 2, that is, the communication line 2-1 or 2-2, is converted into data-packet units by the communication control mechanism 8 connected to the communication line 2. The input data packet 60 is delivered to the connection-identifier transformation mechanism 5 through the signal line 51. The flow of the connection-switching procedure then goes on to a process 132 in which, first of all, the connection-identifier transformation mechanism 5 receiving the data packet 60 temporarily stores the packet 60 and outputs information on connection identifiers 62 recorded in the header 61 of the packet 60 to a signal line 52a. In the case of the conventional connection switching exchange, the signal line 52a is directly connected to the switching-table search mechanism 7. In the case of the connection switching exchange provided by the present invention, on the other hand, the signal line 52a is connected to the corresponding mask mechanism 47.

In a process 133 following the process 132, the mask mechanism 47 computes the logical product (the AND value) of the information on connection identifiers 62 included in the input data packet 60 received from the signal line 52a and the contents of the switching mask register 46 supplied to the mask mechanism 47 by way of a signal line 59, and supplies the logical product to the switching-table search mechanism 7 through a signal line 52b.

Then, the flow of the connection-switching procedure proceeds to a process 134 in which the switching-table search mechanism 7 searches the switching table 4 through a signal line 53 on the basis of the information on connection identifiers 62 in the input data packet 60, which is supplied thereto by way of the signal line 52b and has completed the mask processing, and communication-line information is provided on the communication line 2 corresponding to the switching-table search mechanism 7 in the same way as the conventional connection switching exchange. As a result of the search operation, a switching-table entry 40 and search-result valid/invalid information indicating whether the entry 40 is valid or invalid are output, respectively, to signal lines 54a and 55 connected to the switching-table search mechanism 7. In the case of the conventional connection switching exchange, the signal line 54a is connected directly to the connection-identifier transformation mechanism 5. In the case of the connection switching exchange provided by the present invention, on the other hand, the signal line 54a is connected to the switching-information transformation mechanism 48.

Subsequently, the flow of the connection-switching procedure continues to a process 135 in which the switching-information transformation mechanism 48 computes a logical product of the information on connection identifiers 62 of the input data packet 60 supplied thereto by way of the signal line 52b and a value resulting from bit-by-bit inversion of the contents of the switching mask register 46 which are supplied to the switching-information transformation mechanism 48 by way of the signal line 59.

Then, the switching-information transformation mechanism 48 computes a logical sum (an OR value) of the logical product and information on output-side connection identifiers 43 included in the switching-table entry 40 of the search result supplied thereto by way of the signal line 54a, and outputs the logical sum to a signal line 54b. The signal line 54b is connected to the connection-identifier transformation mechanism 5 and the processing carried out thereafter is the same as the conventional connection switching exchange. More particularly, the flow of the connection-switching procedure goes on to a process 136 in which the connection-identifier transformation mechanism 5 receives the search-result valid/invalid information from the signal line 55 and a result of the search operation completing the transformation in the switching-information transformation mechanism 48 from the signal line 54b.

If the result of the search operation is valid, the information on connection identifiers 62 of the input data packet 60 is changed to the information on output-side connection identifiers 43 of the search result completing the transformation. Then, the input data packet 60, along with rewritten connection identifiers and output communication line information 42 of the switching-table entry 40 obtained as a result of the search operation, is transferred to the switch mechanism 6 by way of a signal line 56, that is, a signal line 56-1 or 56-2 shown in FIG. 7. If the result of the search operation is invalid, on the other hand, the result is discarded by the connection-identifier transformation mechanism 5, or the input data packet 60 is transferred to the switch mechanism 6 by specifying the control mechanism 9 as output communication line information without rewriting the input data packet 60.

Subsequently, the flow of the connection-switching procedure goes on to a process 137 in which the switch mechanism 6 passes on the rewritten data packet 60 received from the signal line 56 to the corresponding communication control mechanism 8 through a signal line 57, that is, a signal line 57-1 or 57-2, corresponding to the communication line 2 of the destination of the connection switching indicated by the output communication line information 42 which was received also from the signal line 56. Finally, the flow of the connection-switching procedure continues to a process 138 in which the communication control mechanism 8 serially outputs the rewritten data packet 60 received from the signal line 57 to the communication line 2 connected to the communication control mechanism 8. It should be noted that, in the case of an invalid search-operation result not discarded by the connection-identifier transformation mechanism 5, as a result of the connection switching, the switch mechanism 6 transmits the data packet 60 to the control mechanism 9 for carrying out error processing on the data packet 60.

As described above, in this embodiment implementing a connection switching exchange wherein, through the use of a value masked by a switching mask register as a unit, a group of logical connections having consecutive connection identifiers in the unit can be subjected to connection switching by using only one entry of a matching table. In brief, the embodiment implements connection switching on logical connections in a group unit. The following is a description of an embodiment for carrying out connection switching on logical connections of a plurality of group units.

Figure 9:
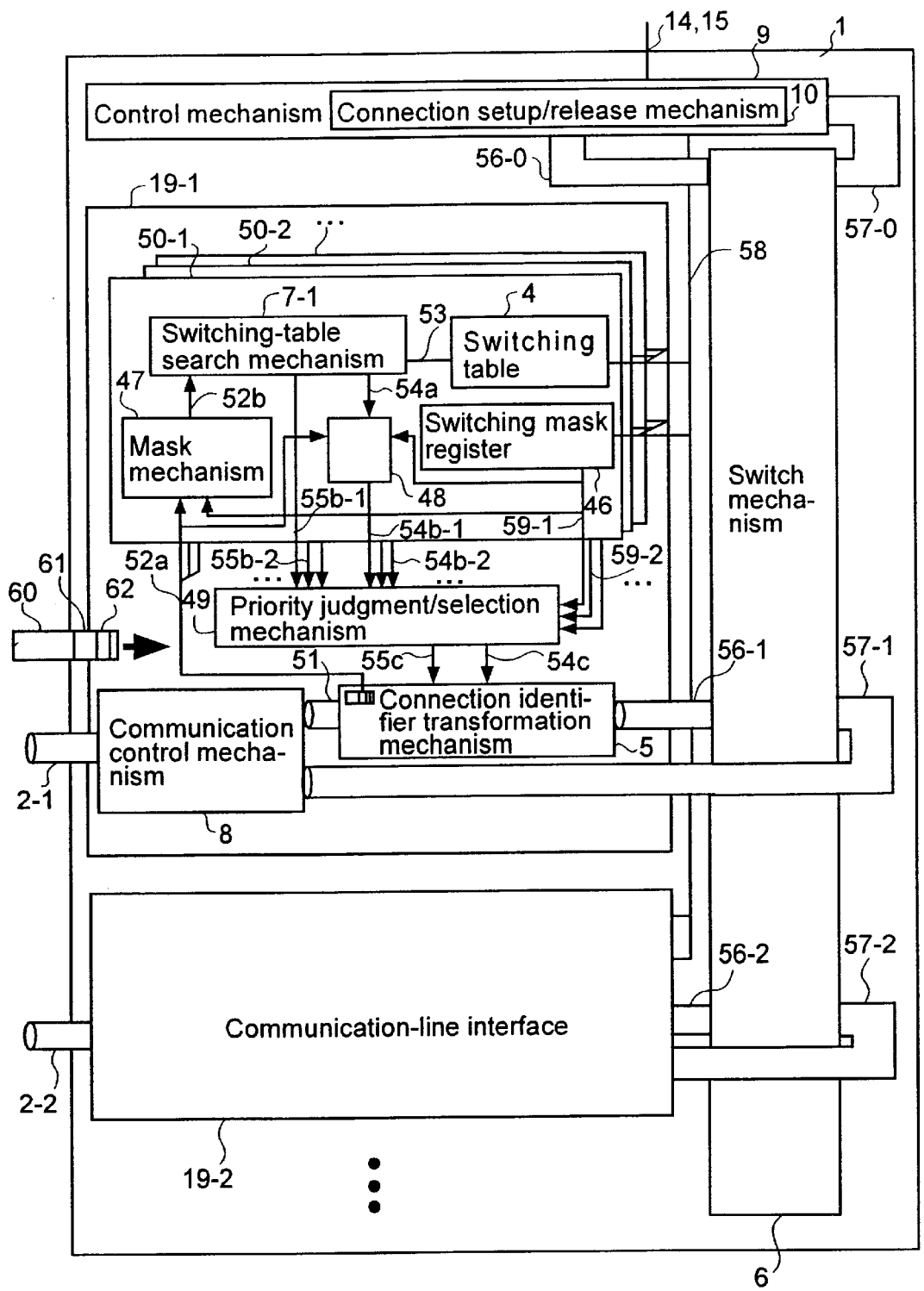
FIG. 9 is a schematic block diagram showing a typical configuration of a connection switching exchange suited for the control of logical connections for each plurality of group units provided by the present invention.
Figure 12:
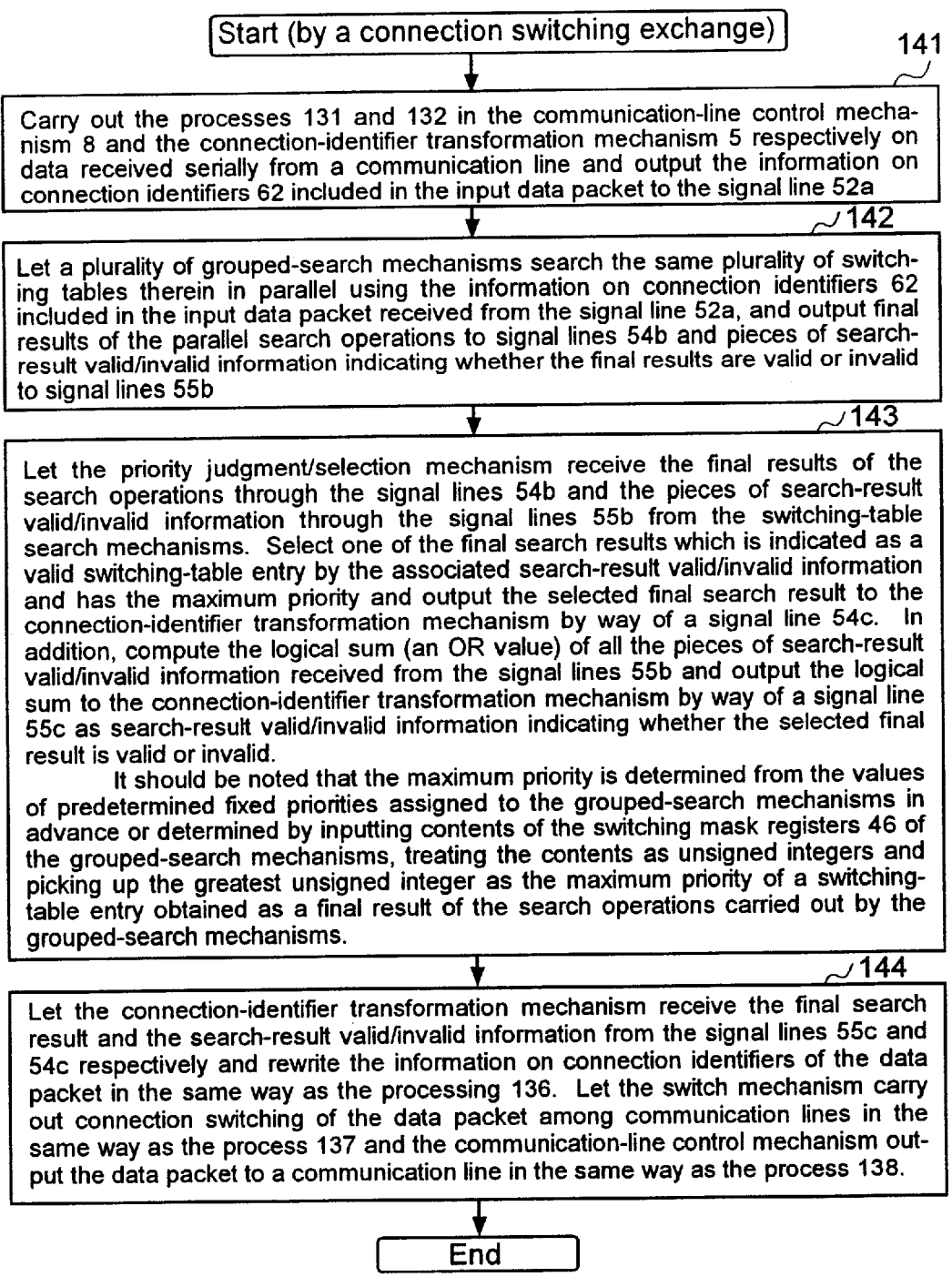
FIG. 12 is a block diagram showing a procedure provided by the present invention for processing an input data packet received by the connection switching exchange shown in FIG. 9.

FIG. 9 is a diagram showing an embodiment implementing a typical configuration of a connection switching exchange suited for the control of logical connections for each plurality of group units provided by the present invention. FIG. 12 is a diagram showing a procedure provided by the present invention for carrying out connection switching on an input data packet received by the connection switching exchange shown in FIG. 9. This embodiment and the procedure will be explained in the same way as the previous embodiment.

In the case of the embodiment shown in FIG. 7, only 1 set of the switching table 4, the switching mask register 46, the mask mechanism 47 and the switching-information transformation mechanism 48 is provided for each communication line 2. In the case of the embodiment shown in FIG. 9, on the other hand, the switching table 4, the switching mask register 46, the mask mechanism 47 and the switching-information transformation mechanism 48 are part of a set referred to as a grouped-search mechanism 50, and a plurality of grouped-search mechanisms 50-1, 50-2 and so on are provided for each communication line 2. In addition, in the present embodiment, a priority judgment/selection mechanism 49 is newly provided for each communication line 2.

As shown in FIG. 12, the procedure begins with a process 141 in which data received serially from a communication line 2, that is, any of the communication lines 2-1, 2-2 and so on, is subjected to the processes 131 and 132 in the communication line control mechanism 8 and the connection-identifier transformation mechanism 5, respectively, and the information on connection identifiers 62 included in the input data packet 60 is output to the signal line 52a. The flow of the procedure then goes on to a process 142 in which the information on connection identifiers 62 included in the input data packet 60 received from the signal line 52a is delivered simultaneously to the mask mechanisms 47 and the switching-information transformation mechanisms 48 employed in the plurality of grouped-search mechanisms 50 for concurrently carrying out the processes 133, 134 and 135 to search the same plurality of switching tables 4 therein in parallel. Final results of the parallel search operations are output by the switching-information transformation mechanisms 48 of the grouped-search mechanisms 50 to signal lines 54b, that is, 54b-1, 54b-2 and so on, and pieces of search-result valid/invalid information indicating whether the final results are valid or invalid are output by the switching-table search mechanisms 7 of the grouped-search mechanisms 50 to signal lines 55b, that is, 55b-1, 55b-2 and so on.

The signal lines 54b and 55b are connected to the priority judgment/selection mechanism 49 for the communication line 2-1 for selecting one of the above final results obtained from the search operations carried out on the switching tables 4 employed in the plurality of grouped-search mechanisms 50. In more detail, in a process 143 following the process 142, the priority judgment/selection mechanism 49 receives the final results of the search operations, that is switching-table entries 40 completing transformation in the switching-information transformation mechanisms 48 of the grouped-search mechanisms 50, from the signal lines 54b, and the pieces of search-result valid/invalid information indicating whether the final results are valid or invalid are output by the switching-table search mechanisms 7 of the grouped-search mechanisms 50 from the signal lines 55b. The priority judgment/selection mechanism 49 selects one of the final search results from the plurality of grouped-search mechanisms 50 which is indicated as a valid switching-table entry 40 by the associated search-result valid/invalid information and has the maximum priority, outputting the selected final search result to a signal line 54c.

The maximum priority is determined from the values of predetermined fixed priorities assigned to the grouped-search mechanisms 50 for final search results with the matching-table entries 40 thereof indicated as valid entries by the pieces of search-result valid/invalid information associated with the final search results. As an alternative, the maximum priority is determined by inputting contents of the switching mask registers 46 of the grouped-search mechanisms 50 by way of signal lines 59, that is, signal lines 59-1, 59-2 and so on, treating the contents as unsigned integers and picking up the greatest unsigned integer as the maximum priority of a switching-table entry 40 obtained as a final result of the search operations carried out by the grouped-search mechanisms 50.

In addition, the priority judgment/selection mechanism 49 also computes the logical sum (an OR value) of all the pieces of search-result valid/invalid information received from the signal lines 55b at the same time, and outputs the logical sum to a signal line 55c as search-result valid/invalid information indicating whether the selected final result is valid or invalid. The signal lines 55c and 54c are connected to the connection-identifier transformation mechanism 5 for the communication line 2-1. Processing carried out thereafter is the same as the conventional connection switching exchange. That is to say, in the final process 144 following the process 143, the information on connection identifiers of the data packet 60 is rewritten by the connection-identifier transformation mechanism 5 in the same way as the processing 136, connection switching of the data packet 60 among communication lines 2 is carried out by the switch mechanism 6 in the same way as the process 137 and the data packet 60 is output to a communication line 2 by the communication-line control mechanism 8 in the same way as the process 138.

Figure 10:
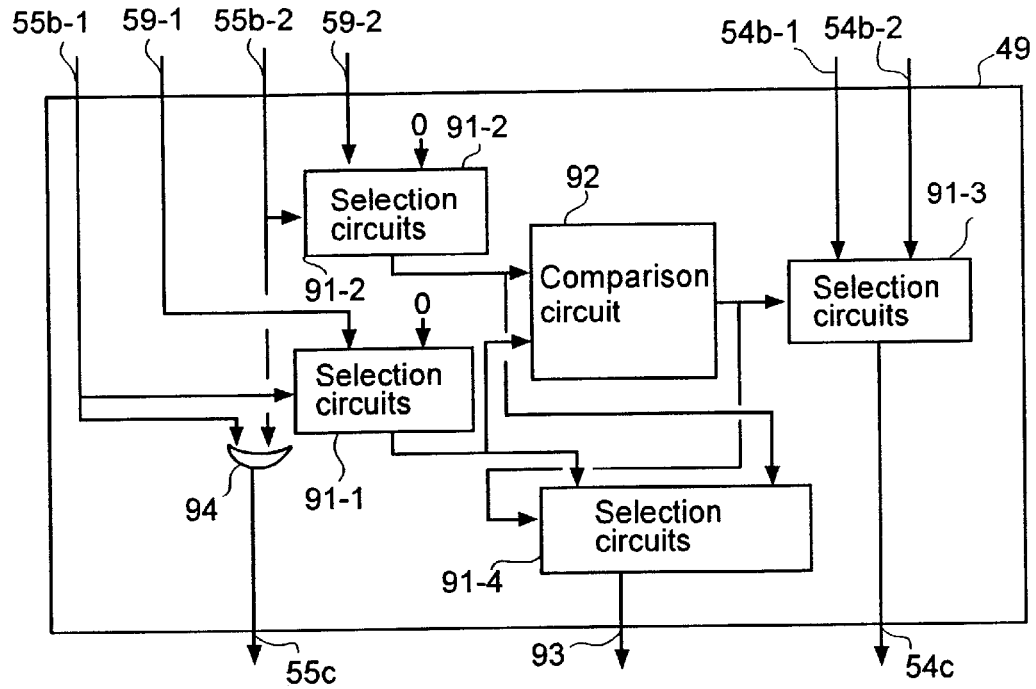
FIG. 10 is a schematic block diagram showing a typical configuration of a priority judgment/selection mechanism of the present invention for selecting one out of two results employed in the connection switching exchange shown in FIG. 9.

FIG. 10 is a diagram showing a typical configuration of the priority judgment/selection mechanism 49 for carrying out the process 143 of the procedure shown in FIG. 12 to determine a search result with a maximum priority employed in the connection switching exchange shown in FIG. 9. In this embodiment, a judgment based on a priority in the process 143 described above is formed to select one of two search results produced by two grouped-search mechanisms 50.

As shown in FIG. 10, the priority judgment/selection mechanism 49 comprises 4 selection circuits 91-1 to 91-4, a comparison circuit 92 and an OR circuit 94. Each of the selection circuits 91 has a select input having a value of 0 or 1 and two selectable inputs to be selected. The selection circuits 91 each have a function to select one of the two selectable inputs in dependence on whether the value of the select input is 0 or 1. The comparison circuit 92 has two inputs: input 1 and input 2 which are each treated as an unsigned integer. The comparison circuit 92 has a function to output a value of 1 for input 1>input 2, or a value of 0 for input 1<=input 2. The selection circuits 91-1 and 91-2 receive, respectively, pieces of search-result valid/invalid information 55b-1 and 55b-2 generated by the 2 grouped-search mechanisms 50 as select signals. As the selectable signals, the selection circuit 91-1 receives the contents of the switching mask register 59-1 and a value of 0, whereas the selection circuit 91-2 receives the contents of the switching mask register 59-2 and a value of 0.

With the search-result valid/invalid information 55b-1 set at 1, the selection circuit 91-1 selects the contents of the switching mask register 59-1. With the search-result valid/invalid information 55b-1 set at 0, on the other hand, the selection circuit 91-1 selects the value of 0. In the same way, with the search-result valid/invalid information 55b-2 set at 1, the selection circuit 91-2 selects the contents of the switching mask register 59-2. With the search-result valid/invalid information 55b-2 set at 0, on the other hand, the selection circuit 91-2 selects the value of 0. The role played by the selection circuits 91-1 and 91-2 is to compute the value of a effective priority level.

As described above, when the search-result valid/invalid information 55b is set at 0 to indicate an invalid result of a search operation, the selection circuit 91-1 or 91-2 outputs the value of 0 representing the minimum priority level, and a pseudo priority level is assigned to the invalid result of the search operation. The effective priority levels output by the selection circuits 91-1 and 91-2 are supplied to the comparison circuit 92. The comparison circuit 92 compares the effective priority levels output by the selection circuits 91-1 and 91-2 with each other, and outputs the result of the comparison to the selection circuit 91-3 as a select input.

The selection circuit 91-3 selects either of 2 pieces of search result information 54b-1 and 54b-2 output by the grouped-search mechanisms 50 to the selection circuit 91-3 in accordance with the result of the comparison supplied thereto by the comparison circuit 92, and outputs the selected search result information to the signal line 54c. More specifically, when the effective priority level computed by the selection circuit 91-1 is higher than that of the selection circuit 91-2, the search result information 54b-1 is selected by the selection circuit 91-3 and output to the signal line 54c. Otherwise, the search result information 54b-2 is selected and output to the signal line 54c.

In addition, the effective priority levels output by the selection circuits 91-1 and 91-2 are also supplied as selectable inputs, and the result of the comparison output by the comparison circuit 92 is also supplied as a select input to the selection circuit 91-4. The selection circuit 91-4 thus selects the higher one between the effective priority levels output by the selection circuits 91-1 and 91-2 and outputs the selected priority level to a signal line 93. The priority level conveyed by the signal line 93 is used for selecting one of results output by three or more grouped-search mechanisms 50 by a judgment on priority levels to be described later.

While the processing to form a judgment on priority levels described above is being carried out, the pieces of search-result valid/invalid information 55b-1 and 55b-2 are also supplied to the OR circuit 94 for taking the logical sum of the pieces of search-result valid/invalid information 55b-1 and 55b-2. The logical sum is output to the signal line 55c to indicate whether the result output by the priority judgment/selection mechanism 49 to the signal line 54c is valid or invalid.

Figure 11:
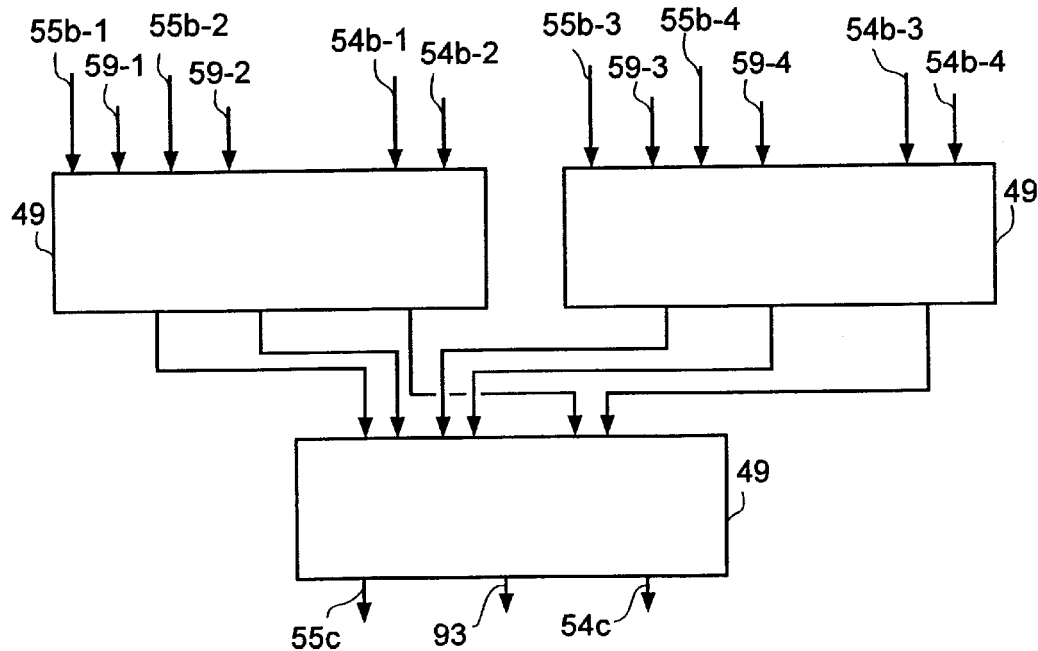
FIG. 11 is a block diagram showing an extended configuration of the priority judgment/selection mechanism of the present invention shown in FIG. 10 for selecting one out of n results.

As described above, FIG. 10 is a diagram showing a typical configuration of an embodiment implementing the priority judgment/selection mechanism 49 for forming a judgment to determine one of the search results output by two grouped-search mechanisms 50. On the other hand, FIG. 11 is a diagram showing an extended configuration obtained by building a hierarchical structure of a plurality of priority judgment/selection mechanisms 49 shown in FIG. 10 for selecting one of the search results output by three or more grouped-search mechanisms 50. It should be noted that the embodiment shown in FIG. 11 implements a selection mechanism to select one of the search results output by four grouped-search mechanisms 50.

Figure 13:
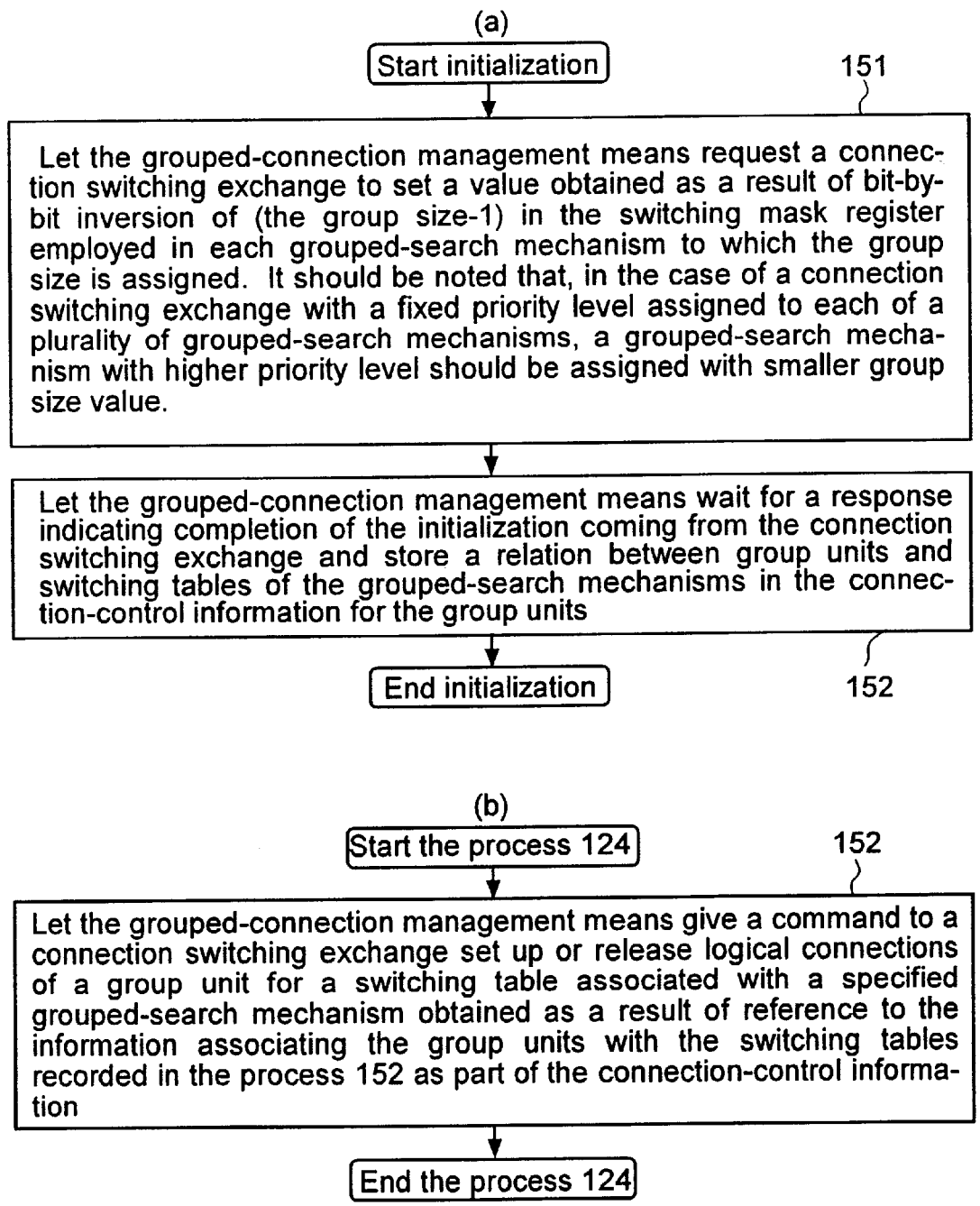
FIG. 13(a) is a flow diagram showing a typical procedure for initialization of priority processing (process 124) provided by the present invention for a plurality of group units carried out by using the connection switching exchange provided by the present invention.
FIG. 13(b) is a flow diagram showing a typical procedure of connection setup/release processing of the priority processing.

Described next with reference to FIG. 13 is an embodiment implementing processing in the process 124 of the procedure shown in FIG. 6, which is carried out to cope with a connection identifier overlapping a plurality of group units by using the connection switching exchange provided by the present invention described with reference to FIGS. 7 to 12. In the present embodiment, the process 124 is implemented by the two procedures shown in FIGS. 13(a) and 13(b). To be more specific, FIG. 13(a) is a diagram showing a procedure for grouped-connection setup/release initialize processing and FIG. 13(b) is a diagram showing a procedure for post-initialization grouped-connection setup/release request processing.

In the procedure of the grouped-connection setup/release initialize processing shown in FIG. 13(a), the grouped-connection management means 18 employed in the network management unit 13 gives a command to connection switching exchanges 1 provided by the present invention, as described with reference to FIGS. 7 to 12, to carry out initialization prior to a command to set up grouped logical connections. The sizes of the group units can each be set only to a power of 2, and, in the initialization, the grouped-connection management means 18 employed in the network management unit 13 gives a command to the connection setup/release mechanisms 10 of the connection switching exchanges 1 of the present invention, as described with reference to FIGS. 7 to 12 by way of the operation-control communication lines 15 to carry out a process 151 shown in FIG. 13(a).

In the case of a connection switching exchange 1 with a fixed priority level assigned to each of a plurality of grouped-search mechanisms 50, a grouped-search mechanism 50 with higher priority level should be assigned with smaller group size value. The connection setup/release mechanism 10 of the connection switching exchange 1 is requested to set a value obtained as a result of bit-by-bit inversion (of the group size-1) in the switching mask register 46 employed in each grouped-search mechanism 50 to which the group size is assigned.

The flow of the procedure then goes on to a process 152 in which the grouped-connection management means 18 employed in the network management unit 13 is waiting for responses indicating completion of the initialization coming from the connection switching exchange 1. The grouped-connection management means 18 stores a relation between group units and switching tables 4 of the grouped-search mechanisms 50 in the connection-control information 30 for the group units as information 36 associating the group units with the switching tables 4.

As described above, FIG. 13(b) is a diagram showing a procedure for post-initialization grouped-connection setup/release request processing, a processing carried out after the grouped-connection setup/release initialization shown in FIG. 13(a). As shown in FIG. 13(b), in a process 153 of the procedure for post-initialization grouped-connection setup/release request processing, by referring to the information 36 associating the group units with the switching tables 4 recorded during the initialization as part of the connection-control information 30, the grouped-connection management means 18 gives a command to connection switching exchanges 1 to carry out processing to set up or release logical connections for a group unit associated with a switching table 4 by specifying a grouped-search mechanism 50 for the associated switching table 4.

The procedures shown in FIG. 13(a) and 13(b) are provided for a communication network comprising connection switching exchanges 1 provided by the present invention suited for the grouped logical connection control provided by the present invention as explained with reference to FIGS. 7, 8, 9 and 10.

Figure 14:
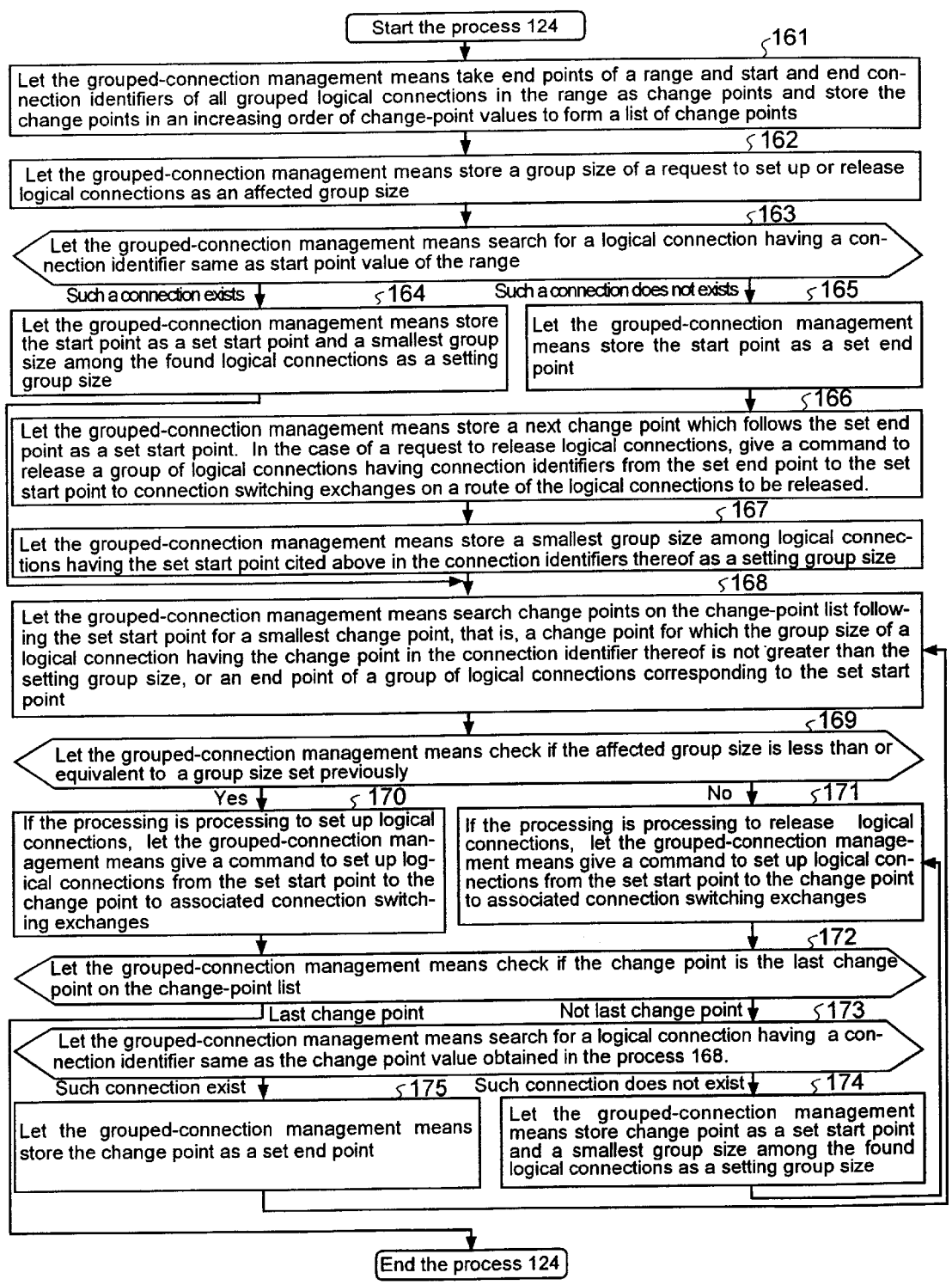
FIG. 14 is a flow diagram showing a typical procedure for connection setup/release processing of the priority processing (process 124) provided by the present invention for a plurality of group units carried out by using the conventional connection switching exchange.

On the other hand, FIG. 14 is a diagram showing a typical procedure of the process 124 of FIG. 6 carried out by using the conventional connection switching exchange having neither a grouped-search mechanism 50 nor priority judgment/selection mechanism 49 for a plurality of group units with a connection identifier overlapping some of the group units.

With use of the conventional connection switching exchange, first of all, in a process 161, the grouped-connection management means employed in the network management unit respectively uses values of the entire connection-identifier space as a range, when setting up logical connections initially, and values of a group of connection identifiers of logical connections to be set up or released as a range, when setting up or releasing the logical connections after the initialization. The end points of the range and the start and end connection identifiers of all grouped logical connections in the range which have been set up or will be set up from now on are taken as change points. The change points are sorted in an increasing order of change-point values to form a list of change points. The flow of the procedure then goes on to a process 162 in which a group size of a request to set up or release logical connections is stored as an affected group size.

Then, the flow of the procedure proceeds to a process 163 in which the grouped-connection management means searches for a logical connection having a connection identifier which is the same as the start point value of the range. If such logical connections exist, the flow of the procedure continues to a process 164 in which the start point is stored as a set start point, and the smallest group size among the found logical connections is stored as a setting group size.

The flow of the procedure then goes on to a process 168. If a logical connection having a connection identifier which is the same as the start point is not found in the search carried out in the process 163, on the other hand, the flow of the procedure proceeds to a process 165 in which the value of the start point is stored as a set end point. The flow of the procedure then continues to a process 166 to store the next change point, which follows the set end point in the change-point list and has a value different from the set end point, as a set start point. In the case of a request to release logical connections, a command to release a group of logical connections having connection identifiers from the set end point to the set start point is given to connection switching exchanges on a route of the logical connections to be released. Then, the flow of the procedure goes on to a process 167 in which a smallest group size among logical connections having the set start point cited above in the connection identifiers thereof is stored as a setting group size.

Subsequently, the flow of the procedure proceeds to the process 168 in which change points on the change-point list following the set start point are sequentially checked to search for a smallest change point. A smallest change point is a change point with minimum value following the current change point for which the group size of a logical connection having a connection identifier equivalent to the check point value thereof which is not greater than the setting group size, or an end point of a group of logical connections corresponding to the set start point.

The flow of the procedure then continues to a process 169 in which the affected group size stored in the process 162 is compared with a group size set previously. If the affected group size is equal to or smaller than the previously set group size and the processing is a processing to set up logical connections, the flow of the procedure goes on to a process 170 in which a command to set up logical connections from the set start point to the change point is issued to associated connection switching exchanges. If the affected group size is greater than the previously set group size and the processing is a processing to release logical connections, on the other hand, the flow of the procedure goes on to a process 171 in which a command to set up logical connections from the set start point to the change point is issued to associated connection switching exchanges. The flow of the procedure then proceeds to a process 172 to check if the change point is the last change point on the change-point list. If the change point is the last point, the processing is ended.

If the change point is found in the checking process 172 to be not the last point, on the other hand, the flow of the procedure continues to a process 173 in which a logical connection having the connection identifier equivalent to the change point value obtained in the process 168 thereof is searched for. If such logical connections are found, the flow of the procedure proceeds to a process 174 in which the change point is stored as a set start point, and the smallest group size among the found logical connections is stored as a setting group size. The flow of the procedure then returns to the process 168. If a logical connection having the connection identifier equivalent to the change value point obtained in the process 168 in the connection identifier thereof is not found in the process 173, on the other hand, the flow of the procedure continues to a process 175 in which the change point is stored as a set end point. The flow of the procedure then returns to the process 166.

Figure 15:
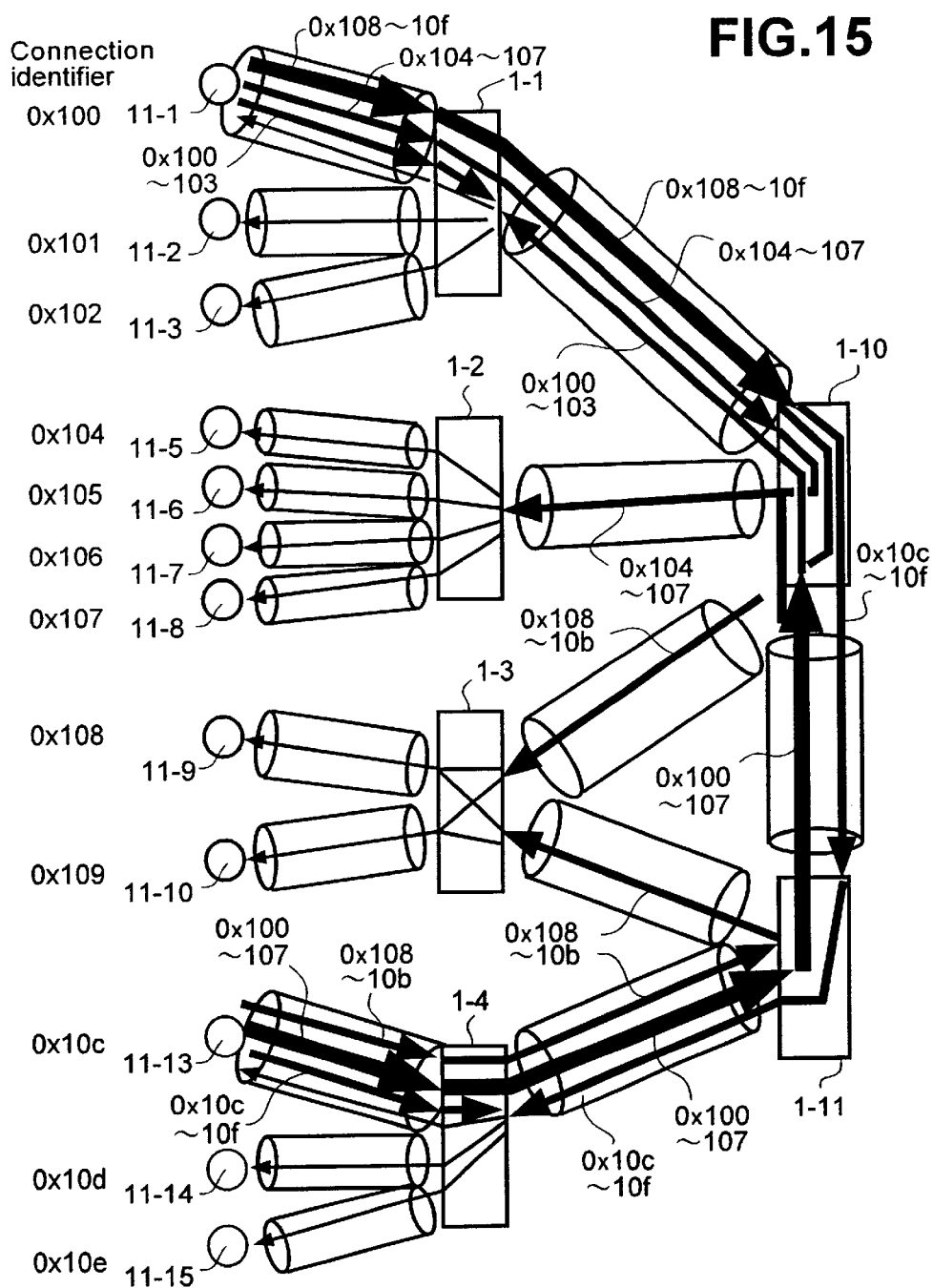
FIG. 15 is a diagram showing a partial configuration of one-directional logical connections between terminating nodes using logical connections controlled in group units in accordance with the present invention.

The following is a description of an example of an application using control of logical connections provided by the present invention to one-directional logical connections among terminating nodes, with reference to FIG. 15.

In order to make the diagram simple, FIG. 15 shows a partial state in which only some terminating nodes 11 in a communication network are connected to each other by one-directional logical connections. More specifically, the figure is a diagram showing an embodiment implementing a communication network wherein only terminating nodes 11-1 and 11-13 are connected to other terminating nodes 11 in the network by one-directional logical connections 3.

As shown in the figure, the embodiment implementing a communication network comprises twelve terminating nodes 11, that is, terminating nodes 11-1 to 11-3, 11-5 to 11-10 and 11-13 to 11-15, four edge connection switching exchanges 1, that is, connection switching exchanges 1-1 to 1-4, and two relay connection switching exchanges 1-10 and 1-11 which are connected to each other by communication lines 2. One-directional logical connections among the terminating nodes 11 in this embodiment are set using the initial connection setting specifying information 22 during initialization. The one-directional logical connections among the terminating nodes 11 each have a unique connection identifier for each destination terminating node 11. In other words, logical connections between source terminating nodes 11 and a destination terminating node 11 have the same connection identifier. Thus, the connection identifiers form so-called multipoint-to-point connections. For example, all logical connections toward the terminating node 11-1 have a connection identifier of Ox100 and all logical connections toward the terminating node 11-2 have a connection identifier of Ox101. Now pay attention to the logical connection toward the terminating node 11-2. A logical connection from the terminating node 11-1 to the terminating node 11-2 by way of the connection switching exchange 1-1 and a logical connection from the connection switching exchange 1-10 to the terminating node 11-2 by way of the connection switching exchange 1-1 are merged at the connection switching exchange 1-1 as the connection identifier Ox101. It should be noted that value of a connection identifier is expressed by a string of characters starting with the characters Ox to indicate that the rest is a number expressed in the hexadecimal format.

Figure 16:
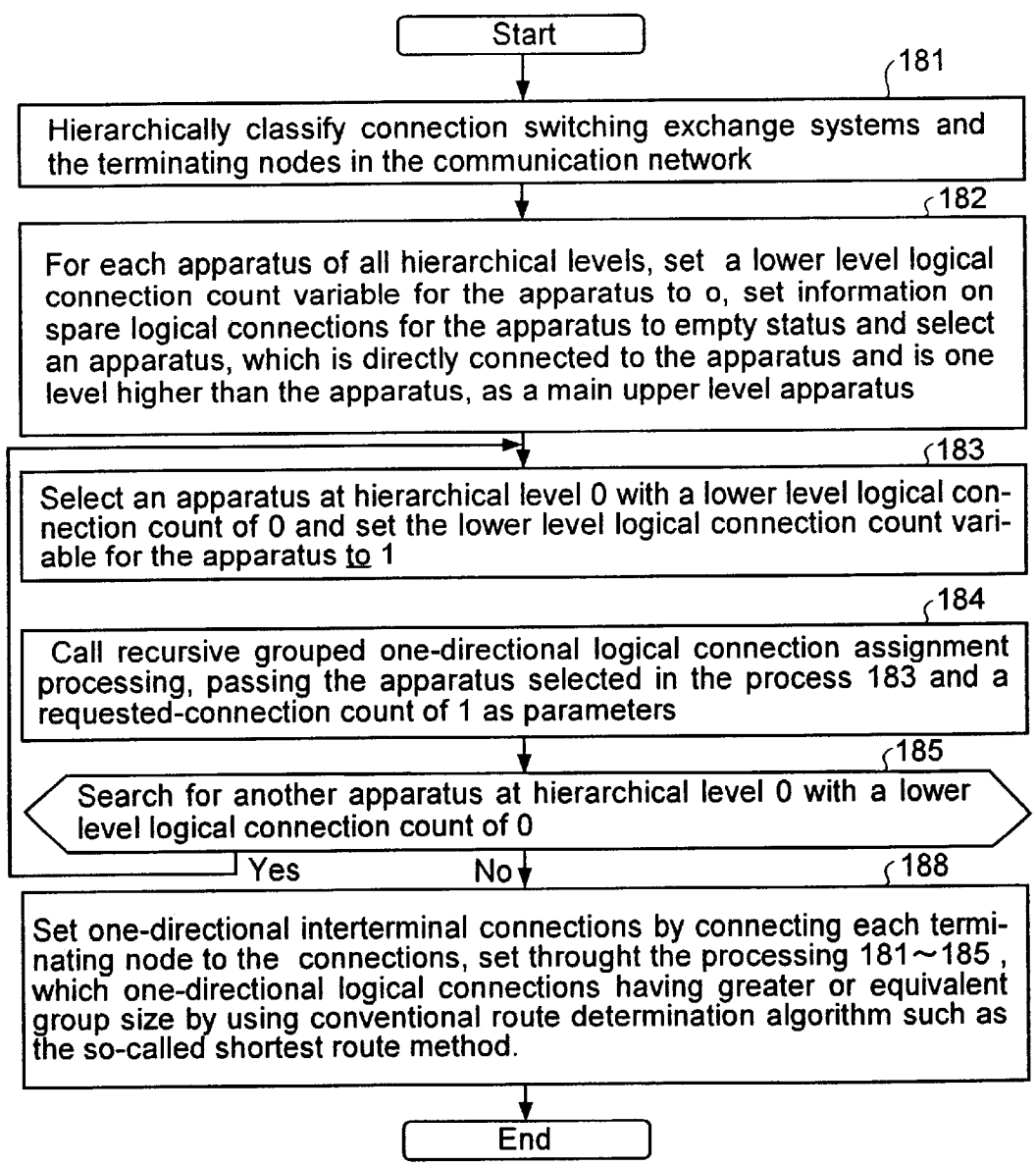
FIG. 16 is a flow diagram showing a typical processing procedure provided by the present invention to set up a one-directional logical connection between terminating nodes using logical connections controlled in group units in accordance with the present invention.

In addition, one-directional connections are implemented as grouped logical connections. FIG. 16 is a diagram showing a typical processing procedure provided by the present invention to set up a one-directional logical connection between terminating nodes using logical connections controlled in group units in accordance with the present invention.

Figure 17:
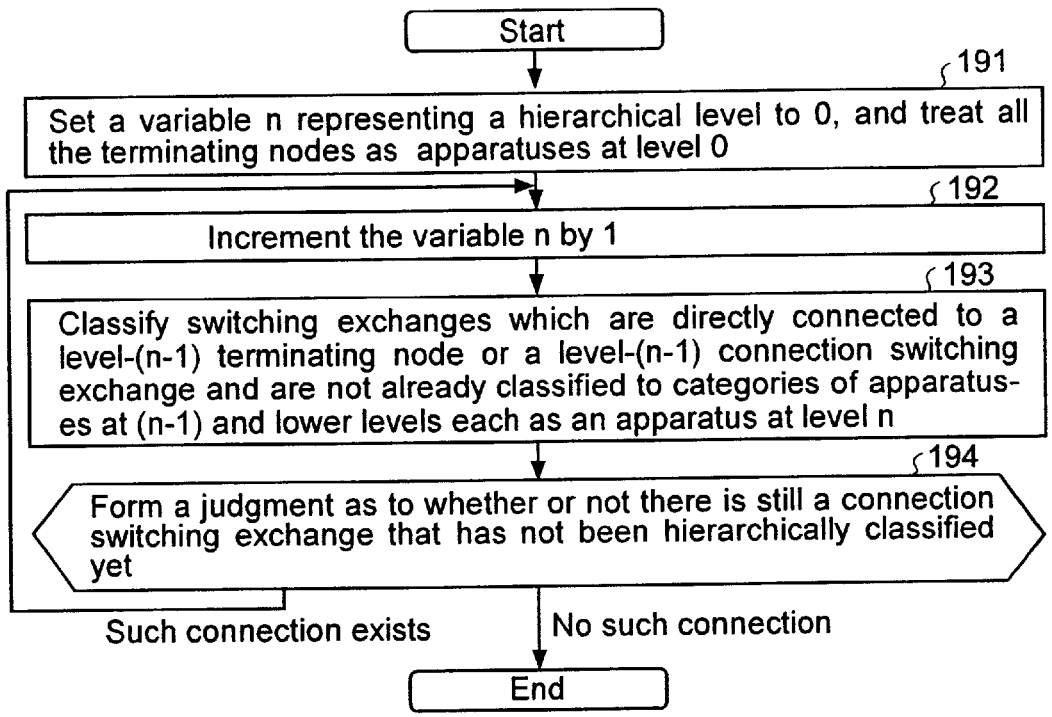
FIG. 17 is a flow diagram showing a typical processing procedure provided by the present invention to hierarchically classify apparatuses in a communication network as part of the processing shown in FIG. 16.

As shown in FIG. 16, the procedure begins with a process 181 in which the connection switching exchanges 1 and the terminating nodes 11 in the communication network are hierarchically classified by a procedure shown in FIG. 17. The flow of the procedure then goes on to a process 182 in which a lower level logical connection count variable for each apparatus at each hierarchical level is set to 0. A lower level logical connection count variable for each apparatus is used for storing the number of logical connections from the apparatus to apparatuses at levels lower than the apparatus in the hierarchy. Information on spare logical connections for each apparatus is made empty to indicate that there is no spare logical connection. In addition, a main upper level apparatus for each apparatus is selected from apparatuses one level higher than each apparatus in the hierarchy considering the importance of the connection relation between the apparatus and the main upper level apparatus. Then, the flow of the procedure proceeds to a process 183 in which a terminating node 11 at hierarchical level O with a lower level logical connection count of O is selected, and the lower level logical connection count variable for the apparatus is set to 1.

Subsequently, the flow of the procedure continues to a process 184 to call recursive processing for grouped one-directional logical connection assignment shown in FIG. 18, passing the terminating node 11 selected in the process 183 and a requested-connection count of 1 as parameters. The call sets up one-directional logical branch connections using grouped connections from higher to lower nodes in a tree hierarchy where connection switching exchanges 1 are hierarchically connected to the terminating node passed as a parameter.

The flow of the procedure then continues to a process 185 to search for another terminating node 11 at hierarchical level O with a lower level logical connection count of O for which no logical connection has been set up. If such a terminating node 11 is found, the flow of the procedure returns to the process 183. If such a terminating node 11 is not found, on the other hand, the flow of the procedure goes on to a last process 188. In the processing including the process 185 described so far, all terminating nodes are connected with one-directional grouped logical connections from higher to lower nodes in the hierarchy. Thus, in the last process 188, by adoption of the conventional route determination algorithm, such as the so-called shortest route method, meshed one-directional interterminal connections are set by connecting each terminating node to the connections, set through the processes 181–185, with one-directional logical connections having a greater or equivalent group size.

The hierarchical classification of the process 181 shown in FIG. 16 is carried out in accordance with a procedure shown in FIG. 17. As shown in FIG. 17, the procedure begins with a process 191 in which a variable n representing a hierarchical level is set to 0, and all the terminating nodes 11 are classified each as an apparatus at level 0. The flow of the procedure then goes on to a process 192 at which the variable n is incremented by 1. Then, the flow of the procedure proceeds to a process 193 in which connection switching exchanges 1 in the communication network, that are directly connected to a level-(n−1) terminating node 11 or a level-(n−1) connection switching exchange and do not pertain to categories of apparatuses at (n−1) and lower levels, are each classified as an apparatus at level n. Subsequently, the flow of the procedure proceeds to a process 194 to form a judgment as to whether or not there is still a connection switching exchange 1 in the communication network that has not been classified yet. If there is still a connection switching exchange 1 in the communication network that has not been classified yet, the flow of the procedure returns to the process 192.

The processes 192 to 194 are carried out repeatedly until there is no longer a connection switching exchange in the communication network that has not been classified yet. After the hierarchical classification is finished, in the communication network shown in FIG. 15, for example, all the terminating nodes 11 are each classified as an apparatus at level 0, the edge connection switching exchanges 1-1, 1-2, 1-3 and 1-4 directly connected to the terminating nodes 11 are each classified as an apparatus at level 1, and the connection switching exchanges 1-10 and 1-11 connected to the edge connection switching exchanges 1-1, 1-2, 1-3 and 1-4 are each classified as an apparatus at level 2.

Figure 18:
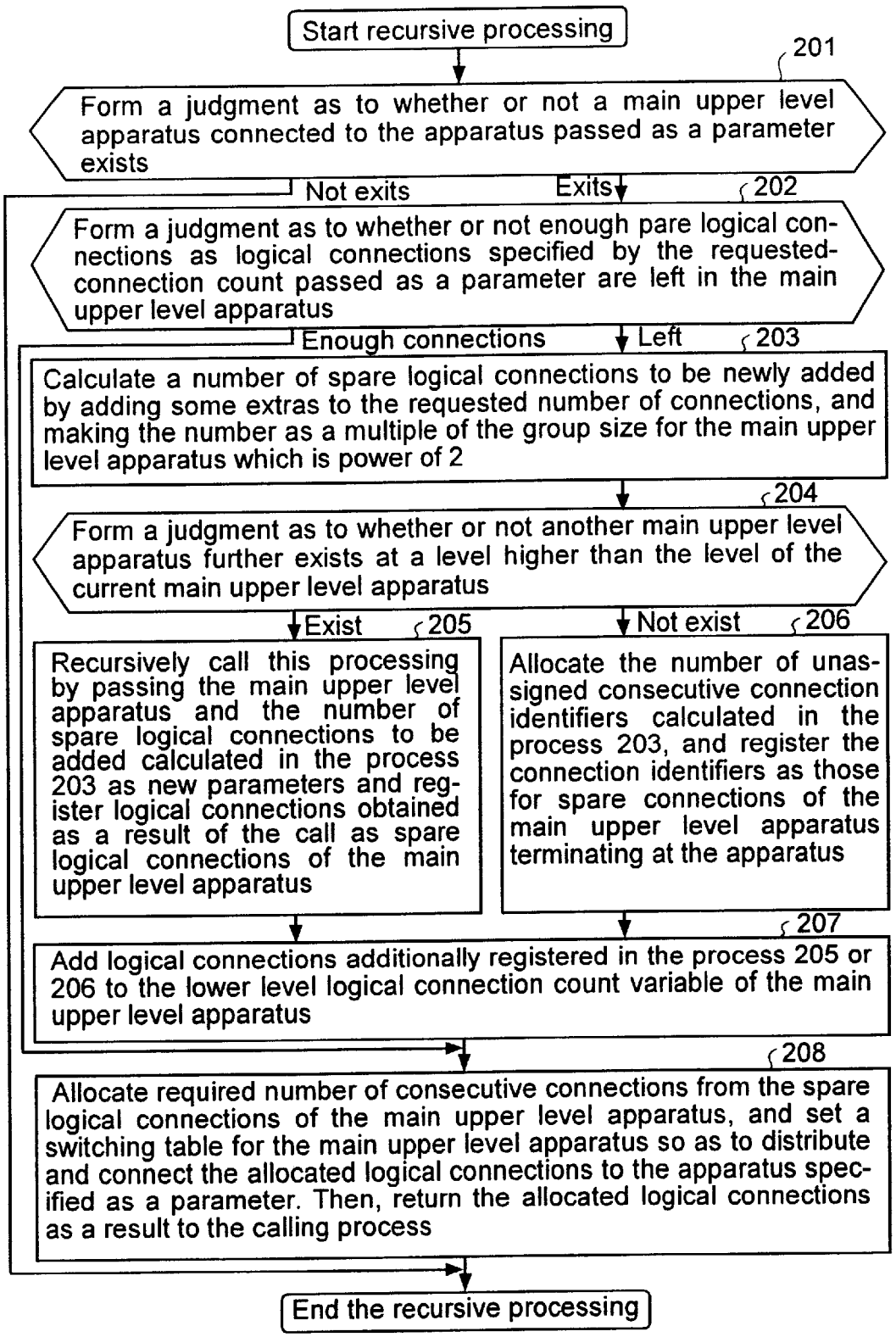
FIG. 18 is a flow diagram showing a typical processing procedure provided by the present invention to assign one-directional logical connections to the same branch tree as part of the processing shown in FIG. 16.

FIG. 18 is a diagram showing a typical processing procedure called in the process 184 shown in FIG. 16 to set up one-directional logical connections using grouped logical connections toward lower hierarchical levels. As shown in FIG. 18, the procedure begins with a process 201 to form a judgment as to whether or not an upper level apparatus connected to the apparatus passed as a parameter exists. If a main upper level apparatus does not exist, the processing is finished. If a main upper level apparatus exists, on the other hand, the flow of the procedure goes on to a process 202 to form a judgment as to whether or not enough spare logical connections are left in the main upper level apparatus for a request specified by the requested-connection count passed as a parameter. If enough spare logical connections are left, the flow of the procedure jumps to a process 208. If enough spare logical connections are not available, on the other hand, processes 203 to 207 are carried out to allocate additional spare logical connections.

In the process 203, a number of spare logical connections to be newly allocated are calculated by adding some extras to the requested number of connections, and by making the number a multiple of the connection group size for the main upper level apparatus, which is a power of 2. The flow of the procedure goes on to a process 204 to form a judgment as to whether or not another main upper level apparatus further exists at a level higher than the level of the current main upper level apparatus. If such a main upper level apparatus exists, the flow of the procedure proceeds to a process 205 to recursively call this processing shown in FIG. 18 by passing the main upper level apparatus and the number of spare logical connections to be added calculated in the process 203 as new parameters. Connections obtained as a result of the call are registered as spare logical connections of the main upper level apparatus. If the outcome of the judgment formed in the process 204 indicates that such a main upper level apparatus does not exist, on the other hand, the flow of the procedure proceeds to a process 206 in which unassigned consecutive connection identifiers are allocated, as many as calculated in the process 203, and the allocated connection identifiers are registered as those for spare connections of the main upper level apparatus terminating the spare connections at the main upper level apparatus. The flow of the procedure then continues to a process 207 in which spare logical connections additionally registered in the process 205 or 206 are added to the lower level logical connection count variable of the main upper level apparatus indicating totally allocated connections for lower levels.

The processes 202 to 207 assure that as many logical connections as required are registered as spare logical connections. Thus, in a process 208 following the process 207, the requested number of consecutive logical connections are finally allocated from the spare logical connections of the main upper level apparatus, and a switching table for the main upper level apparatus specified as a parameter is set so as to distribute and connect the allocated logical connections to the apparatus. The allocated logical connections are returned as a result to the calling process before finally finishing the processing.

Consider the processing described above by focusing on the connection switching exchange 1-1 shown in FIG. 15. The connection switching exchange 1-1 which is an apparatus at level 1 is connected to the three terminating nodes 11-1, 11-2 and 11-3, apparatuses at level 0. Thus, in the process 206, with a connection identifier Ox100 used as a connection identifier for the terminating node 11-1, consecutive connection identifiers of Ox101 and Ox102 are assigned to the terminating nodes 11-2 and 11-3 following the terminating node 11-1. In addition, since the group size is set to four in the present embodiment, grouped logical connections having connection identifiers Ox100 to Ox103 are set from the connection switching exchange 1-10 toward the connection switching exchange 1-1 in the process 206. In particular, connection identifiers Ox100 to Ox102 are distributed and connected to the terminating nodes 11-1 to 11-3, respectively.

In addition, in the connection switching exchange 1-10, logical connections with connection identifiers Ox104 to Ox107 toward the connection switching exchange 1-2 are gathered with logical connections with connection identifiers Ox108 to Ox10b toward the connection switching exchange 1-3. Furthermore, in the process 188, the terminating node 11-13 is connected to the connection switching exchange 1-2 in this embodiment by a group of logical connections having a greater group size of eight using connection identifiers Ox100 to Ox107.

That is to say, the embodiment described above is characterized by the following. For i>=1, one-directional interterminal logical connections from an apparatus at a hierarchical level i to apparatuses at a hierarchical level i−1 have consecutive connection identifiers. In addition, in an apparatus at level i, a proper number of connection identifiers are reserved for future expansion of connection of apparatuses. The total number of connection identifiers assigned to one-directional interterminal logical connections from an apparatus at level i to apparatuses at level i−1 including the reserved ones is made equal to a multiple of a group unit, and the connection identifiers for the logical connections are assigned in the group unit. A group of logical connections having the connection identifiers assigned thereto are set in the group unit from all apparatuses at level i+1 directly connected to an apparatus at level i to the apparatus at level i. At a connection switching exchange at level i, a group of logical connections from apparatuses at level (i+1) to an apparatus at level i are distributed to be connected to logical connections or a group of logical connections from the apparatus at level i to apparatuses at level i−1. In addition, in order to setup meshed interterminal connections, one-directional logical connections are connected from each terminating node to the logical connections, which are set in group units from high to low hierarchical layers as described above, in a connection-group unit equal to or greater than that for the connections from high to low layers.

The embodiment shown in FIG. 15 adopts a method whereby, in the process 188, for logical connections from each terminating node 11, a group unit of eight is used and, in each connection switching exchange 1, there is no overlap of connection-switching information on logical connections among group units. In the grouping technique described above, whereby connection-switching information on a group of logical connections with a small group unit takes precedence of connection-switching information on a group of logical connections with a large group unit, however, it is possible to adopt a method in which pieces of connection-switching information overlap each other among grouped logical connections in a connection switching exchanges 1.

Figure 19:
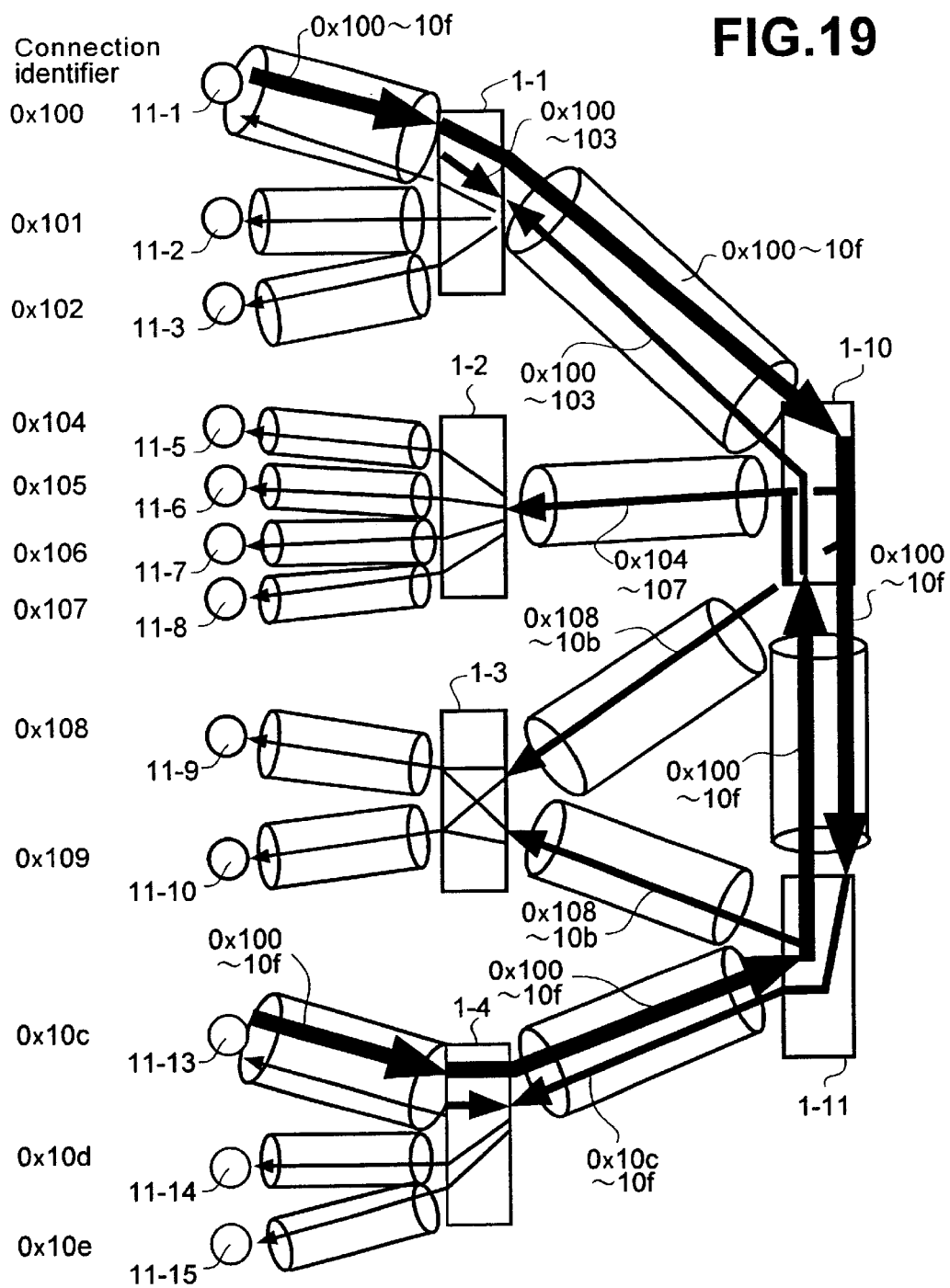
FIG. 19 is a diagram showing another partial configuration of one-directional logical connections between terminating nodes using logical connections controlled in group units in accordance with the present invention.

FIG. 19 is a diagram showing another partial configuration of one-directional logical connections between terminating nodes using logical connections controlled in group units wherein, in the process 188, by using a group size of sixteen, one-directional logical connections from higher to lower level apparatuses are connected from each terminating node 11 using logical connections in the group unit of sixteen. In this embodiment, for example, at the connection switching exchange 1-1, logical connections in the group unit of sixteen having connection identifiers Ox100 to Ox10f are switched from the terminating node 11-1 to the terminating node 11-10 through the connection switching exchange 11-1. On the other hand, logical connections switched from the terminating node 11-1 to the terminating nodes 11-1, 11-2 and 11-3 also through the connection switching exchange 1-1 are set up by using logical connections with connection identifiers Ox100, Ox100 and Ox102 respectively each having a group size of 1. Thus, the connection identifiers Ox100, Ox101 and Ox102 overlap with those in the different group units. In this case, the connection identifiers Ox100, Ox101 and Ox102 in the latter group unit take precedence, causing the switching-unit information in the former group unit with a value of sixteen to be ignored.

The embodiment described above shows a typical implementation of one-directional logical connections among the terminating nodes 11. It should be noted, however, that the embodiment can also be applied to a case wherein the level of each apparatus is virtually lowered by 1 layer with apparatuses at level 1 each considered to be a terminating node, and one-directional meshed logical connections are set up among edge connection switching exchanges.

Figure 20:
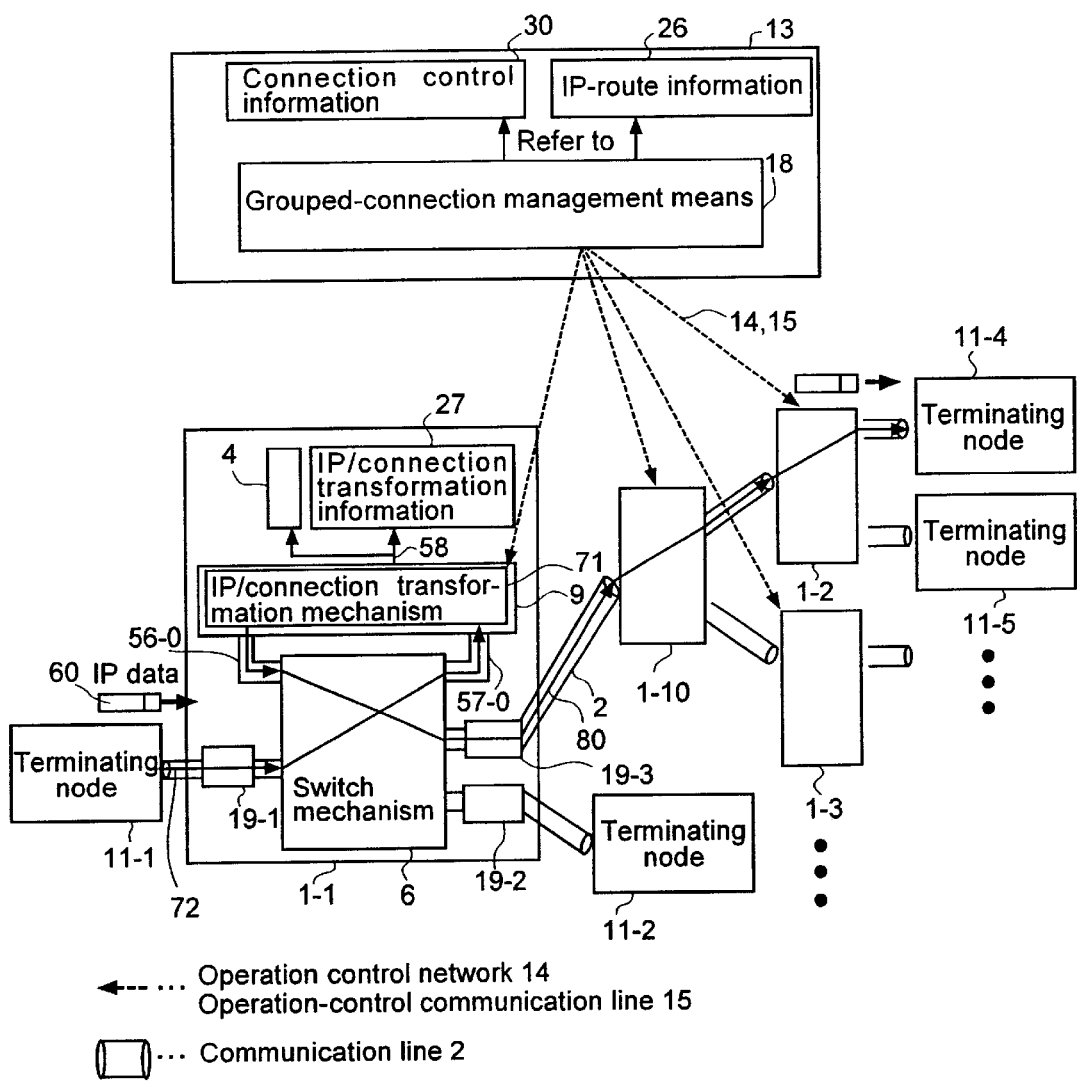
FIG. 20 is a schematic block diagram showing a typical technique provided by the present invention to transmit IP data packets through one-directional logical connections between terminating nodes using logical connections controlled in group units in accordance with the present invention.

Next, control of routes traveled by IP data using one-directional logical connections among terminating nodes 11 will be explained with reference to FIGS. 20, 21 and 22.

In the first place, the network management unit 13 is provided with IP-route information 26 showing which terminating node or nodes 11 are indicated by a destination IP address or a group of destination IP addresses included in IP data, that is, which terminating node or nodes 11 the IP data with a destination IP address or a group of destination IP addresses should be transmitted to, or which terminating node or nodes 11 IP data should be transmitted through. During initialization, the grouped-connection management means 18 employed in the network management unit 13 carries out processing in accordance with a procedure shown in FIG. 21 by using the IP-route information 26.

Figure 21:
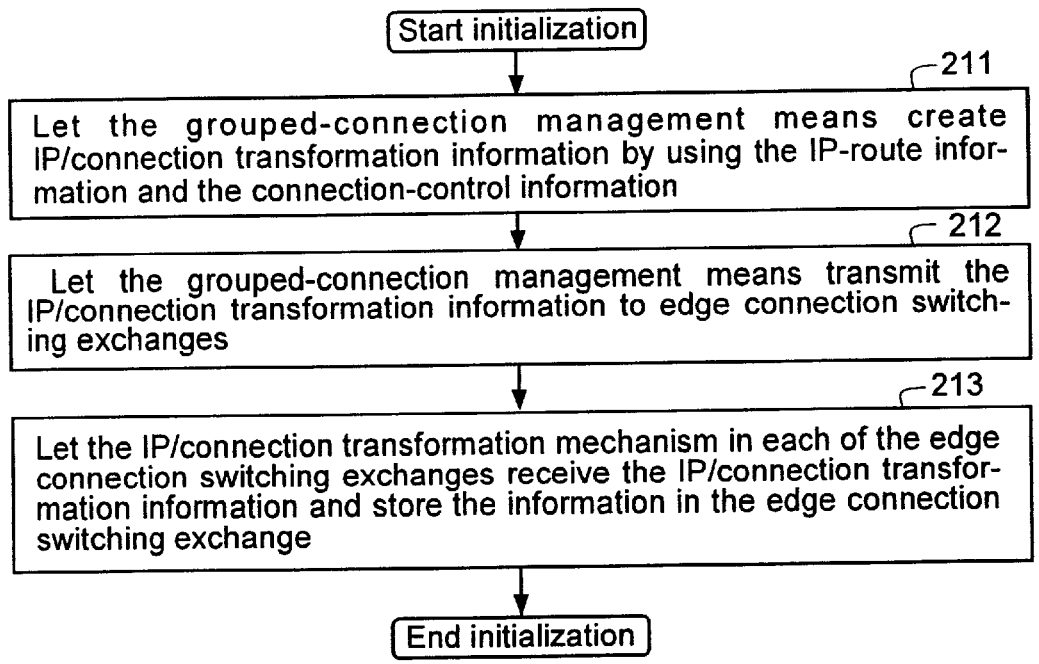
FIG. 21 is a flow diagram showing a typical procedure for initialization of the technique provided by the present invention to transmit IP data packets through one-directional logical connections between terminating nodes using logical connections controlled in group units in accordance with the present invention shown in FIG. 20.

As shown in FIG. 21, the procedure for initialization begins with a process 211 in which the grouped-connection management means 18 employed in the network management unit 13 creates IP/connection transformation information 27 by using the IP-route information 26 and the connection-control information 30. The IP/connection transformation information 27 is used for transforming an IP address or a group of IP addresses into connection identifiers of one-directional interterminal logical connections toward destination terminating nodes 11 which were set up among terminating nodes 11 during the initialization.

The flow of the procedure then goes on to a process 212 in which the grouped-connection management means 18 employed in the network management unit 13 transmits the IP/connection transformation information 27 to edge connection switching exchanges 1 directly connected to the terminating nodes 11 through the operation-control communication lines 15. Each of the edge connection switching exchanges 1 is provided with an IP/connection transformation mechanism 71 as part of the control mechanism 9. In a process 213 following the process 212, the IP/connection transformation mechanism 71 receives the IP/connection transformation information 27 and stores the information 27 in the edge connection switching exchange 1 by way of a signal line 58.

Figure 22:
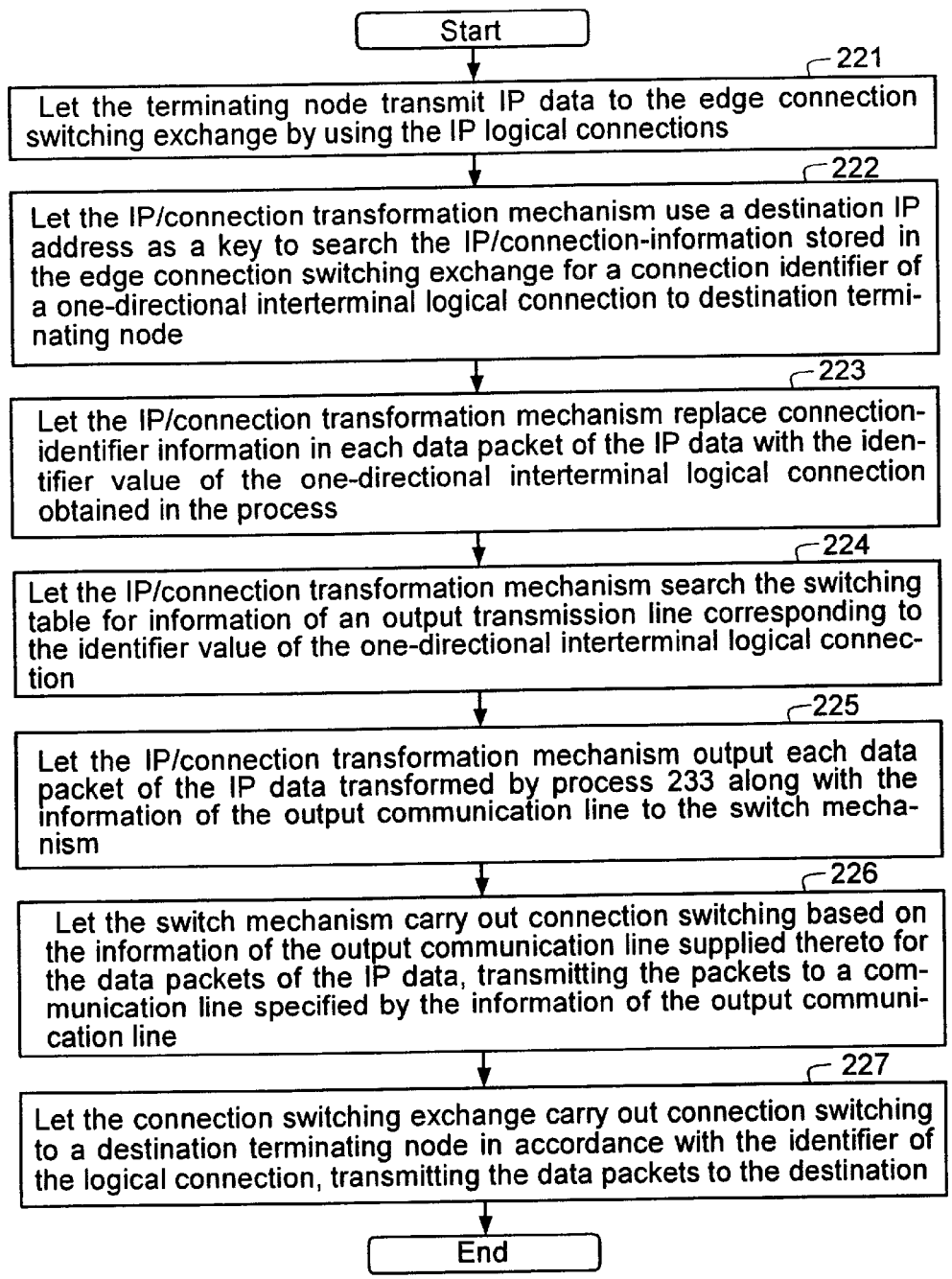
FIG. 22 is a flow diagram showing a typical transmission procedure for the technique provided by the present invention to transmit IP data packets through one-directional logical connections between terminating nodes using logical connections controlled in group units in accordance with the present invention shown in FIG. 20.

FIG. 22 is a diagram showing a typical transmission procedure for controlling a route of an IP data packet through a one-directional logical connection between terminating nodes 11 using a logical connection after the initialization shown in FIG. 21. As shown in FIG. 22, the procedure begins with a process 221 in which the terminating nodes 11 transmit IP data to the edge connection switching exchange by using the IP logical connections 72. The IP/connection transformation mechanism 71 is connected to terminating nodes 1 to which the edge connection switching exchange is linked directly by using IP logical connections 72 having predefined connection identifiers for IP processing. The flow of the procedure then goes on to a process 222 in which, upon receiving IP data from a terminating node 11, the IP/connection transformation mechanism 71 uses a destination IP address recorded in the IP header of the IP data received from a terminating node 11 as a key to search the IP/connection-information 27 stored in the edge connection switching exchange for a connection identifier of a one-directional interterminal logical connection 80 toward a destination terminating node 11.

Then, the flow of the procedure proceeds to a process 223 in which the IP/connection transformation mechanism 71 replaces connection-identifier information 62 in each data packet 60 of the IP data with the identifier value of the one-directional interterminal logical connection 80 obtained in the process 222. Subsequently, the flow of the procedure continues to a process 224 in which the IP/connection transformation mechanism 71 searches the switching table 4 through the signal line 58 for information on an output transmission line corresponding to the identifier value of the one-directional interterminal logical connection 80.

The flow of the procedure then goes on to a process 225 in which the IP/connection transformation mechanism 71 outputs each data packet 60 of the IP data with the connection-identifier information 62 thereof replaced by the identifier value of the one-directional interterminal logical connection 80 along with the information on the output communication line to the switch mechanism 6 by way of a communication line 56-0. Then, the flow of the procedure proceeds to a process 226 in which the switch mechanism 6 carries out connection switching based on the information on the output communication line supplied thereto for the data packets 60 of the IP data, whereby the packets 60 are transmitted to a communication line 2 specified by the information on the output communication line. Finally, the flow of the procedure continues to a process 227 in which each of the connection switching exchanges 1 carries out connection switching to a one-directional interterminal logical connection 80 to a destination terminating node 11 in accordance with the identifier of the logical connection 80, whereby the data packets 60 are transmitted to the destination.

Figure 23:
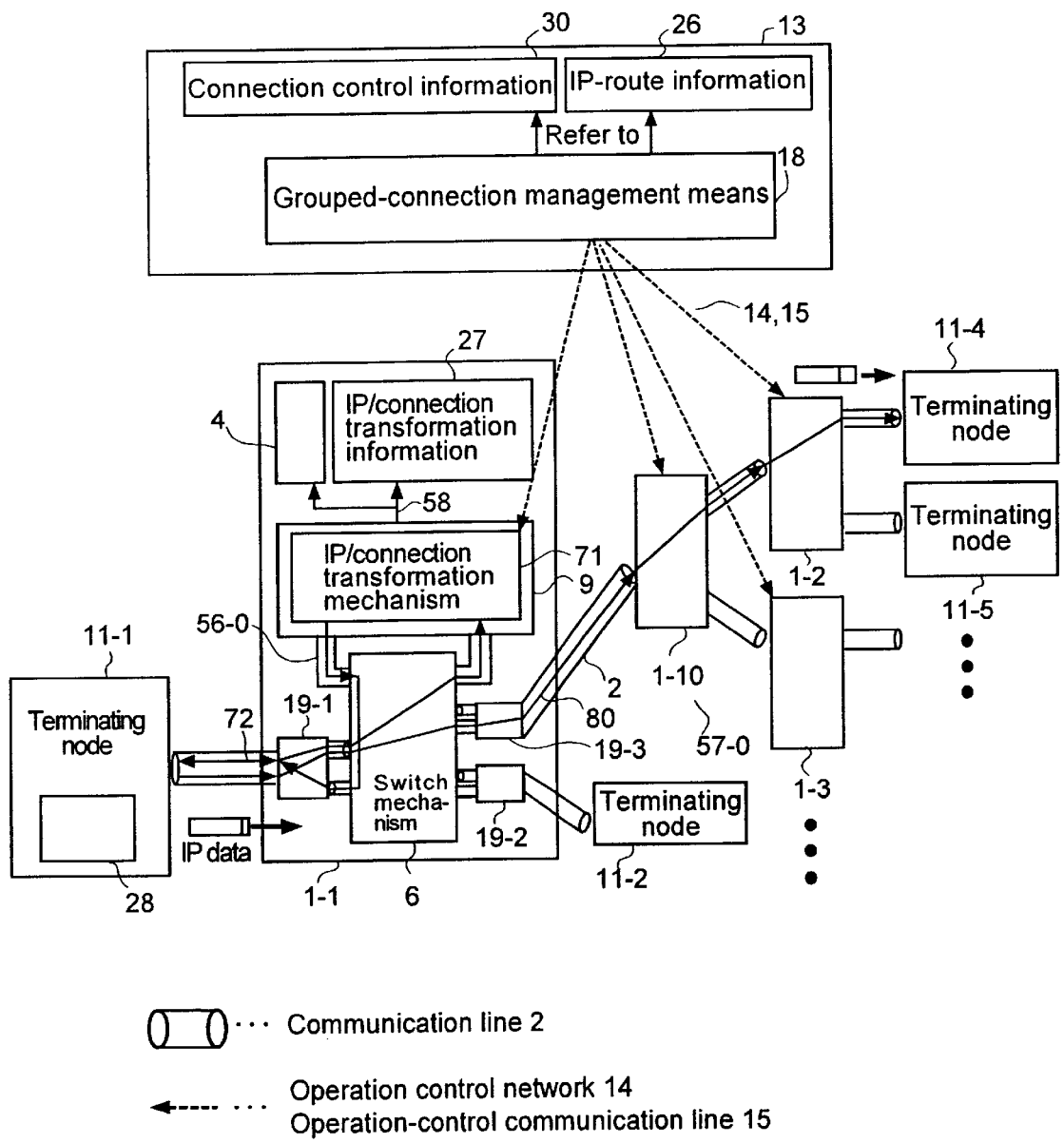
FIG. 23 is a schematic block diagram showing another typical configuration of a communication network provided by the present invention to transmit IP data packets through one-directional logical connections between terminating nodes using logical connections controlled in group units in accordance with the present invention.
Figure 24:
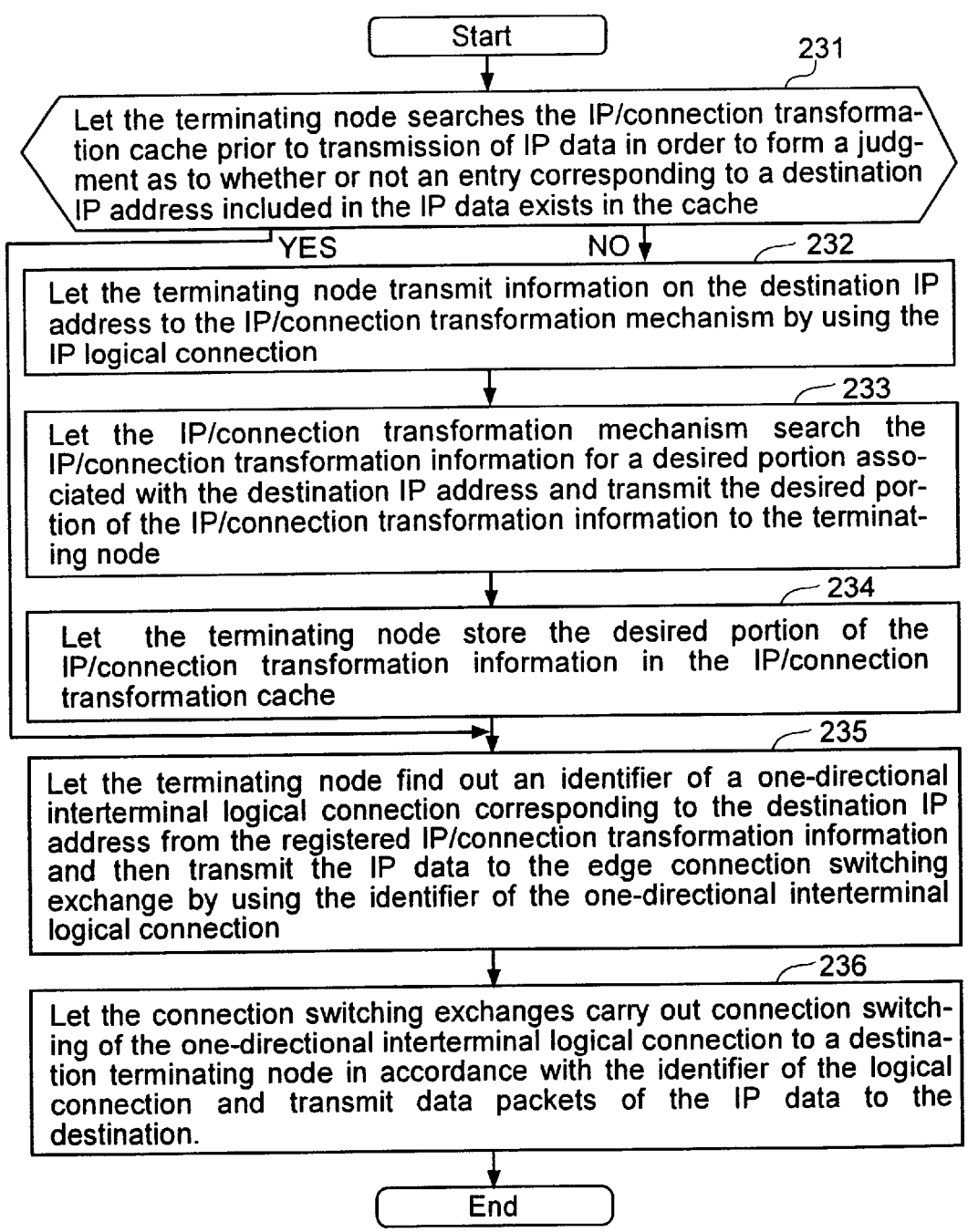
FIG. 24 is a flow diagram showing a typical transmission procedure to transmit IP data packets through one-directional logical connections between terminating nodes using logical connections controlled in group units adopted by the communication network shown in FIG. 23 in accordance with the present invention.

In the embodiment described above, the IP/connection transformation mechanism 71 employed in each of the edge connection switching exchanges 1 directly transfers IP data. It should be noted that it is also possible to provide another embodiment in which the IP/connection transformation mechanism 71 supplies only IP/connection transformation information 27 for transforming an IP address into an identifier of a one-directional interterminal logical connection. In this case, first of all, a terminating node 11 obtains the IP/connection transformation information 27 from the IP/connection transformation mechanism 71. Then, after transforming a destination IP address of IP data to be transmitted into an identifier of a desired one-directional interterminal logical connection, the terminating node 11 transmits the IP data to the destination by using the identifier of the one-directional interterminal logical connection. FIG. 23 is a diagram showing a typical configuration of a communication network for this embodiment provided by the present invention to transmit an IP data packet through one-directional logical connections between terminating nodes using logical connections controlled in group units, and FIG. 24 is a diagram showing a typical transmission procedure adopted by the communication network shown in FIG. 23.

As shown in FIG. 23, each of the terminating nodes 11 is provided with an IP/connection transformation cache 28 for storing some of the IP/connection transformation information 27 used for transforming a destination IP address of IP data transmitted in the past. As for the procedure shown in FIG. 24, the flow begins with a process 231 in which the terminating node 11 searches the IP/connection transformation cache 28 prior to transmission of IP data in order to form a judgment as to whether or not an entry corresponding to a destination IP address included in the IP data exists in the cache 28.

If such an entry does not exist in the IP/connection transformation cache 28, the flow of the procedure goes on to a process 232 in which the terminating node 11 transmits information on the destination IP address to the IP/connection transformation mechanism 71 employed in the edge connection switching exchange 1 directly connected to the terminating node 11 by using the IP logical connection 72 in order to obtain IP/connection transformation information 27. Then, the flow of the procedure proceeds to a process 233 in which, upon receiving the information on the destination IP address, the IP/connection transformation mechanism 71 searches the IP/connection transformation information 27 stored in the edge connection switching exchange for a desired portion associated with the destination IP address, and transmits the desired portion of the IP/connection transformation information 27 to the terminating node 11, which requested the information, as a result of the search operation.

Subsequently, the flow of the procedure continues to a process 234 in which the terminating node 11 stores the desired portion of the IP/connection transformation information 27 transmitted by the IP/connection transformation mechanism 71 in response to the destination IP address in the IP/connection transformation cache 28. Upon completion of the processes 232, 233 and 234, desired IP/connection transformation information 27 is cataloged in the IP/connection transformation cache 28.

The flow of the procedure then goes on to a process 235 in which the terminating node 11 finds out an identifier of a one-directional interterminal logical connection 80 corresponding to the destination IP address from the cataloged IP/connection transformation information 27 and then transmits the IP data to the edge connection switching exchange 1 by using the identifier of the one-directional interterminal logical connection 80. Then, the flow of the procedure continues to a process 236 in which each of the connection switching exchanges 1 carries out connection switching of the one-directional interterminal logical connection 80 to a destination terminating node 11 in accordance with the identifier of the logical connection 80, and transmits data packets 60 of the IP data to the destination.

In the embodiments shown in FIGS. 23 and 24, only part of the IP/connection transformation information 27 is stored in the IP/connection transformation cache 28. It should be noted, however, that a terminating node 11 may serve as a gateway connected to an external network. In this case, the IP/connection transformation cache 28 is used for storing the entire IP/connection transformation information 27. Thus, in place of the processes 232 to 234 shown in FIG. 24, in which only a desired portion of the IP/connection transformation information 27 is acquired dynamically, the terminating node 11 makes a request to an edge connection switching exchange 1 connected directly to the terminating node 11 to transmit the entire IP/connection transformation information 27 during initialization of the terminating node 11 so that it is stored in the IP/connection transformation cache 28 thereof in advance. As an alternative, in the process 213 of the initialization shown in FIG. 21 which is common to the immediately preceding embodiment, after the IP/connection transformation mechanism 71 employed in the edge connection switching exchange 1 receives the IP/connection transformation information 27 from the grouped-connection management means 18 employed in the network management unit 18, the edge connection switching exchange 1 passes on the entire IP/connection transformation information 27 to a terminating node 11 which requires the information 27 and is directly connected to the exchange 1, by way of an IP logical connection. The terminating node 11 stores the entire IP/connection transformation information 27 received from the grouped-connection management means 18 employed in the network management unit 13 in the IP/connection transformation cache 28 of the terminating node 11. In particular, in the case of the latter scheme, wherein terminating nodes 11 directly connected to an edge connection switching exchange 1 each have the entire IP/connection transformation information 27 received from the network management unit 13 stored in the IP/connection transformation cache 28 of the terminating node 11, it is necessary for the edge connection switching exchange to merely pass on the IP/connection transformation information 27 to the terminating nodes 11 without the need to store the information 27.

Figure 25:
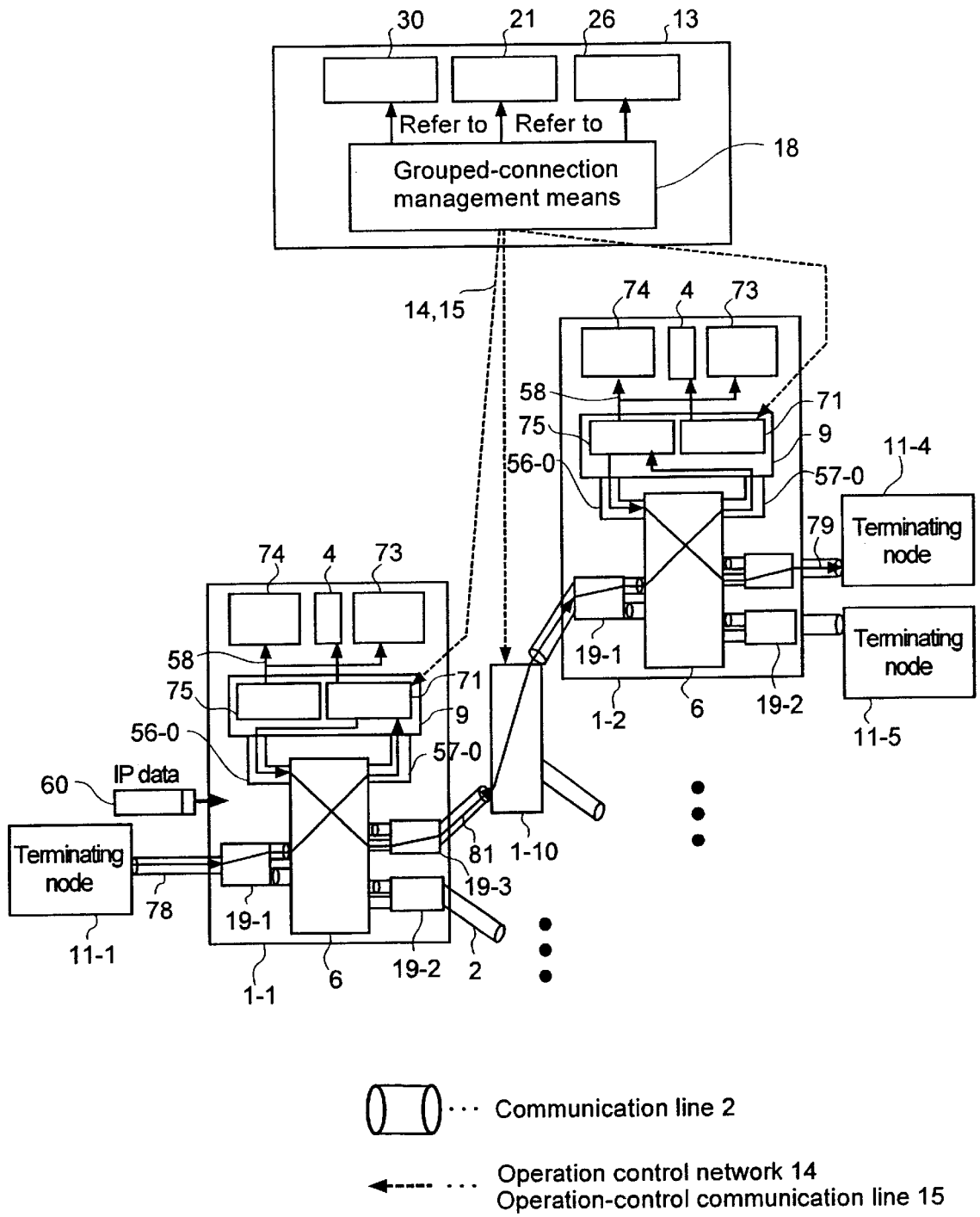
FIG. 25 is a schematic block diagram showing the configuration of an embodiment adopting still another typical technique provided by the present invention to transmit IP data packets through one-directional logical connections between terminating nodes using logical connections controlled in group units in accordance with the present invention.
Figure 26:
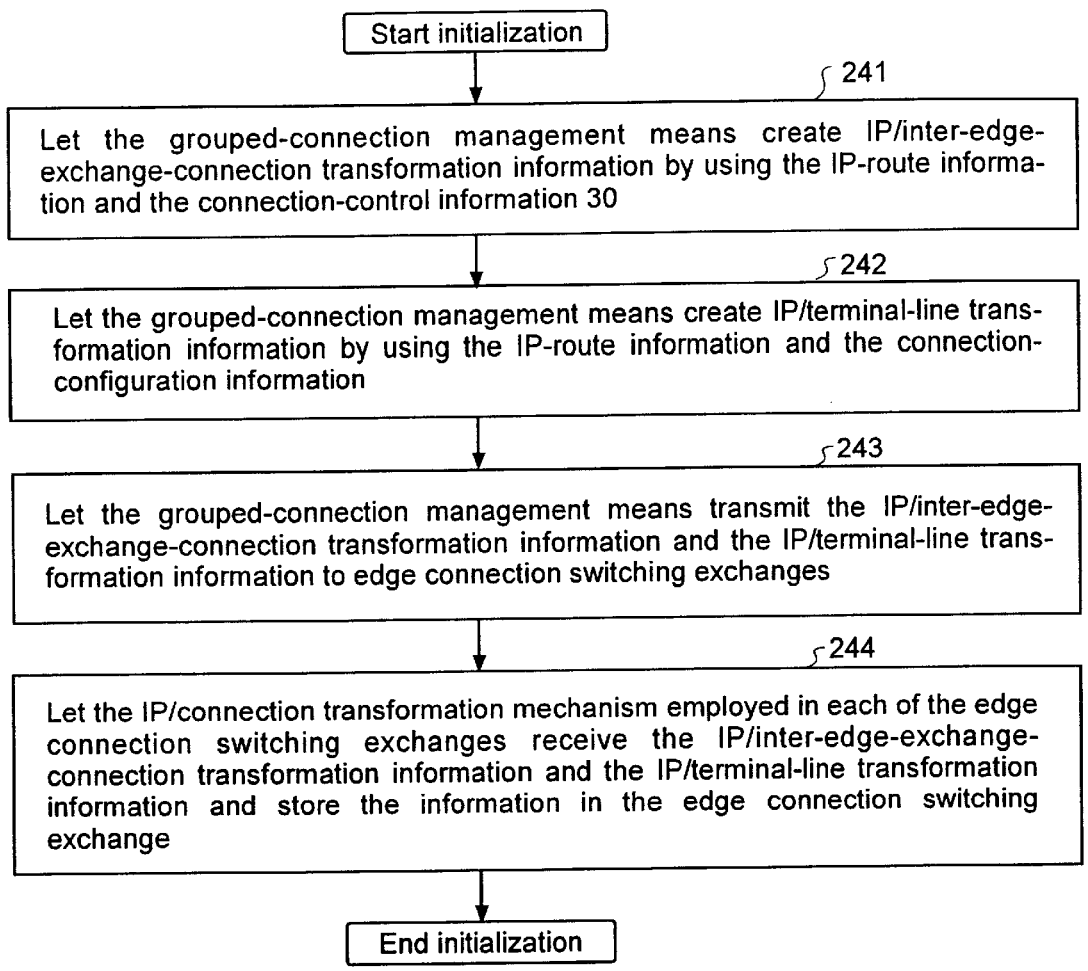
FIG. 26 is a flow diagram showing a typical procedure for initialization of the technique adopted by the embodiment shown in FIG. 25 to transmit IP data packets through one-directional logical connections between terminating nodes using logical connections controlled in group units in accordance with the present invention.

According to a still another embodiment, there is provided a method whereby a terminating node 11 transmits IP data to a source edge connection switching exchange 1, the edge connection switching exchange 1 then passes on the IP data to a destination edge connection switching exchange 1 by using a one-directional logical connection between the source edge connection switching exchange 1 and the destination edge connection switching exchange 1, and the destination edge connection switching exchange 1 finally delivers the IP data to a destination terminating node 11. An example of an embodiment and a procedure adopted by the embodiment for controlling the route of IP data are shown in FIGS. 25, 26 and 27. To be more specific, FIG. 25 is a diagram showing the configuration, FIG. 26 is a diagram showing a typical procedure for initialization and FIG. 27 is a diagram showing a typical transmission procedure.

As shown in FIG. 25, the network management unit 13 is provided with IP-route information 26 showing which terminating node or nodes 11 the IP data with an IP address, or a group of IP addresses, respectively, should be transmitted to and which edge connection-switching exchange or switching exchanges 1 IP data should be transmitted through, or which terminating node or nodes 11 and which edge connection-switching exchange or switching exchanges 1 IP data should be transmitted through.

During initialization, the grouped-connection management means 18 employed in the network management unit 13 carries out processing in accordance with a procedure shown in FIG. 26 by using the IP-route information 26. As shown in FIG. 26, the procedure for initialization begins with a process 241 in which the grouped-connection management means 18 employed in the network management unit 13 creates IP/inter-edge-exchange-connection transformation information 73 by using the IP-route information 26 and the connection-control information 30. The IP/inter-edge-exchange-connection transformation information 73 is used for transforming an IP address or a group of IP addresses into connection identifiers of one-directional inter-edge-exchange logical connections toward destination edge connection switching exchanges 1 between edge connection switching exchanges 11 which were set up among terminating nodes 11 during the initialization.

Then, the flow of the procedure proceeds to a process 242 in which the grouped-connection management means 18 employed in the network management unit 13 creates IP/terminal-line transformation information 74 used for transforming information on a destination edge connection switching exchange included in IP data into information indicating which terminating node and which communication line the IP data should be transmitted to and transmitted through by using the IP/route information 26 and the connection-configuration information 21 for an IP address or a group of IP addresses.

The flow of the procedure then goes on to a process 243 in which the grouped-connection management means 18 employed in the network management unit 13 transmits the IP/inter-edge-exchange-connection transformation information 73 and the IP/terminal-line transformation information 74 to edge connection switching exchanges 1 directly connected to the terminating nodes 11 through the operation-control communication lines 15. Each of the edge connection switching exchanges 1 is provided with an IP/connection transformation mechanism 71 and an IP/terminal-line transformation mechanism 75 as part of the control mechanism 9.

In a process 244 following the process 243, the IP/connection transformation mechanism 71 receives the IP/inter-edge-exchange-connection transformation information 73 and the IP/terminal-line transformation information 74 and stores the information in the edge connection switching exchange 1 by way of a signal line 58.

FIG. 27 is a diagram showing a typical transmission procedure for controlling routes of an IP data packet through one-directional logical connections between terminating nodes 11 using logical connections after the initialization shown in FIG. 26.

The IP/connection transformation mechanism 71 employed in an edge connection switching exchange 1 is connected to a source terminating node 11 directly connected to the edge connection switching exchange 1 by an IP transmission logical connection 78. On the other hand, the IP/terminal-line transformation mechanism 75 employed in an edge connection switching exchange 1 is connected to a destination terminating node 11 directly connected to the edge connection switching exchange by an IP reception logical connection 79. An inter-edge-exchange one-directional logical connection 81 toward a destination edge connection switching exchange set up during the initialization shown in FIG. 26 is connected to the IP/terminal-line transformation mechanism 75 employed in the edge connection switching exchange also during the initialization.

As shown in FIG. 27, the procedure begins with a process 251 in which a terminating node 11 transmits IP data to a source edge connection switching exchange 1 by using the IP transmission logical connection 78. The flow of the procedure then goes on to a process 252 in which, upon receiving the IP data from the terminating node 11, the IP/connection transformation mechanism 71 uses a destination IP address recorded in the IP header of the IP data received from the terminating node 11 as a key to search the IP/inter-edge-exchange-connection transformation information 73 stored in the edge connection switching exchange 1 for a connection identifier of a one-directional inter-edge-exchange logical connection 81 toward a destination edge connection switching exchange 1. Then, the flow of the procedure proceeds to a process 253 in which the IP/connection transformation mechanism 71 replaces connection-identifier information 62 in each data packet 60 of the IP data with the identifier value of the one-directional inter-edge-exchange logical connection 81 obtained in the process 252.

Subsequently, the flow of the procedure continues to a process 254 in which the IP/connection transformation mechanism 71 searches the switching table 4 through the signal line 58 for information on an output transmission line corresponding to the identifier value of the one-directional inter-edge-exchange logical connection 81. The flow of the procedure then goes on to a process 255 in which the IP/connection transformation mechanism 71 outputs each data packet 60 of the IP data with the connection-identifier information 62 thereof replaced by the identifier value of the one-directional inter-edge-exchange logical connection 81 along with the information on the output communication line to the switch mechanism 6 by way of a communication line 56-0.

Then, the flow of the procedure proceeds to a process 256 in which the switch mechanism 6 carries out connection switching based on the information on the output communication line supplied thereto for the data packets 60 of the IP data, transmitting the packets 60 to the communication line 2 specified by the information on the output communication line. Subsequently, the flow of the procedure continues to a process 257 in which each of the connection switching exchanges 1 carries out connection switching to the one-directional inter-edge-exchange logical connection 81 to a destination edge connection switching exchange 1 in accordance with the identifier of the logical connection 81, transmitting the data packets 60 to the destination.

The flow of the procedure then goes on to a process 258 in which the IP/terminal-line transformation mechanism 75 employed in the destination edge connection switching exchange 1 receives the IP data transmitted by the source edge connection switching exchange 1 through the one-directional inter-edge-exchange logical connection 81 and-obtains information on a communication line to the destination terminating node 11 which is supposed to receive the IP data by referring to the IP/terminal-line transformation information 74.

Then, the flow of the procedure proceeds to a process 259 in which the IP/terminal-line transformation mechanism 75 replaces the information 62 on a connection identifier recorded in each data packet 60 of the IP data with the value of the identifier of the IP/reception logical connection 79. Subsequently, the flow of the procedure continues to a process 260 in which the IP/terminal-line transformation mechanism 75 delivers each data packet 60 of the IP data with the information 62 on a connection identifier thereof replaced by the value of the identifier of the IP/reception logical connection 79 along with the information on the communication line to the destination terminating node 11 obtained in the process 258 to the switch mechanism 6 through a signal line 56. Finally, the flow of the procedure proceeds to a process 261 in which the switch mechanism 6 carries out connection switching based on the information on the output communication line supplied thereto for the data packets 60 of the IP data, and transmits the packets 60 to the destination terminating node 11 by way of the communication line specified by the information on the output communication line.

In the embodiments described above, logical connections set up during initialization are used as grouped logical connections. The following is a description of embodiments utilizing grouped logical connections in response to a request to set up or release a logical connection which is made by any terminating node 11 dynamically.

As explained in the description of the conventional connection switching exchange with reference to FIG. 2, a request to set up or release a logical connection which is made by any terminating node 11 dynamically is transmitted to the connection setup/release mechanism 10 employed in the edge connection switching exchange 1 through the signaling logical connection 82 to be processed by the connection setup/release mechanism 10. In the connection setup/release mechanism 10 implemented by an embodiment of the present invention, however, unlike the conventional connection switching exchange, a logical connection from a requesting terminating node 11 to a destination is not actually set up or released for each request to set up or release the logical connection made by the terminating node 11. Instead, in the edge connection switching exchange 1, a means is provided to serve as a buffer for requests to set up or release the logical connections made by a terminating node 11, and a group of logical connections from the edge connection switching exchange to destination terminating nodes 11 are set up or released in a new connection setting unit equal to a multiple of a group unit. That is to say, the logical connections in the new connection setting unit are divided into small numbers of logical connections, and a request made by a terminating node 11 to set up or release logical connections is processed by picking up a small number of logical connections from the buffer, and by setting or releasing a portion of the connections that are between the terminating node 11 and the logical connections picked up. For this reason, the connection setup/release mechanism 10 employed in the edge connection switching exchange 1 provided by the present invention has terminal-connection-control information 63 for controlling the status of assignment to terminating nodes 11 for each group of logical connections set in the new connection setting unit size for buffering purposes.

The terminal-connection-control information 63 includes time-out information 70 for providing a timing to release a new setting unit of logical connections. A typical format of the terminal-connection-control information 63 is shown in FIG. 28. As shown in the figure, for each group of logical connections set in the new setting unit, in addition to the time-out information 70, the terminal-connection-control information 63 comprises information on destinations 64 for the connections, information on attributes 65 for the connections, a head connection identifier value 66 for the connections, the number of set logical connections 67, the number of free logical connections 68, that is, the number of logical connections unassigned to terminating nodes 11, and information on free connection identifiers 69.

FIG. 29 shows a typical procedure for implementing a processing to process a request to set up a logical connection made by a terminating node 11 by using terminal-connection-control information 63. As shown in the figure, the procedure begins with a process 271 in which the terminating node 11 issues a request to set up a new logical connection to an edge connection switching exchange through a signaling logical connection 82.

The flow of the procedure then goes on to a process 272 in which the connection setup/release mechanism 10 of the edge connection switching exchange receiving the request checks pieces of terminal-connection-control information 63 corresponding to the destination and attributes specified in the request to search for terminal-connection-control information 63 with a non-zero number of free logical connections 68. If terminal-connection-control information 63 with a non-zero number of free logical connections 68 is found, the flow of the procedure jumps to a process 275. If the number of free logical connections 68 of each terminal-connection-control information 63 corresponding to the destination and attributes specified in the request is 0, on the other hand, the flow of the procedure proceeds to a process 273 in which the connection setup/release mechanism 10 of the edge connection switching exchange 1 resorts to the grouped-connection management means 18 employed in the network management unit 13 through an operation-control communication line 15 to set up a group of logical connections with a group size equal to the new connection setting unit described above, that is, to set up a group of logical connections having the destination and the attributes specified in the request with a group size equal to the new connection setting unit.

Then, the flow of the procedure proceeds to a process 274 in which the connection setup/release mechanism 10 creates new terminal-connection-control information 63 for the new group of logical connections obtained as a result of the process 273, puts all the logical connections in the group in an unassigned state, initializes all data except the time-out information 70 and catalogs the new terminal-connection-control information 63.

Subsequently, the flow of the procedure continues to the process 275 in which the connection setup/release mechanism 10 fetches as many unassigned connection identifiers as requested by referring to the information on free connection identifiers 69 of the terminal-connection-control information 63 for unassigned logical connections meeting the request, logical connections found in the process 272 or cataloged in the process 274, subtracts the number of fetched connection identifiers from the number of free connection identifiers 68, puts the fetched connection identifiers in an assigned state and updates the information on free connection identifiers 69.

The flow of the procedure then goes on to a process 276 in which the switching table 4 is set up to extend and link the fetched connections to the terminating node 11 with the connection identifiers obtained in the process 275. Finally, the flow of the procedure continues to a process 277 in which the connection setup/release mechanism 10 transmits the connection identifier obtained in the process 275 to the terminating node 11 making the request.

Figure 30:
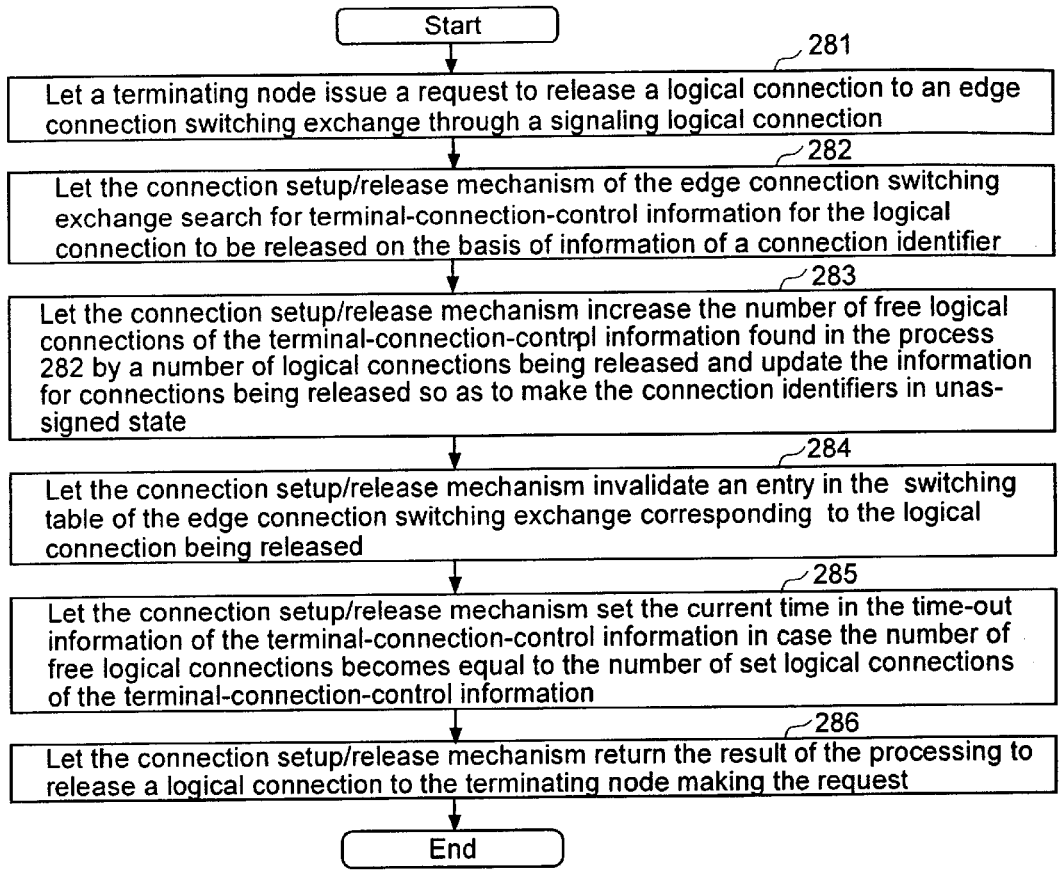
FIG. 30 is a flow diagram showing a typical procedure for processing a request to release a logical connection made by a terminating node using logical connections controlled in group units in accordance with the present invention.

FIG. 30 is a typical procedure of an embodiment implementing processing to process a request to release a logical connection made by a terminating node 11. As shown in the figure, the procedure begins with a process 281 in which the terminating node 11 issues a request to release a logical connection to an edge connection switching exchange 1 through a signaling logical connection 82. The flow of the procedure then goes on to a process 282 in which the connection setup/release mechanism 10 of the edge connection switching exchange 1 receiving the request searches for terminal-connection-control information 63 for the logical connection to be released on the basis of information on a connection identifier.

Then, the flow of the procedure proceeds to a process 283 in which the connection setup/release mechanism 10 increases the number of free logical connections 68 of the terminal-connection-control information 63 found in the process 282 by the number of logical connections being released and updates the information on free connection identifiers 69 to change the status of assignments of logical connections being released to an unassigned one. Subsequently, the flow of the procedure continues to a process 284 in which the connection setup/release mechanism 10 invalidates an entry in the switching table 4 corresponding to the logical connection being released.

The flow of the procedure then goes on to a process 285 in which the connection setup/release mechanism 10 sets the current time in the time-out information 70 of the terminal-connection-control information 63 in case the number of L fee logical connections 68 becomes equal to the number of set logical connections 67 of the terminal-connection-control information 63, that is, in case all set logical connections become free or have an unassigned status. The time-out information 70 is checked by the time-out processing of unassigned logical connections of FIG. 31, which is invoked periodically. If the status of terminal-connection-control information 63 in which the number of free logical connections 68 thereof is equal to the number of set logical connections 67 continues for more than a predetermined period of time, the grouped-connection management means 18 employed in the network control means 13 is requested to release a group of unassigned logical connections associated with the terminal-connection-control information 63. Finally, the flow of the procedure proceeds to a process 286 in which the result of the processing to release a logical connection is transmitted to the terminating node 11 making the request for the processing.

Figure 31:
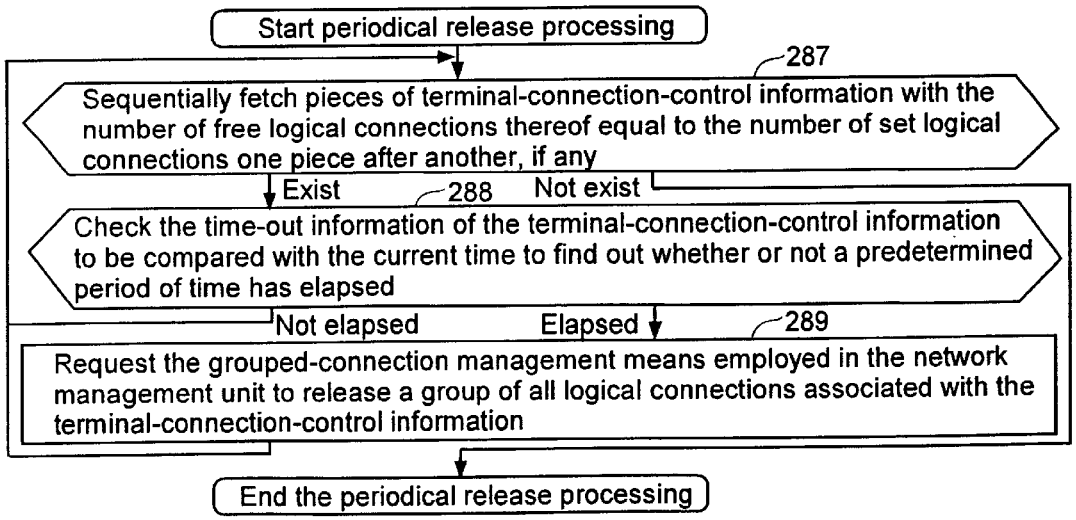
FIG. 31 is a flow diagram showing a typical processing procedure to release a group of logical connections set up in group units which is carried out periodically as part of the processing to process a request to release a logical connection shown in FIG. 30 in accordance with the present invention.

FIG. 31 is a diagram showing a typical procedure for the aforementioned processing to release a group of logical connections set up in new connection setting units, which is carried out periodically by the edge connection switching exchange as a part of the processing to process a request to release a logical connection made by a terminating node. As shown in the figure, the procedure begins with a process 287 in which pieces of terminal-connection-control information 63, with the number of free logical connections 68 thereof equal to the number of set logical connections 67, are sequentially fetched one piece after another. If such terminal-connection-control information 63 does not exist, the periodically invoked processing is finished. If such terminal-connection-control information 63 exists, on the other hand, the flow of the procedure goes on to a process 288 to check the time-out information 70 of the terminal-connection-control information 63 to be compared with the current time. If the result of the comparison indicates that a predetermined period of time has not elapsed yet, the flow of the procedure returns to the process 287. If the predetermined period of time has elapsed, on the other hand, the flow of the procedure proceeds to a process 289 in which the grouped-connection management means 18 employed in the network management unit 13 is requested to release a group of all logical connections associated with the terminal-connection-control information 63 with a group size equal to the new connection setting unit described above and to delete the terminal-connection-control information 63. The flow of the procedure then returns to the process 287.

Figure 32:
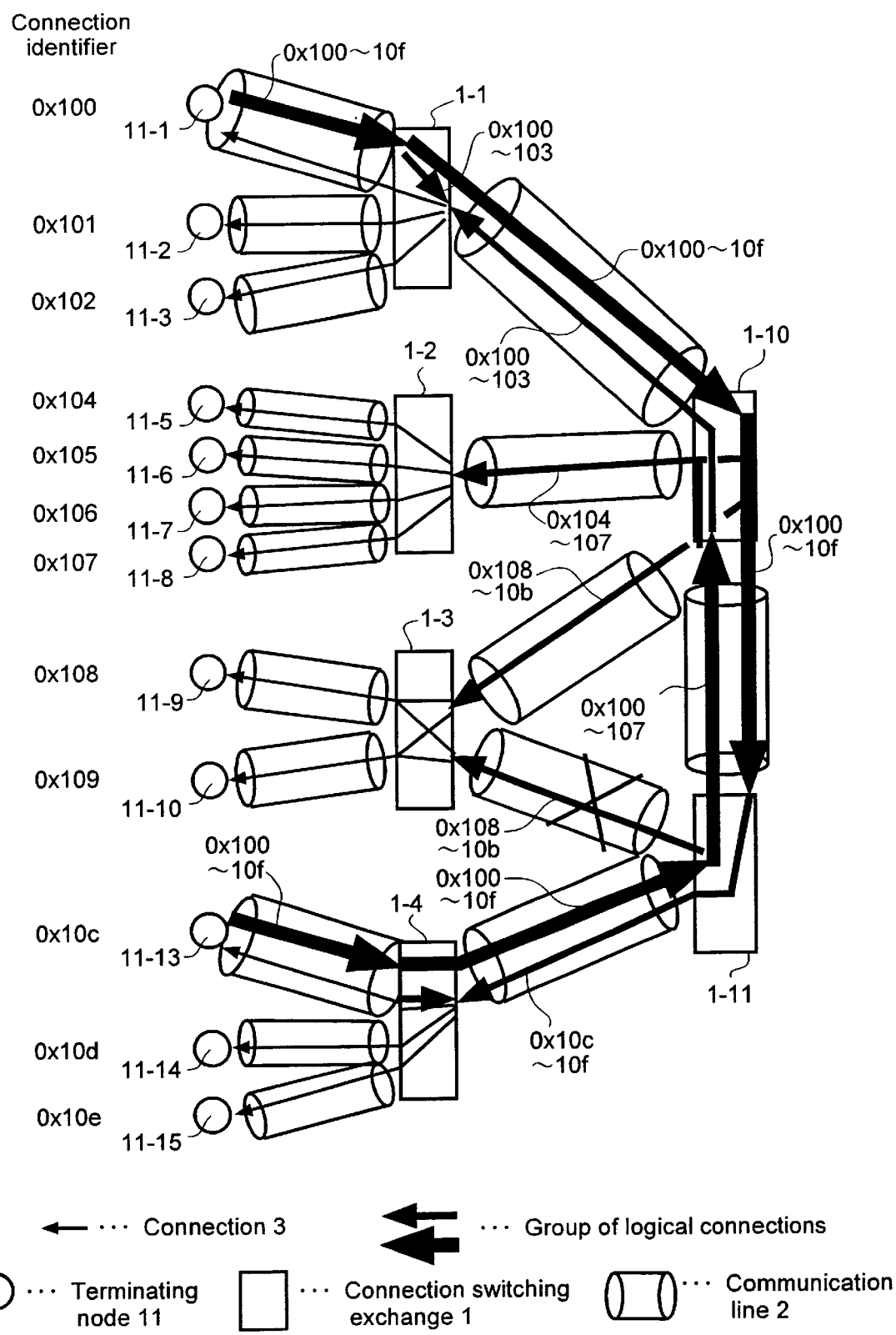
FIG. 32 is a diagram showing an example of a technique to recover a failure by using a set of logical connections controlled in group units in accordance with the present invention.

Next, an embodiment implementing failure handling by using grouped logical connection control provided by the present invention will be explained. Basically, there are two techniques to handle a failure by using the grouped logical connection control. According to one of the techniques, a plurality of group sizes are used and a group of logical connections for a detour path with overlapping connection identifiers are set up in advance. This technique to handle a failure is thus applicable to a case in which a failing member is a group of logical connections already having a detour path. FIG. 32 is a diagram showing an embodiment implementing this technique to handle a failure of one of the one-directional interterminal logical connections shown in FIG. 19.

More specifically, FIG. 32 shows a case in which a failure occurs on a communication line 2 from the connection switching exchange 1-11 to the connection switching exchange 1-3. In this example, the failure affects a group of logical connections from the connection switching exchange 1-11 to the connection switching exchange 1-3 having connection identifiers Ox108 to Ox10b. In this example, however, another group of logical connections having connection identifiers Ox100 to Ox10f overlapping the connection identifiers Ox108 to Ox10b of the group of logical connections affected by the failure have already been set up. In this other group of logical connections, a subgroup of logical connections having connection identifiers Ox108 to Ox10b are connected to the connection switching exchange 1-3 through the connection switching exchange 1-10. Thus, by using this subgroup of logical connections, a detour path for the failing member can be made. That is to say, by merely invalidating the setting of the group of logical connections from the connection switching exchange 1-11 to the connection switching exchange 1-3 affected by the failure in the switching table 4 of the connection switching exchange 1-11, the problem caused by the failure can be solved.

Figure 33:
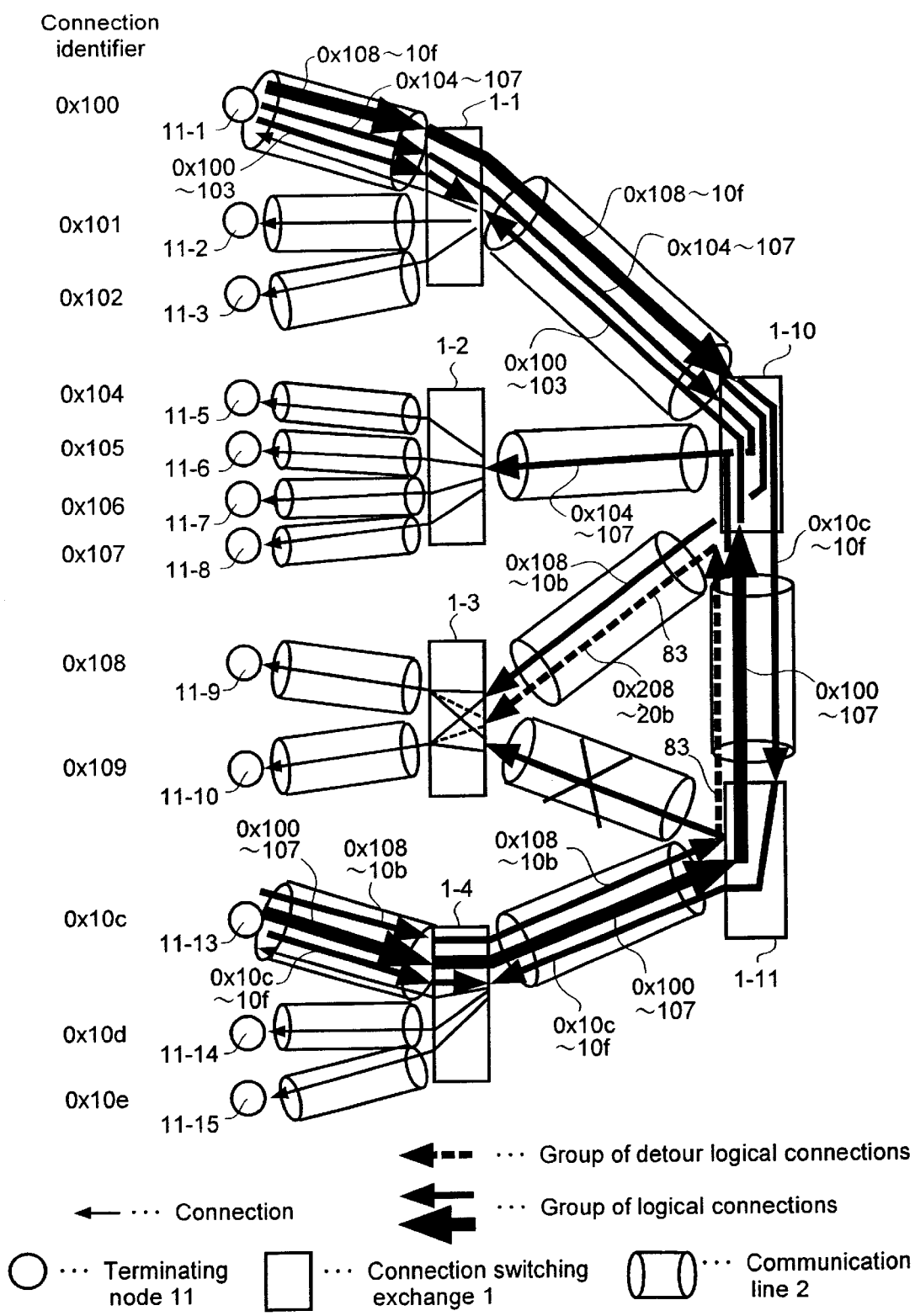
FIG. 33 is a diagram showing an example of another technique to recover a failure using a set of logical connections controlled in group units in accordance with the present invention.

The other technique to handle a failure by using grouped logical connections is applicable to a case in which no logical connections are set up in advance for a detour path like the one described above. FIG. 33 is a diagram showing an embodiment implementing this technique to handle a failure of one of the one-directional interterminal logical connections shown in FIG. 15. More specifically, FIG. 33 shows a case in which a failure occurs on a communication line 2 from the connection switching exchange 1-11 to the connection switching exchange 1-3. Unlike the case shown in FIG. 32, however, in the example shown in FIG. 33, the failure affects a group of logical connections from the connection switching exchange 1-11 to the connection switching exchange 1-3 having connection identifiers Ox108 to Ox10b for which no detour logical connections have been set up in advance.

In order to handle this failure, a group of detour logical connections 83 from the connection switching exchange 1-11 to the connection switching exchange 1-3 through the connection switching exchange 1-10 are set up in a group unit of the group of logical connections affected by the failure. In this case, the connection identifiers of the group of logical connections affected by the failure are used as they are as identifiers assigned to a group of logical connections typically set up from the connection switching exchange 1-11 to the connection switching exchange 1-10 to be linked to a group of logical connections already set up between the connection switching exchange 1-10 and the connection switching exchange 1-3. In case logical connections can not be shared due to a problem, such as a shortage of the bandwidth or the like, however, another group of logical connections with connection identifiers Ox208 to Ox20b can be allocated to replace the group of logical connections affected by the failure. In this case, connection switching is carried out in the connection switching exchange 1-11 and the connection switching exchange 1-3 to link the other group of logical connections with connection identifiers Ox208 to Ox20b to the group of logical connections with connection identifiers Ox108 to Ox10b.

Figure 34:
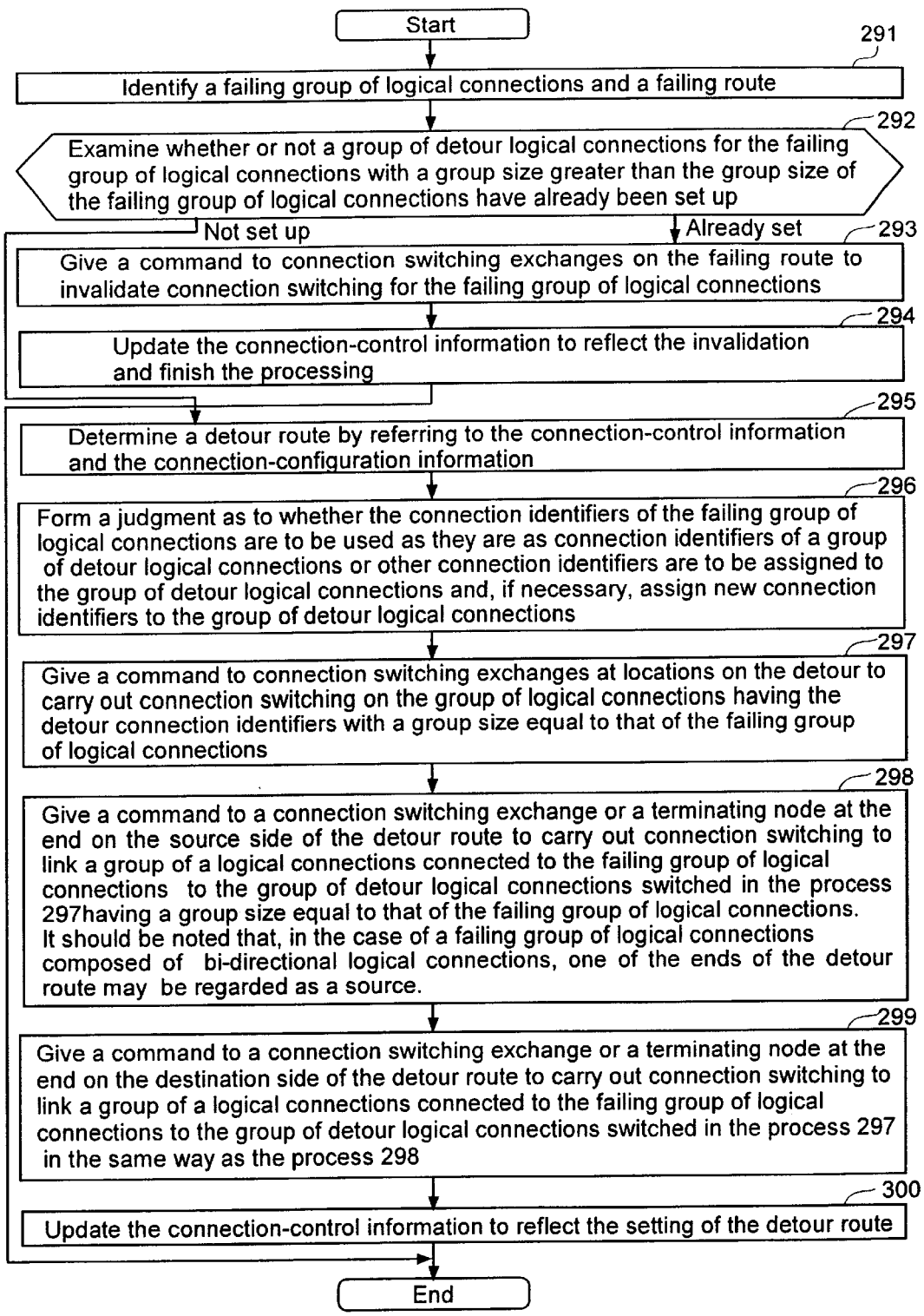
FIG. 34 is a flow diagram showing typical techniques in a processing procedure to recover a failure using a set of logical connections controlled in group units in accordance with the present invention shown in FIGS. 32 and 33.

The procedure for implementing the two techniques to handle a failure as described above will be explained once more by referring to FIG. 34. As shown in the figure, the procedure begins with a process 291 in which, upon detecting a failure by using some methods, the grouped-connection management means 18 employed in the network management unit 13 identifies a failing group of logical connections and a failing route affected by the failure by referring to the connection-control information 30 and the connection-configuration information 21.

The flow of the procedure then goes on to a process 292 to examine whether or not a group of detour logical connections for the failing group of logical connections with a group size greater than the group size of the failing group of logical connections have already been set up by referring to the connection-control information 30. If a group of detour logical connections have already been set up, the flow of the procedure proceeds to a process 293 in which the grouped-connection management means 18 gives a command to connection switching exchanges 1 on the failing route through operation-control communication lines 15 to invalidate connection switching for the failing group of logical connections. Then, the flow of the procedure proceeds to a process 294 in which the grouped-connection management means 18 updates the connection-control information to reflect the invalidation and finishes the processing. If the result of the examination in the process 292 indicates that a group of detour logical connections have not been set up, on the other hand, the flow of the procedure continues to processing starting with a process 295 in which, in order to minimize the impact of the failure on other members, a detour route is set in accordance with the following procedure as a transient part of the processing to handle the failure.

First of all, in the process 295, a detour route is determined by referring to the connection-control information 30 and the connection-configuration information 21. Then, the flow of the procedure goes on to a process 296 to form a judgment based on consideration of conditions, such as the bandwidth, as to whether the connection identifiers of the failing group of logical connections are to be used as they are as connection identifiers of a group of detour logical connections or other connection identifiers are to be assigned to the group of detour logical connections. If necessary, new connection identifiers are thus assigned to the group of detour logical connections.

The flow of the procedure then proceeds to a process 297 in which a command is given to connection switching exchanges 1 at locations on the detour route determined in the process 295 by way of operation-control communication lines 15 to carry out connection switching on the group of logical connections having detour connection identifiers with a group size equal to that of the failing group of logical connections.

After the processing to switch a group of detour logical connections for the connection switching exchanges 1 at locations on the detour route is completed, the flow of the procedure then continues to a process 298 in which a command is given to a connection switching exchange 1 or 6 terminating node 11 at the end on the source side of the detour route to carry out connection switching to link a group of a logical connections connected to the failing group of logical connections to the group of detour logical connections switched in the process 297 and having a group size equal to that of the failing group of logical connections. It should be noted that, in the case of a failing group of logical connections composed of bi-directional logical connections, one of the ends of the detour route may be regarded as a source.

After the processing to switch the logical connections in a connection switching exchange 1 or a terminating node 11 at the end on the source side of the detour route is completed, the flow of the procedure then continues to a process 299 in which a command is given to a connection switching exchange 1 or a terminating node 11 at the end on the destination side of the detour route to carry out connection switching to link a group of logical connections connected to the failing group of logical connections to the group of detour logical connections switched in the process 297 and having a group size equal to that of the failing group of logical connections. Finally, the flow of the procedure goes on to a process 300 in which the connection-control information 30 is updated to reflect the setting of the detour route.

Figure 35:
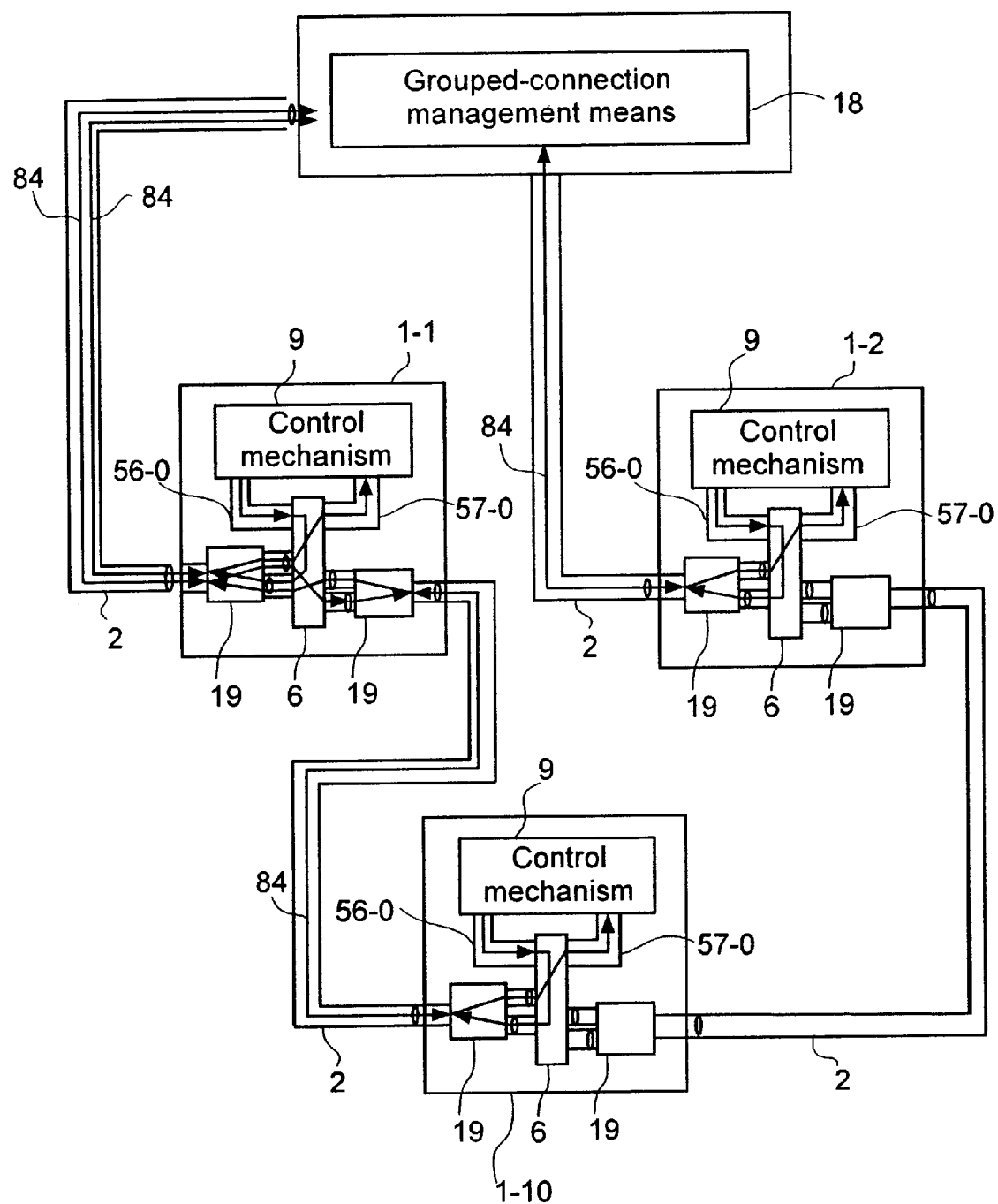
FIG. 35 is a schematic block diagram showing a typical configuration of an operation-control communication line using logical connections in a communication network in accordance with the present invention.

In the embodiment shown in FIG. 1, the network management unit 13 is connected to connection switching exchanges 1 by operation-control communication lines 15 implemented on an operation-control network 14. In the case of an embodiment shown in FIG. 35, on the other hand, the network management unit 13 is connected by communication lines 2 directly to the communication network, which includes connection switching exchanges 1 serving as relay apparatuses. In this case, an operation-control logical connection 84 having a connection identifier determined in advance for use as an operation-control communication line serves as a logical connection for an operation-control communication line 15 of the embodiment shown in FIG. 1.

The grouped-connection management means 18 employed in the network management unit 13 can be connected to a variety of mechanisms employed in the control mechanism 9 of a connection switching exchange 1, such as the connection setup/release mechanism 10, by the operation-control logical connection 84. It should be noted that, in the embodiment shown in FIG. 35, a unique connection identifier is used for each connection switching exchange and an operation control logical connection 84 is set up individually for each connection switching exchange 1.

Figure 36:
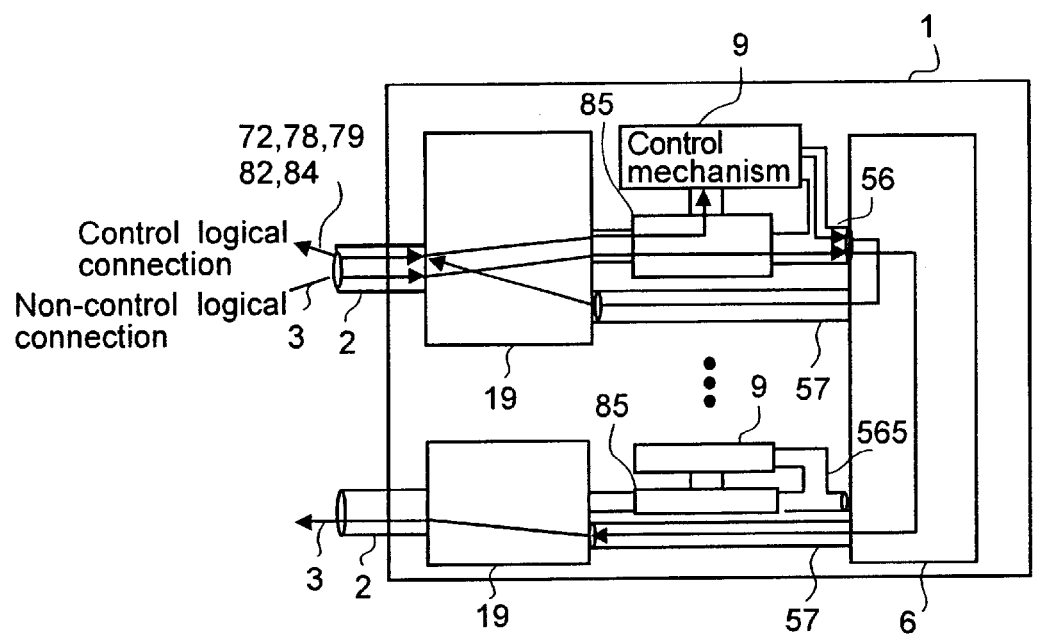
FIG. 36 is a schematic block diagram showing a typical configuration provided by the present invention to include control mechanisms of connection switching exchanges for communication lines.

In addition, in the embodiments described so far, one control mechanism 9 is provided for each connection switching exchange 1. In the case of an embodiment shown in FIG. 36, on the other hand, a control mechanism 9 is provided for each communication line 2. In addition, a logical connection distribution mechanism 85 for controlling distribution of logical connections to submechanisms in a control mechanism 9 is provided for each control mechanism 9 to handle only data packets 60 of the logical connections for the control mechanism 9. In addition, a variety of mechanisms in the control mechanism 9 of the embodiment can each be provided for a communication line 2.

In the embodiments described above, only one network management unit 13 is provided for the entire communication network. It should be noted that, if unitary control of all logical connections in the entire communication network in group units can be implemented, typically, a plurality of network management units are provided. In this case, by adopting a system like a distributed data base, a cache is provided in each of the control management units for implementing control of consistency of connection-control information. Processing is distributed among the same plurality of network management units according to ranges of distribution of connection identifiers and ranges of distribution of connection switching exchanges.

According to the present invention, even in a large-scale communication network, there will be no cases in which connection identifiers and switching-table entries are not sufficient, allowing switching of high-speed IP packets to be implemented. In actuality, in the switching of an IP packet, a logical connection already set up between terminating nodes is used. Thus, high speed switching operations can be sustained without the need to set up a logical connection at the switching of an IP packet. In addition, logical connections between terminating nodes are set up by adopting a system whereby logical connections controlled in group units over the entire communication network are used for integrating, distributing and linking groups of hierarchical logical connections. As a result, even if logical connections are set between terminating nodes, only connection identifiers about equal in number to terminating nodes are required. In addition, by using the connection switching exchange provided by the present embodiment, only extremely few switching-table entries are needed to allow switching at high speed to be implemented by hardware.

Furthermore, even in a case where logical connections need to be set up dynamically during communication of data requiring assurance of bandwidth, such as communication of audio and video data, according to the present invention, logical connections are set up and released in group units provided by the present invention in a connection switching exchange, instead of setting up or releasing a logical connection from a source terminating node to a destination node each time a request to set up or release a logical connection is received individually from the source terminating node. Thus, by adopting a technique of setting-up or releasing logical connections in a batch operation, there can be exhibited effects that the number of actual operations to set up or release logical connections can be reduced and that the number of switching-table entries can be decreased.

In addition, according to the present invention, even in the case of a large-scale network, unitary control of logical connections can be executed, allowing a failure to be recovered with ease. In the conventional connection switching exchange, switching is carried out by using connection identifiers individually controlled by and stored in the connection switching exchange. According to the present invention, on the other hand, logical connections controlled in a unitary manner over the entire communication network are used for carrying out switching of logical connections in each connection switching exchange. Thus, even when information on connection switching is lost in a connection switching exchange in the event of a failure, the failure can be recovered with ease. Moreover, in the present invention, logical connections are controlled in group units. Thus, even if logical connections are controlled in a unitary manner over the entire network, the operations can be carried out with only a small number of requests made by connection switching exchanges and a reduced amount of control.

On top of that, the present invention provides a plurality of different group sizes, and a group of detour logical connections is set up in advance at a group size determined by one of the a group sizes provided by the invention. Thus, in the event of a failure occurring in a group of logical connections for which a group of detour logical connections have been set in advance, processing to handle the failure can be handled by merely invalidating the failing group of logical connections. Even in the event of a failure occurring in a group of logical connections for which a group of detour logical connections have not been set in advance, a group of detour logical connections can be set up dynamically with a group size equal to that of the failing group of logical connections in the communication network without the need to resort to a user program on a terminating node to carry out an operation to again set up a logical connection, because all logical connections in the communication network are controlled in group units and by using univocal connection identifiers. As a result, a high-reliability communication network can be built.

What is claimed is:

1. A network management apparatus employed in a communication network having a plurality of connection switching exchanges and a plurality of terminating nodes coupled to each other, wherein each of said connection switching exchanges switches a connection in said network by using a connection identifier assigned to said connection, wherein said network management apparatus:

assigns a group connection identifier to a group of connections, said group of connections being made up of a plurality of connections identified by connection identifiers, and issues an instruction for setting up or releasing connections in units of said group of connections.

2. The network management apparatus according to claim 1, wherein said network management apparatus further:

assigns one connection identifier to a connection passing through a plurality of said connection switching exchanges.

3. The network management apparatus according to claim 2, wherein said network management apparatus further:

issues an instruction for switching said connections in units of said group of connections without changing the assigned group connection identifier to said connection switching exchanges.

4. The network management apparatus according to claim 3, wherein said network management apparatus further:

assigns one connection identifier unique to one destination to each of said connections extending from a plurality of different sources to said one destination.

5. The network management apparatus according to claim 4, wherein said connection identifiers assigned to said connections making up said group of connections are consecutive.

6. The network management apparatus according to claim 1, wherein said network management apparatus further:

assigns a plurality of different group connection identifiers to a plurality of groups of connections sharing one of said connections in said communication network; and issues an instruction for making one of said different group connection identifiers valid to said connection switching exchange.

7. The network management apparatus according to claim 1, wherein said network management apparatus further:

refers to, when issuing said instruction, connection configuration information stored therein, wherein said connection configuration information relates to said terminating nodes and said connection switching exchanges constituting said communication network.

8. The network management apparatus according to claim 7, wherein said instruction for setting up is issued, when setting up initial connection according to an initial connection setting specifying information stored in said network management apparatus or when receiving a request to set up a new connection form a connection switching exchange connected to a terminating node.

9. The network management apparatus according to claim 8, wherein said network management apparatus further:

issues said instruction to each of said connection switching exchanges on a connection respectively via an operation-control network which couples said network management apparatus to each of said connection switching exchanges.

10. The network management apparatus according to claim 9, wherein said network management apparatus further:
 issues said instruction to one of said connection switching exchanges via another connection switching exchange coupled to said network management apparatus by said operation-control network.

11. The network management apparatus according to claim 10, wherein said instruction for releasing is issued, when receiving a request to release said connection from an edge connection switching exchange, or when necessary to release said connection to reflect a change made to initially set up said connections.

* * * * *